United States Patent
Jang

(10) Patent No.: US 11,366,917 B2
(45) Date of Patent: Jun. 21, 2022

(54) XR DEVICE AND METHOD FOR CONTROLLING THE SAME

(71) Applicant: LG ELECTRONICS INC., Seoul (KR)

(72) Inventor: Gihoon Jang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 272 days.

(21) Appl. No.: 16/547,095

(22) Filed: Aug. 21, 2019

(65) Prior Publication Data

US 2019/0377894 A1   Dec. 12, 2019

(30) Foreign Application Priority Data

Aug. 13, 2019   (KR) .................. 10-2019-0098869

(51) Int. Cl.
G06F 21/62        (2013.01)
G06F 3/01         (2006.01)

(52) U.S. Cl.
CPC .......... *G06F 21/6218* (2013.01); *G06F 3/011* (2013.01)

(58) Field of Classification Search
None
See application file for complete search history.

(56) References Cited

U.S. PATENT DOCUMENTS

| | | | |
|---|---|---|---|
| 2009/0292677 A1* | 11/2009 | Kim ...................... | G06F 16/958 |
| 2020/0028925 A1* | 1/2020 | Monge Nunez ...... | G06F 16/903 |
| 2020/0134229 A1* | 4/2020 | Ranger ................. | H04L 63/061 |
| 2021/0019301 A1* | 1/2021 | Murti ................... | H04L 63/1433 |

* cited by examiner

*Primary Examiner* — Di Xiao
(74) *Attorney, Agent, or Firm* — Birch, Stewart, Kolasch & Birch, LLP

(57) ABSTRACT

A XR device and a method for controlling the XR device are discussed. The method includes accessing to a public DB (Database), generating a private DB based on key information of the public DB, where the public DB includes public AR (Artificial Intelligence) information, and the private DB includes private AR information and a whitelist, and acquiring the public AR information or the private AR information.

18 Claims, 49 Drawing Sheets

FIG. 5
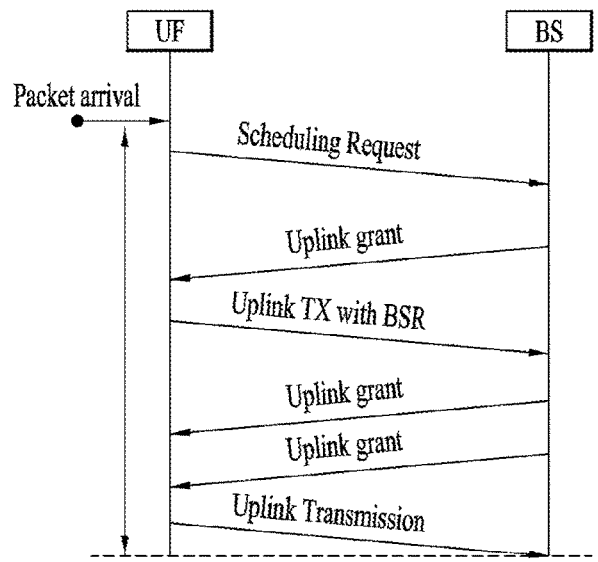
Fig. Uplink TX prcedure with grant
(a)
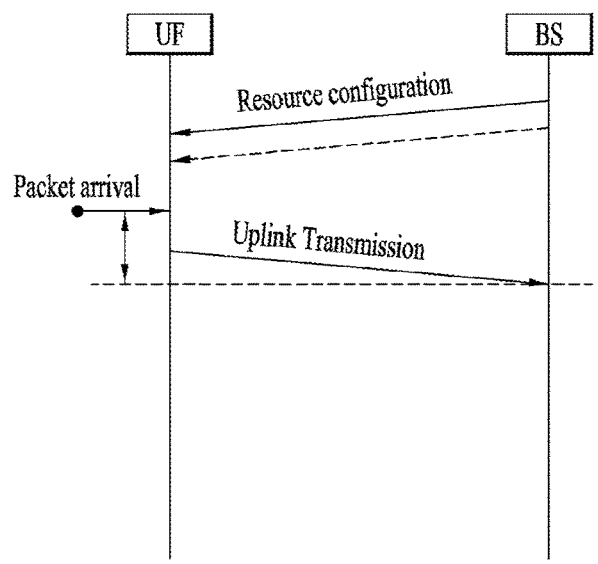
Fig. Uplink TX prcedure without grant
(b)

XR DEVICE AND METHOD FOR CONTROLLING THE SAME

This application claims the benefit of Korean Patent Application No. 10-2019-0098869, filed on Aug. 13, 2019 which is hereby incorporated by reference as if fully set forth herein.

BACKGROUND OF THE INVENTION

Field of the Invention

The present disclosure relates to an extended reality (XR) device for providing augmented reality (AR) mode and virtual reality (VR) mode and a method of controlling the same. More particularly, the present disclosure is applicable to all of the technical fields of $5^{th}$ generation (5G) communication, robots, self-driving, and artificial intelligence (AI).

Discussion of the Related Art

VR (Virtual Reality) technology is to provide CG (Computer Graphic) video data for an object or background of real world. AR (Augmented Reality) technology is to provide CG video data made by virtual data on real object video data. MR (Mixed) technology is a computer graphic technology to provide a combination of the real world and virtual objects. VR, AR and MR refer to XR (extended reality) technology.

Recently, various virtual objects based on AR technology can be provided in various ways. Thus, a method for efficiently acquiring various virtual objects is needed.

However, there are few efficient acquisition and authentication methods for providing virtual objects according to usages of AR technology.

Nowadays, AR-related applications include a database (DB) stored in a common server so that AR objects can appear on a real camera screen image using such AR-related applications. However, the AR-related applications have disadvantages in that only the same screen images are provided to all users without identifying the respective users, so that all the users can view only the same screen images using the AR-related applications.

SUMMARY OF THE INVENTION

Accordingly, the present disclosure is directed to an XR device and a method for controlling the same that substantially obviate one or more problems due to limitations and disadvantages of the related art.

An object of the present disclosure is to provide technology for separating a database (DB) during AR utilization and using the separated DB.

Another object of the present disclosure is to provide technology for increasing security of an authentication method of a user who accesses a database (DB), and reducing complexity of the authentication method.

Another object of the present disclosure is to provide technology for allowing a plurality of users to acquire AR information stored in various DBs and thus utilize a virtual object based on the acquired AR information.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a In accordance with another aspect of the present disclosure, a method for controlling a It is to be understood that both the foregoing general description and the following detailed description of the present disclosure are exemplary and explanatory and are intended to provide further explanation of the invention as claimed.

As is apparent from the above description, the XR device and the method for controlling the same according to various embodiments of the present disclosure can separate a database (DB) during AR utilization, can use the separated DB, and can efficiently use the DB according to AR usages.

The XR device and the method for controlling the same according to various embodiments of the present disclosure can increase security of an authentication method of a user who accesses a database (DB), and can reduce complexity of the authentication method.

The XR device and the method for controlling the same according to various embodiments of the present disclosure can allow a plurality of users to acquire AR information stored in various DBs and thus utilize a virtual object based on the acquired AR information.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 5 is a diagram illustrating exemplary uplink (UL) transmission based on a UL grant;

DESCRIPTION OF SPECIFIC EMBODIMENTS

Figure 1:
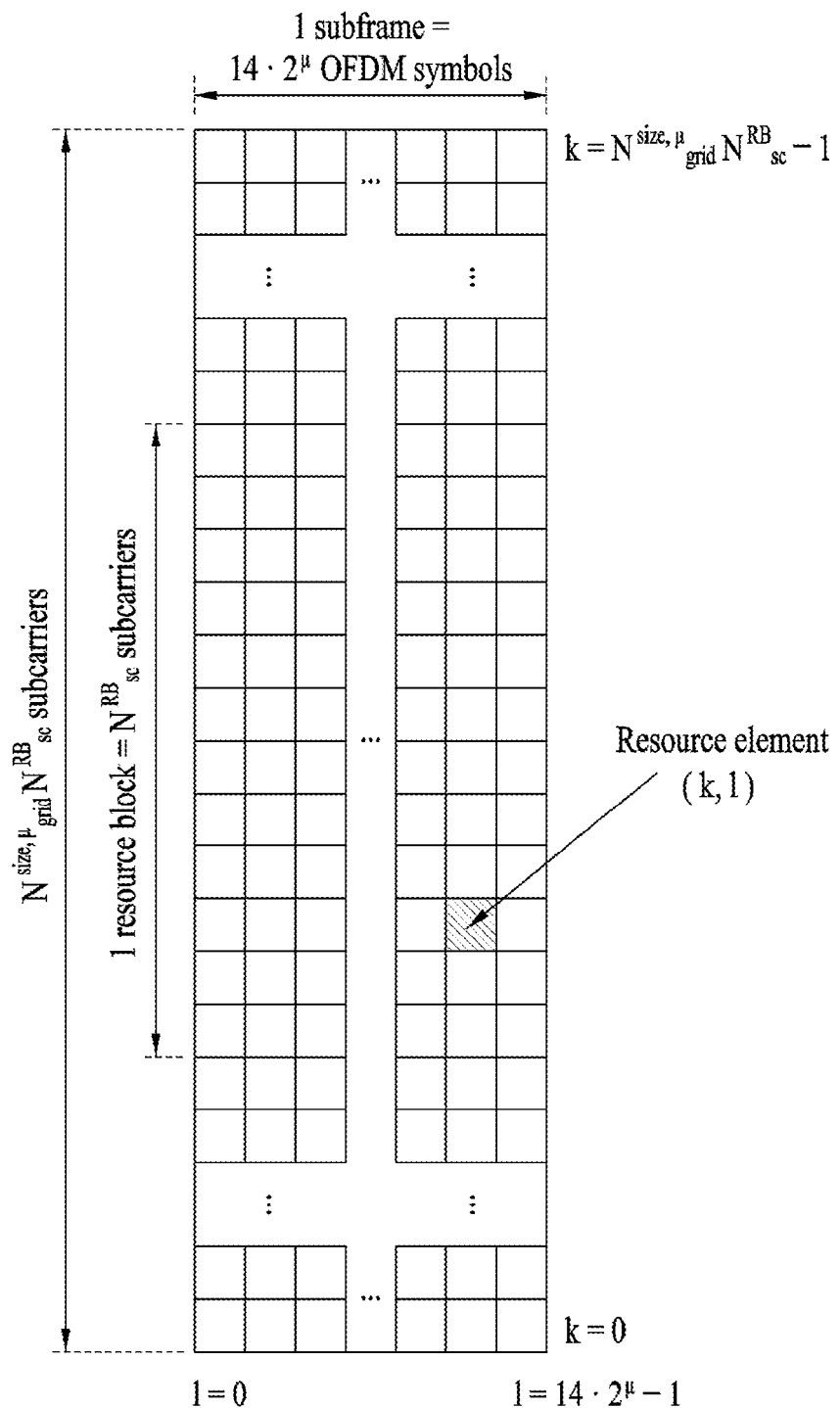
FIG. 1 is a diagram illustrating an exemplary resource grid to which physical signals/channels are mapped in a $3^{rd}$ generation partnership project (3GPP) system.

Reference will now be made in detail to embodiments of the present disclosure, examples of which are illustrated in the accompanying drawings. Wherever possible, the same reference numbers will be used throughout the drawings to refer to the same or like parts, and a redundant description will be avoided. The terms "module" and "unit" are interchangeably used only for easiness of description and thus they should not be considered as having distinctive meanings or roles. Further, a detailed description of well-known technology will not be given in describing embodiments of the present disclosure lest it should obscure the subject matter of the embodiments. The attached drawings are provided to help the understanding of the embodiments of the present disclosure, not limiting the scope of the present disclosure. It is to be understood that the present disclosure covers various modifications, equivalents, and/or alternatives falling within the scope and spirit of the present disclosure.

The following embodiments of the present disclosure are intended to embody the present disclosure, not limiting the scope of the present disclosure. What could easily be derived from the detailed description of the present disclosure and the embodiments by a person skilled in the art is interpreted as falling within the scope of the present disclosure.

The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

Introduction

In the disclosure, downlink (DL) refers to communication from a base station (BS) to a user equipment (UE), and uplink (UL) refers to communication from the UE to the BS. On DL, a transmitter may be a part of the BS and a receiver may be a part of the UE, whereas on UL, a transmitter may be a part of the UE and a receiver may be a part of the BS. A UE may be referred to as a first communication device, and a BS may be referred to as a second communication device in the present disclosure. The term BS may be replaced with fixed station, Node B, evolved Node B (eNB), next generation Node B (gNB), base transceiver system (BTS), access point (AP), network or $5^{th}$ generation (5G) network node, artificial intelligence (AI) system, road side unit (RSU), robot, augmented reality/virtual reality (AR/VR) system, and so on. The term UE may be replaced with terminal, mobile station (MS), user terminal (UT), mobile subscriber station (MSS), subscriber station (SS), advanced mobile station (AMS), wireless terminal (WT), device-to-device (D2D) device, vehicle, robot, AI device (or module), AR/VR device (or module), and so on.

The following technology may be used in various wireless access systems including code division multiple access (CDMA), frequency division multiple access (FDMA), time division multiple access (TDMA), orthogonal frequency division multiple access (OFDMA), and single carrier FDMA (SC-FDMA).

For the convenience of description, the present disclosure is described in the context of a $3^{rd}$ generation partnership project (3GPP) communication system (e.g., long term evolution-advanced (LTE-A) and new radio or new radio access technology (NR)), which should not be construed as limiting the present disclosure. For reference, 3GPP LTE is part of evolved universal mobile telecommunications system (E-UMTS) using evolved UMTS terrestrial radio access (E-UTRA), and LTE-A/LTE-A pro is an evolution of 3GPP LTE. 3GPP NR is an evolution of 3GPP/LTE-A/LTE-A pro.

In the present disclosure, a node refers to a fixed point capable of transmitting/receiving wireless signals by communicating with a UE. Various types of BSs may be used as nodes irrespective of their names. For example, any of a BS, an NB, an eNB, a pico-cell eNB (PeNB), a home eNB (HeNB), a relay, and a repeater may be a node. At least one antenna is installed in one node. The antenna may refer to a physical antenna, an antenna port, a virtual antenna, or an antenna group. A node is also referred to as a point.

In the present disclosure, a cell may refer to a certain geographical area or radio resources, in which one or more nodes provide a communication service. A "cell" as a geographical area may be understood as coverage in which a service may be provided in a carrier, while a "cell" as radio resources is associated with the size of a frequency configured in the carrier, that is, a bandwidth (BW). Because a range in which a node may transmit a valid signal, that is, DL coverage and a range in which the node may receive a valid signal from a UE, that is, UL coverage depend on a carrier carrying the signals, and thus the coverage of the node is associated with the "cell" coverage of radio resources used by the node. Accordingly, the term "cell" may mean the service overage of a node, radio resources, or a range in which a signal reaches with a valid strength in the radio resources, under circumstances.

In the present disclosure, communication with a specific cell may amount to communication with a BS or node that provides a communication service to the specific cell. Further, a DL/UL signal of a specific cell means a DL/UL signal from/to a BS or node that provides a communication service to the specific cell. Particularly, a cell that provides a UL/DL communication service to a UE is called a serving cell for the UE. Further, the channel state/quality of a specific cell refers to the channel state/quality of a channel or a communication link established between a UE and a BS or node that provides a communication service to the specific cell.

A "cell" associated with radio resources may be defined as a combination of DL resources and UL resources, that is, a combination of a DL component carrier (CC) and a UL CC. A cell may be configured with DL resources alone or both DL resources and UL resources in combination. When carrier aggregation (CA) is supported, linkage between the carrier frequency of DL resources (or a DL CC) and the carrier frequency of UL resources (or a UL CC) may be indicated by system information transmitted in a corresponding cell. A carrier frequency may be identical to or different from the center frequency of each cell or CC. Hereinbelow, a cell operating in a primary frequency is referred to as a primary cell (Pcell) or PCC, and a cell operating in a secondary frequency is referred to as a secondary cell (Scell) or SCC. The Scell may be configured after a UE and a BS perform a radio resource control (RRC) connection establishment procedure and thus an RRC connection is established between the UE and the BS, that is, the UE is RRC_CONNECTED. The RRC connection may mean a path in which the RRC of the UE may exchange RRC messages with the RRC of the BS. The Scell may be configured to provide additional radio resources to the UE. The Scell and the Pcell may form a set of serving cells for the UE according to the capabilities of the UE. Only one serving cell configured with a Pcell exists for an RRC_CONNECTED UE which is not configured with CA or does not support CA.

A cell supports a unique radio access technology (RAT). For example, LTE RAT-based transmission/reception is performed in an LTE cell, and 5G RAT-based transmission/reception is performed in a 5G cell.

CA aggregates a plurality of carriers each having a smaller system BW than a target BW to support broadband. CA differs from OFDMA in that DL or UL communication is conducted in a plurality of carrier frequencies each forming a system BW (or channel BW) in the former, and DL or UL communication is conducted by loading a basic frequency band divided into a plurality of orthogonal subcarriers in one carrier frequency in the latter. In OFDMA or orthogonal frequency division multiplexing (OFDM), for example, one frequency band having a certain system BW is divided into a plurality of subcarriers with a predetermined subcarrier spacing, information/data is mapped to the plurality of subcarriers, and the frequency band in which the information/data has been mapped is transmitted in a carrier frequency of the frequency band through frequency upconversion. In wireless CA, frequency bands each having a system BW and a carrier frequency may be used simultaneously for communication, and each frequency band used in CA may be divided into a plurality of subcarriers with a predetermined subcarrier spacing.

The 3GPP communication standards define DL physical channels corresponding to resource elements (REs) conveying information originated from upper layers of the physical layer (e.g., the medium access control (MAC) layer, the radio link control (RLC) layer, the packet data convergence protocol (PDCP) layer, the radio resource control (RRC) layer, the service data adaptation protocol (SDAP) layer, and the non-access stratum (NAS) layer), and DL physical signals corresponding to REs which are used in the physical layer but do not deliver information originated from the upper layers. For example, physical downlink shared channel (PDSCH), physical broadcast channel (PBCH), physical multicast channel (PMCH), physical control format indicator channel (PCFICH), and physical downlink control channel (PDCCH) are defined as DL physical channels, and a reference signal (RS) and a synchronization signal are defined as DL physical signals. An RS, also called a pilot is a signal in a predefined special waveform known to both a BS and a UE. For example, cell specific RS (CRS), UE-specific RS (UE-RS), positioning RS (PRS), channel state information RS (CSI-RS), and demodulation RS (DMRS) are defined as DL RSs. The 3GPP communication standards also define UL physical channels corresponding to REs conveying information originated from upper layers, and UL physical signals corresponding to REs which are used in the physical layer but do not carry information originated from the upper layers. For example, physical uplink shared channel (PUSCH), physical uplink control channel (PUSCH), and physical random access channel (PRACH) are defined as UL physical channels, and DMRS for a UL control/data signal and sounding reference signal (SRS) used for UL channel measurement are defined.

In the present disclosure, physical shared channels (e.g., PUSCH and PDSCH) are used to deliver information originated from the upper layers of the physical layer (e.g., the MAC layer, the RLC layer, the PDCP layer, the RRC layer, the SDAP layer, and the NAS layer).

In the present disclosure, an RS is a signal in a predefined special waveform known to both a BS and a UE. In a 3GPP communication system, for example, the CRS being a cell common RS, the UE-RS for demodulation of a physical channel of a specific UE, the CSI-RS used to measure/estimate a DL channel state, and the DMRS used to demodulate a physical channel are defined as DL RSs, and the DMRS used for demodulation of a UL control/data signal and the SRS used for UL channel state measurement/estimation are defined as UL RSs.

In the present disclosure, a transport block (TB) is payload for the physical layer. For example, data provided to the physical layer by an upper layer or the MAC layer is basically referred to as a TB. A UE which is a device including an AR/VR module (i.e., an AR/VR device) may transmit a TB including AR/VR data to a wireless communication network (e.g., a 5G network) on a PUSCH. Further, the UE may receive a TB including AR/VR data of the 5G network or a TB including a response to AR/VR data transmitted by the UE from the wireless communication network.

In the present disclosure, hybrid automatic repeat and request (HARQ) is a kind of error control technique. An HARQ acknowledgement (HARQ-ACK) transmitted on DL is used for error control of UL data, and a HARQ-ACK transmitted on UL is used for error control of DL data. A transmitter performing an HARQ operation awaits reception of an ACK after transmitting data (e.g., a TB or a codeword). A receiver performing an HARQ operation transmits an ACK only when data has been successfully received, and a negative ACK (NACK) when the received data has an error. Upon receipt of the ACK, the transmitter may transmit (new) data, and upon receipt of the NACK, the transmitter may retransmit the data.

In the present disclosure, CSI generically refers to information representing the quality of a radio channel (or link) established between a UE and an antenna port. The CSI may include at least one of a channel quality indicator (CQI), a precoding matrix indicator (PMI), a CSI-RS resource indicator (CRI), a synchronization signal block resource indicator (SSBRI), a layer indicator (LI), a rank indicator (RI), or a reference signal received power (RSRP).

In the present disclosure, frequency division multiplexing (FDM) is transmission/reception of signals/channels/users in different frequency resources, and time division multiplexing (TDM) is transmission/reception of signals/channels/users in different time resources.

In the present disclosure, frequency division duplex (FDD) is a communication scheme in which UL communication is performed in a UL carrier, and DL communication is performed in a DL carrier linked to the UL carrier, whereas time division duplex (TDD) is a communication scheme in which UL communication and DL communication are performed in time division in the same carrier. In the present disclosure, half-duplex is a scheme in which a communication device operates on UL or UL only in one frequency at one time point, and on DL or UL in another frequency at another time point. For example, when the communication device operates in half-duplex, the communication device communicates in UL and DL frequencies, wherein the communication device performs a UL transmission in the UL frequency for a predetermined time, and retunes to the DL frequency and performs a DL reception in the DL frequency for another predetermined time, in time division, without simultaneously using the UL and DL frequencies.

FIG. 1 is a diagram illustrating an exemplary resource grid to which physical signals/channels are mapped in a 3GPP system.

Referring to FIG. 1, for each subcarrier spacing configuration and carrier, a resource grid of $N^{size,\mu}_{grid} * N^{RB}_{sc}$ subcarriers by $14 \cdot 2^{\mu}$ OFDM symbols is defined. Herein, $N^{size,\mu}_{grid}$ is indicated by RRC signaling from a BS, and $\mu$ represents a subcarrier spacing $\Delta f$ given by $\Delta f = 2^{\mu} * 15$ [kHz] where $\mu \in \{0, 1, 2, 3, 4\}$ in a 5G system.

$N^{size,\mu}_{grid}$ may be different between UL and DL as well as a subcarrier spacing configuration $\mu$. For the subcarrier spacing configuration $\mu$, an antenna port p, and a transmission direction (UL or DL), there is one resource grid. Each element of a resource grid for the subcarrier spacing configuration $\mu$ and the antenna port p is referred to as an RE, uniquely identified by an index pair (k,l) where k is a frequency-domain index and l is the position of a symbol in a relative time domain with respect to a reference point. A frequency unit used for mapping physical channels to REs, resource block (RB) is defined by 12 consecutive subcarriers ($N^{RB}_{sc}=12$) in the frequency domain. Considering that a UE may not support a wide BW supported by the 5G system at one time, the UE may be configured to operate in a part (referred to as a bandwidth part (BWP)) of the frequency BW of a cell.

For the background technology, terminology, and abbreviations used in the present disclosure, standard specifications published before the present disclosure may be referred to. For example, the following documents may be referred to.

3GPP LTE
3GPP TS 36.211: Physical channels and modulation
3GPP TS 36.212: Multiplexing and channel coding
3GPP TS 36.213: Physical layer procedures
3GPP TS 36.214: Physical layer; Measurements
3GPP TS 36.300: Overall description
3GPP TS 36.304: User Equipment (UE) procedures in idle mode
3GPP TS 36.314: Layer 2—Measurements
3GPP TS 36.321: Medium Access Control (MAC) protocol 3GPP TS 36.322: Radio Link Control (RLC) protocol
3GPP TS 36.323: Packet Data Convergence Protocol (PDCP)
3GPP LS 36.331: Radio Resource Control (RRC) protocol
3GPP TS 23.303: Proximity-based services (Prose); Stage 2
3GPP TS 23.285: Architecture enhancements for V2X services
3GPP TS 23.401: General Packet Radio Service (GPRS) enhancements for Evolved Universal Terrestrial Radio Access Network (E-UTRAN) access
3GPP TS 23.402: Architecture enhancements for non-3GPP accesses
3GPP TS 23.286: Application layer support for V2X services; Functional architecture and information flows
3GPP TS 24.301: Non-Access-Stratum (NAS) protocol for Evolved Packet System (EPS); Stage 3
3GPP TS 24.302: Access to the 3GPP Evolved Packet Core (EPC) via non-3GPP access networks; Stage 3
3GPP TS 24.334: Proximity-services (ProSe) User Equipment (UE) to ProSe function protocol aspects; Stage 3
3GPP TS 24.386: User Equipment (UE) to V2X control function; protocol aspects; Stage 3
3GPP NR (e.g. 5G)
3GPP TS 38.211: Physical channels and modulation
3GPP TS 38.212: Multiplexing and channel coding
3GPP FS 38.213: Physical layer procedures for control
3GPP TS 38.214: Physical layer procedures for data
3GPP TS 38.215: Physical layer measurements
3GPP TS 38.300: NR and NG-RAN Overall Description
3GPP TS 38.304: User Equipment (UE) procedures in idle mode and in RRC inactive state
3GPP TS 38.321: Medium Access Control (MAC) protocol
3GPP TS 38.322: Radio Link Control (RLC) protocol
3GPP TS 38.323: Packet Data Convergence Protocol (PDCP)
3GPP TS 38.331: Radio Resource Control (RRC) protocol
3GPP TS 37.324: Service Data Adaptation Protocol (SDAP)
3GPP TS 37.340: Multi-connectivity; Overall description
3GPP TS 23.287: Application layer support for V2X services: Functional architecture and information flows
3GPP TS 23.501: System Architecture for the 5G System
3GPP TS 23.502: Procedures for the 5G System
3GPP TS 23.503: Policy and Charging Control Framework for the 5G System; Stage 2
3GPP TS 24.501: Non-Access-Stratum (NAS) protocol for 5G System (5GS); Stage 3
3GPP TS 24.502: Access to the 3GPP 5G Core Network (5GCN) via non-3GPP access networks
3GPP TS 24.526: User Equipment (UE) policies for 5G System (5GS): Stage 3

Figure 2:
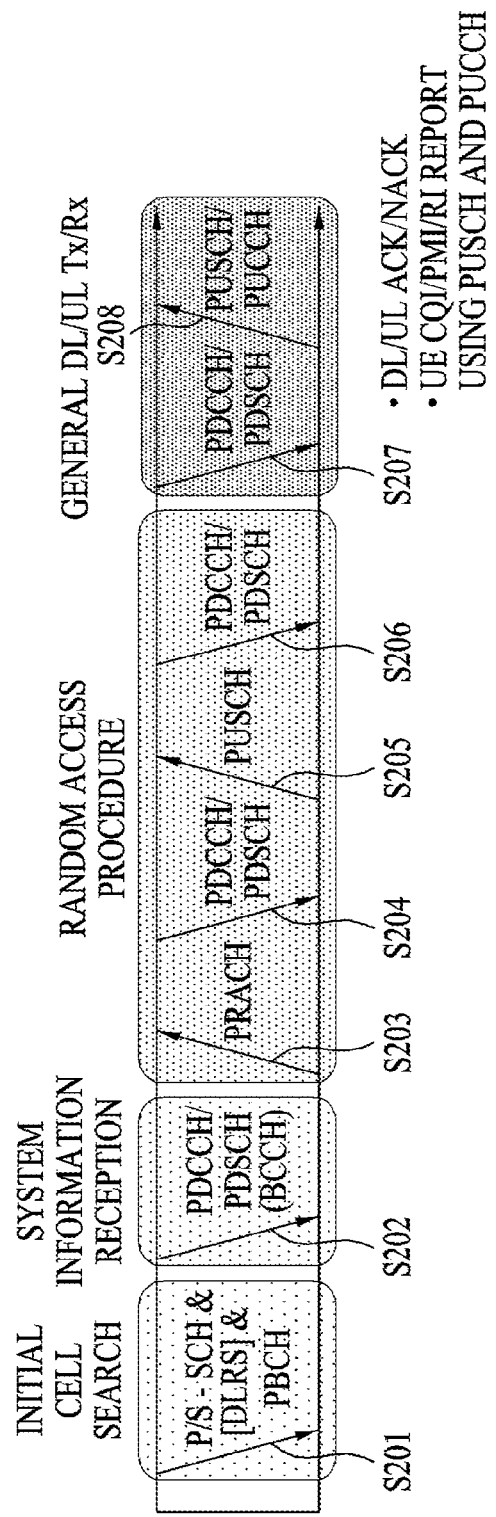
FIG. 2 is a diagram illustrating an exemplary method of transmitting and receiving 3GPP signals.

FIG. 2 is a diagram illustrating an exemplary method of transmitting/receiving 3GPP signals.

Referring to FIG. 2, when a UE is powered on or enters a new cell, the UE performs an initial cell search involving acquisition of synchronization with a BS (S201). For the initial cell search, the UE receives a primary synchronization channel (P-SCH) and a secondary synchronization channel (S-SCH), acquires synchronization with the BS, and obtains information such as a cell identifier (ID) from the P-SCH and the S-SCH. In the LTE system and the NR system, the P-SCH and the S-SCH are referred to as a primary synchronization signal (PSS) and a secondary synchronization signal (SSS), respectively. The initial cell search procedure will be described below in greater detail.

After the initial cell search, the UE may receive a PBCH from the BS and acquire broadcast information within a cell from the PBCH. During the initial cell search, the UE may check a DL channel state by receiving a DL RS.

Upon completion of the initial cell search, the UE may acquire more specific system information by receiving a PDCCH and receiving a PDSCH according to information carried on the PDCCH (S202).

When the UE initially accesses the BS or has no radio resources for signal transmission, the UE may perform a random access procedure with the BS (S203 to S206). For this purpose, the UE may transmit a predetermined sequence as a preamble on a PRACH (S203 and S205) and receive a PDCCH, and a random access response (RAR) message in response to the preamble on a PDSCH corresponding to the PDCCH (S204 and S206). If the random access procedure is contention-based, the UE may additionally perform a contention resolution procedure. The random access procedure will be described below in greater detail.

After the above procedure, the UE may then perform PDCCH/PDSCH reception (S207) and PUSCH/PDCCH transmission (S208) in a general UL/DL signal transmission procedure. Particularly, the UE receives DCI on a PDCCH.

The UE monitors a set of PDCCH candidates in monitoring occasions configured for one or more control element sets (CORESETs) in a serving cell according to a corresponding search space configuration. The set of PDCCH candidates to be monitored by the UE is defined from the perspective of search space sets. A search space set may be a common search space set or a UE-specific search space set. A CORESET includes a set of (physical) RBs that last for a time duration of one to three OFDM symbols. The network may configure a plurality of CORESETs for the UE. The UE monitors PDCCH candidates in one or more search space sets. Herein, monitoring is attempting to decode PDCCH candidate(s) in a search space. When the UE succeeds in decoding one of the PDCCH candidates in the search space, the UE determines that a PDCCH has been detected from among the PDCCH candidates and performs PDSCH reception or PUSCH transmission based on DCI included in the detected PDCCH.

The PDCCH may be used to schedule DL transmissions on a PDSCH and UL transmissions on a PUSCH. DCI in the PDCCH includes a DL assignment (i.e., a DL grant) including at least a modulation and coding format and resource allocation information for a DL shared channel, and a UL grant including a modulation and coding format and resource allocation information for a UL shared channel.

Initial Access (IA) Procedure

Synchronization Signal Block (SSB) Transmission and Related Operation

Figure 3:
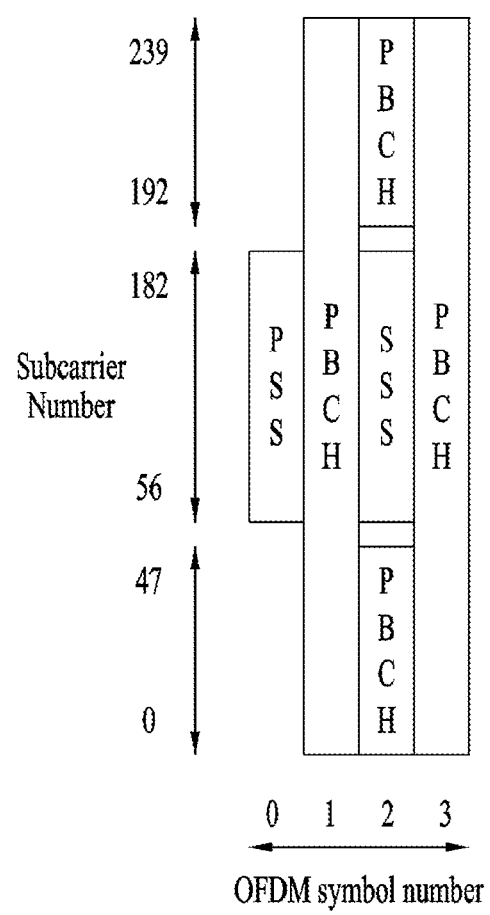
FIG. 3 is a diagram illustrating an exemplary structure of a synchronization signal block (SSB)

FIG. 3 is a diagram illustrating an exemplary SSB structure. The UE may perform cell search, system information acquisition, beam alignment for initial access, DL measurement, and so on, based on an SSB. The term SSB is interchangeably used with synchronization signal/physical broadcast channel (SS/PBCH).

Referring to FIG. 3, an SSB includes a PSS, an SSS, and a PBCH. The SSB includes four consecutive OFDM symbols, and the PSS, the PBCH, the SSS/PBCH, or the PBCH is transmitted in each of the OFDM symbols. The PBCH is encoded/decoded based on a polar code and modulated/demodulated in quadrature phase shift keying (QPSK). The PBCH in an OFDM symbol includes data REs to which a complex modulated value of the PBCH is mapped and DMRS REs to which a DMRS for the PBCH is mapped. There are three DMRS REs per RB in an OFDM symbol and three data REs between every two of the DMRS REs.

Cell Search

Cell search is a process of acquiring the time/frequency synchronization of a cell and detecting the cell ID (e.g., physical cell ID (PCI)) of the cell by a UE. The PSS is used to detect a cell ID in a cell ID group, and the SSS is used to detect the cell ID group. The PBCH is used for SSB (time) index detection and half-frame detection.

In the 5G system, there are 336 cell ID groups each including 3 cell IDs. Therefore, a total of 1008 cell IDs are available. Information about a cell ID group to which the cell ID of a cell belongs is provided/acquired by/from the SSS of the cell, and information about the cell ID among 336 cells within the cell ID is provided/acquired by/from the PSS.

The SSB is periodically transmitted with an SSB periodicity. The UE assumes a default SSB periodicity of 20 ms during initial cell search. After cell access, the SSB periodicity may be set to one of {5 ms, 10 ms, 20 ms, 40 ms, 80 ms, 160 ms} by the network (e.g., a BS). An SSB burst set is configured at the start of an SSB period. The SSB burst set is composed of a 5-ms time window (i.e., half-frame), and the SSB may be transmitted up to L times within the SSB burst set. The maximum number L of SSB transmissions may be given as follows according to the frequency band of a carrier.

For frequency range up to 3 GHz. L=4
For frequency range from 3 GHz to 6 GHz, L=8
For frequency range from 6 GHz to 52.6 GHz, L=64

The possible time positions of SSBs in a half-frame are determined by a subcarrier spacing, and the periodicity of half-frames carrying SSBs is configured by the network. The time positions of SSB candidates are indexed as 0 to L−1 (SSB indexes) in a time order in an SSB burst set (i.e., half-frame). Other SSBs may be transmitted in different spatial directions (by different beams spanning the coverage area of the cell) during the duration of a half-frame. Accordingly, an SSB index (SSBI) may be associated with a BS transmission (Tx) beam in the 5G system.

The UE may acquire DL synchronization by detecting an SSB. The UE may identify the structure of an SSB burst set based on a detected (time) SSBI and hence a symbol/slot/half-frame boundary. The number of a frame/half-frame to which the detected SSB belongs may be identified by using system frame number (SFN) information and half-frame indication information.

Specifically, the UL may acquire the 10-bit SFN of a frame carrying the PBCH from the PBCH. Subsequently, the UE may acquire 1-bit half-frame indication information. For example, when the UE detects a PBCH with a half-frame indication bit set to 0, the UE may determine that an SSB to which the PBCH belongs is in the first half-frame of the frame. When the UE detects a PBCH with a half-frame indication bit set to 1, the UE may determine that an SSB to which the PBCH belongs is in the second half-frame of the frame. Finally, the UE may acquire the SSBI of the SSB to which the PBCH belongs based on a DMRS sequence and PBCH payload delivered on the PBCH.

System Information (SI) Acquisition

SI is divided into a master information block (MIB) and a plurality of system information blocks (SIBs). The SI except for the MIB may be referred to as remaining minimum system information (RMSI). For details, the following may be referred to.

The MIB includes information/parameters for monitoring a PDCCH that schedules a PDSCH carrying systemInformationBlock1 (SIB1), and transmitted on a PBCH of an SSB by a BS. For example, a UE may determine from the MIB whether there is any CORESET for a Type0-PDCCH common search space. The Type0-PDCCH common search space is a kind of PDCCH search space and used to transmit a PDCCH that schedules an SI message. In the presence of a Type0-PDCCH common search space, the UE may determine (1) a plurality of contiguous RBs and one or more consecutive symbols included in a CORESET, and (ii) a PDCCH occasion (e.g., a time-domain position at which a PDCCH is to be received), based on information (e.g., pdcch-ConfigSIB1) included in the MIB.

S1131 includes information related to availability and scheduling (e.g., a transmission period and an SI-window size) of the remaining SIBs (hereinafter, referred to SIBx where x is an integer equal to or larger than 2). For example, SIB1 may indicate whether SIBx is broadcast periodically or in an on-demand manner upon user request. If SIBx is provided in the on-demand manner, SIB1 may include information required for the UE to transmit an SI request. A PDCCH that schedules SIB1 is transmitted in the Type0-PDCCH common search space, and SIB1 is transmitted on a PDSCH indicated by the PDCCH.

SIBx is included in an SI message and transmitted on a PDSCH. Each SI message is transmitted within a periodic time window (i.e., SI-window).

Random Access Procedure

The random access procedure serves various purposes. For example, the random access procedure may be used for network initial access, handover, and UE-triggered UL data transmission. The EL may acquire UL synchronization and UL transmission resources in the random access procedure. The random access procedure may be contention-based or contention-free.

Figure 4:
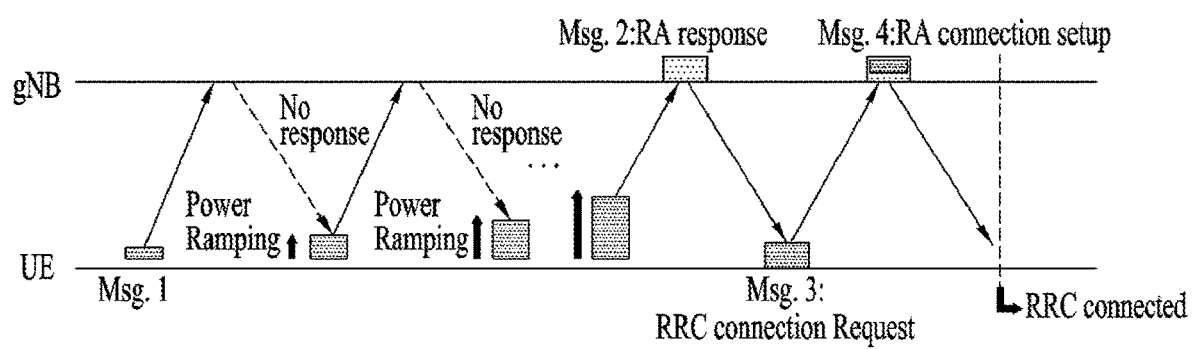
FIG. 4 is a diagram illustrating an exemplary random access procedure.

FIG. 4 is a diagram illustrating an exemplary random access procedure. Particularly. FIG. 4 illustrates a contention-based random access procedure.

First, a UE may transmit a random access preamble as a first message (Msg1) of the random access procedure on a PRACH. In the present disclosure, a random access procedure and a random access preamble are also referred to as a RACH procedure and a RACH preamble, respectively.

A plurality of preamble formats are defined by one or more RACE OFDM symbols and different cyclic prefixes (CPs) (and/or guard times). A RACH configuration for a cell is included in system information of the cell and provided to the UE. The RACH configuration includes information about a subcarrier spacing, available preambles, a preamble format, and so on for a PRACH. The RACH configuration includes association information between SSBs and RACH (time-frequency) resources, that is, association information between SSBIs and RACH (time-frequency) resources. The SSBIs are associated with Tx beams of a BS, respectively. The UE transmits a RACH preamble in RACE time-frequency resources associated with a detected or selected SSB. The BS may identify a preferred BS Tx beam of the UE based on time-frequency resources in which the RACH preamble has been detected.

An SSB threshold for RACE resource association may be configured by the network, and a RACH preamble transmission (i.e., PRACH transmission) or retransmission is performed based on an SSB in which an RSRP satisfying the threshold has been measured. For example, the UE may select one of SSB(s) satisfying the threshold and transmit or retransmit the RACH preamble in RACH resources associated with the selected SSB.

Upon receipt of the RACH preamble from the UE, the BS transmits an RAR message (a second message (Msg2)) to the UE. A PDCCH that schedules a PDSCH carrying the RAR message is cyclic redundancy check (CRC)-masked by an RA radio network temporary identifier (RNTI) (RA-RNTI) and transmitted. When the UE detects the PDCCH masked by the RA-RNTI, the UE may receive the RAR message on the PDSCH scheduled by DCI delivered on the PDCCH. The UE determines whether RAR information for the transmitted preamble, that is, Msg1 is included in the RAR message. The UE may determine whether random access information for the transmitted Msg1 is included by checking the presence or absence of the RACH preamble ID of the transmitted preamble. If the UE fails to receive a response to Msg1, the UE may transmit the RACH preamble a predetermined number of or fewer times, while performing power ramping. The UE calculates the PRACH transmission power of a preamble retransmission based on the latest pathloss and a power ramping counter.

Upon receipt of the RAR information for the UE on the PDSCH, the UE may acquire timing advance information for UL synchronization, an initial UL grant, and a UE temporary cell RNTI (C-RNTI). The timing advance information is used to control a UL signal transmission timing. To enable better alignment between PUSCH/PUCCH transmission of the UE and a subframe timing at a network end, the network (e.g., BS) may measure the time difference between PUSCH/PUCCH/SRS reception and a subframe and transmit the timing advance information based on the measured time difference. The UE may perform a UL transmission as a third message (Msg3) of the RACH procedure on a PUSCH. Msg3 may include an RRC connection request and a UE ID. The network may transmit a fourth message (Msg4) in response to Msg3, and Msg4 may be treated as a contention solution message on DL. As the UE receives Msg4, the UE may enter an RRC_CONNECTED state.

The contention-free RACH procedure may be used for handover of the UE to another cell or BS or performed when requested by a BS command. The contention-free RACH procedure is basically similar to the contention-based RACH procedure. However, compared to the contention-based RACH procedure in which a preamble to be used is randomly selected among a plurality of RACH preambles, a preamble to be used by the UE (referred to as a dedicated RACH preamble) is allocated to the UE by the BS in the contention-free RACH procedure. Information about the dedicated RACH preamble may be included in an RRC message (e.g., a handover command) or provided to the UE by a PDCCH order. When the RACH procedure starts, the UE transmits the dedicated RACH preamble to the BS. When the UE receives the RACH procedure from the BS, the RACH procedure is completed.

DL and UL Transmission/Reception Operations

DL Transmission/Reception Operation

DL grants (also called DL assignments) may be classified into (1) dynamic grant and (2) configured grant. A dynamic grant is a data transmission/reception method based on dynamic scheduling of a BS, aiming to maximize resource utilization.

The BS schedules a DL transmission by DCI. The UE receives the DCI for DL scheduling (i.e., including scheduling information for a PDSCH) (referred to as DL grant DCI) from the BS. The DCI for DL scheduling may include, for example, the following information: a BWP indicator, a frequency-domain resource assignment, a time-domain resource assignment, and a modulation and coding scheme (MCS).

The UE may determine a modulation order, a target code rate, and a TB size (TBS) for the PDSCH based on an MCS field in the DCI. The UE may receive the PDSCH in time-frequency resources according to the frequency-domain resource assignment and the time-domain resource assignment.

The DL configured grant is also called semi-persistent scheduling (SPS). The UE may receive an RRC message including a resource configuration for DL data transmission from the BS. In the case of DL SPS, an actual DL configured grant is provided by a PDCCH, and the DL SPS is activated or deactivated by the PDCCH. When DL SPS is configured, the BS provides the UE with at least the following parameters by RRC signaling: a configured scheduling RNTI (CS-RNTI) for activation, deactivation, and retransmission; and a periodicity. An actual DL grant (e.g., a frequency resource assignment) for DL SPS is provided to the UE by DCI in a PDCCH addressed to the CS-RNTI. If a specific field in the DCI of the PDCCH addressed to the CS-RNTI is set to a specific value for scheduling activation, SPS associated with the CS-RNTI is activated. The DCI of the PDCCH addressed to the CS-RNTI includes actual frequency resource allocation information, an MCS index, and so on. The UE may receive DL data on a PDSCH based on the SPS.

UL Transmission/Reception Operation

UL grants may be classified into (1) dynamic grant that schedules a PUSCH dynamically by UL grant DCI and (2) configured grant that schedules a PUSCH semi-statically by RRC signaling.

FIG. 5 is a diagram illustrating exemplary UL transmissions according to UL grants. Particularly, FIG. 5(a) illustrates a UL transmission procedure based on a dynamic grant, and FIG. 5(b) illustrates a UL transmission procedure based on a configured grant.

In the case of a UL dynamic grant, the BS transmits DCI including UL scheduling information to the UE. The UE receives DCI for UL scheduling (i.e., including scheduling information for a PUSCH) (referred to as UL grant DCI) on a PDCCH. The DCI for UL scheduling may include, for example, the following information: a BWP indicator, a frequency-domain resource assignment, a time-domain resource assignment, and an MCS. For efficient allocation of UL radio resources by the BS, the UL may transmit information about UL data to be transmitted to the BS, and the BS may allocate UL resources to the UE based on the information. The information about the UL data to be transmitted is referred to as a buffer status report (BSR), and the BSR is related to the amount of UL data stored in a buffer of the UE.

Referring to FIG. 5(a), the illustrated UL transmission procedure is for a UE which does not have UL radio resources available for BSR transmission. In the absence of a UL grant available for UL data transmission, the UE is not capable of transmitting a BSR on a PUSCH. Therefore, the UE should request resources for UL data, starting with transmission of an SR on a PDCCH. In this case, a 5-step UL resource allocation procedure is used.

Referring to FIG. 5(a), in the absence of PUSCH resources for BSR transmission, the UE first transmits an SR to the BS, for PUSCH resource allocation. The SR is used for the UE to request PUSCH resources for UL transmission to the BS, when no PUSCH resources are available to the UE in spite of occurrence of a buffer status reporting event. In the presence of valid PUCCH resources for the SR, the UE transmits the SR on a PUCCH, whereas in the absence of valid PUCCH resources for the SR, the UE starts the afore-described (contention-based) RACH procedure. Upon receipt of a UL grant in UL grant DCI from the BS, the UE transmits a BSR to the BS in PUSCH resources allocated by the UL grant. The BS checks the amount of UL data to be transmitted by the UE based on the BSR and transmits a UL grant in UL grant DCI to the UE. Upon detection of a PDCCH including the UL grant DCI, the UE transmits actual UL data to the BS on a PUSCH based on the UL grant included in the UL grant DCI.

Referring to FIG. 5(b), in the case of a configured grant, the UE receives an RRC message including a resource configuration for UL data transmission from the BS. In the NR system, two types of UL configured grants are defined: type 1 and type 2. In the case of UL configured grant type 1, an actual UL grant (e.g., time resources and frequency resources) is provided by RRC signaling, whereas in the case of UL configured grant type 2, an actual UL grant is provided by a PDCCH, and activated or deactivated by the PDCCH. If configured grant type 1 is configured, the BS provides the UE with at least the following parameters by RRC signaling: a CS-RNTI for retransmission; a periodicity of configured grant type 1; information about a starting symbol index S and the number L of symbols for a PUSCH in a slot; a time-domain offset representing a resource offset with respect to SFN=0 in the time domain; and an MCS index representing a modulation order, a target code rate, and a TB size. If configured grant type 2 is configured, the BS provides the UE with at least the following parameters by RRC signaling: a CS-RNTI for activation, deactivation, and retransmission; and a periodicity of configured grant type 2. An actual UL grant of configured grant type 2 is provided to the UE by DCI of a PDCCH addressed to a CS-RNTI. If a specific field in the DCI of the PDCCH addressed to the CS-RNTI is set to a specific value for scheduling activation, configured grant type 2 associated with the CS-RNTI is activated. The DCI set to a specific value for scheduling activation in the PDCCH includes actual frequency resource allocation information, an MCS index, and so on. The UE may perform a UL transmission on a PUSCH based on a configured grant of type 1 or type 2.

Figure 6:
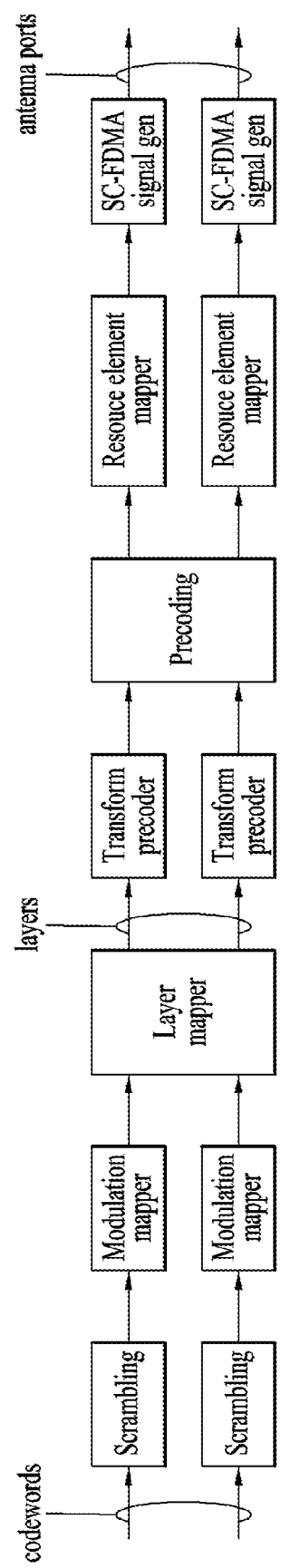
FIG. 6 is a conceptual diagram illustrating exemplary physical channel processing.

FIG. 6 is a conceptual diagram illustrating exemplary physical channel processing.

Each of the blocks illustrated in FIG. 6 may be performed in a corresponding module of a physical layer block in a transmission device. More specifically, the signal processing depicted in FIG. 6 may be performed for UL transmission by a processor of a UE described in the present disclosure. Signal processing of FIG. 6 except for transform precoding, with CP-OFDM signal generation instead of SC-FDMA signal generation may be performed for DL transmission in a processor of a BS described in the present disclosure. Referring to FIG. 6, UL physical channel processing may include scrambling, modulation mapping, layer mapping, transform precoding, precoding, RE mapping, and SC-FDMA signal generation. The above processes may be performed separately or together in the modules of the transmission device. The transform precoding, a kind of discrete Fourier transform (DFT), is to spread UL data in a special manner that reduces the peak-to-average power ratio (PAPR) of a waveform. OFDM which uses a CP together with transform precoding for DFT spreading is referred to as DFT-s-OFDM, and OFDM using a CP without DFT spreading is referred to as CP-OFDM. An SC-FDMA signal is generated by DFT-s-OFDM. In the NR system, if transform precoding is enabled for UL, transform precoding may be applied optionally. That is, the NR system supports two options for a UL waveform: one is CP-OFDM and the other is DFT-s-OFDM. The BS provides RRC parameters to the UE such that the UE determines whether to use CP-OFDM or DFT-s-OFDM for a UL transmission waveform. FIG. 6 is a conceptual view illustrating UL physical channel processing for DFT-s-OFDM. For CP-OFDM, transform precoding is omitted from the processes of FIG. 6. For DL transmission, CP-OFDM is used for DL waveform transmission.

Each of the above processes will be described in greater detail. For one codeword, the transmission device may scramble coded bits of the codeword by a scrambler and then transmit the scrambled bits on a physical channel. The codeword is obtained by encoding a TB. The scrambled bits are modulated to complex-valued modulation symbols by a modulation mapper. The modulation mapper may modulate the scrambled bits in a predetermined modulation scheme and arrange the modulated bits as complex-valued modulation symbols representing positions on a signal constellation. Pi/2-binary phase shift keying (pi/2-BPSK), m-phase shift keying (m-PSK), m-quadrature amplitude modulation (m-QAM), or the like is available for modulation of the coded data. The complex-valued modulation symbols may be mapped to one or more transmission layers by a layer mapper. A complexed-value modulation symbol on each layer may be precoded by a precoder, for transmission through an antenna port. If transform precoding is possible for UL transmission, the precoder may perform precoding after the complex-valued modulation symbols are subjected to transform precoding, as illustrated in FIG. 6. The precoder may output antenna-specific symbols by processing the complex-valued modulation symbols in a multiple input multiple output (MIMO) scheme according to multiple Tx antennas, and distribute the antenna-specific symbols to corresponding RE mappers. An output z of the precoder may be obtained by multiplying an output y of the layer mapper by an N×M precoding matrix. W where N is the number of antenna ports and M is the number of layers. The RE mappers map the complex-valued modulation symbols for the respective antenna ports to appropriate REs in an RB allocated for transmission. The RE mappers may map the complex-valued modulation symbols to appropriate subcarriers, and multiplex the mapped symbols according to users. SC-FDMA signal generators (CP-OFDM signal generators, when transform precoding is disabled in DL transmission or UL transmission) may generate complex-valued time domain OFDM symbol signals by modulating the complex-valued modulation symbols in a specific modulations scheme, for example, in OFDM. The SC-FDMA signal generators may perform inverse fast Fourier transform (IFFT) on the antenna-specific symbols and insert CPs into the time-domain IFFT-processed symbols. The OFDM symbols are subjected to digital-to-analog conversion, frequency upconversion, and so on, and then transmitted to a reception device through the respective Tx antennas. Each of the SC-FDMA signal generators may include an IFFT module, a CP inserter, a digital-to-analog converter (DAC), a frequency upconverter, and so on.

A signal processing procedure of the reception device is performed in a reverse order of the signal processing procedure of the transmission device. For details, refer to the above description and FIG. 6.

Now, a description will be given of the PUCCH.

The PUCCH is used for UCI transmission. UCI includes an SR requesting UL transmission resources, CSI representing a UE-measured DL channel state based on a DL RS, and/or an HARQ-ACK indicating whether a UE has successfully received DL data.

The PUCCH supports multiple formats, and the PUCCH formats are classified according to symbol durations, payload sizes, and multiplexing or non-multiplexing. [Table 1] below lists exemplary PUCCH formats.

TABLE 1

| Format | PUCCH length in OFDM symbols | Number of bits | Etc. |
|---|---|---|---|
| 0 | 1-2 | ≤2 | Sequence selection |
| 1 | 4-14 | ≤2 | Sequence modulation |
| 2 | 1-2 | >2 | CP-OFDM |
| 3 | 4-14 | >2 | DFT-s-OFDM (no UE multiplexing) |
| 4 | 4-14 | >2 | DFT-s-OFDM (Pre DFT orthogonal cover code(OCC)) |

The BS configures PUCCH resources for the UE by RRC signaling. For example, to allocate PUCCH resources, the BS may configure a plurality of PUCCH resource sets for the UE, and the UE may select a specific PUCCH resource set corresponding to a UCI (payload) size (e.g., the number of UCI bits). For example, the UE may select one of the following PUCCH resource sets according to the number of UCI bits, $N_{UCI}$.

PUCCH resource set #0, if the number of UCI bits ≤ 2
PUCCH resource set #1, if 2 < the number of UCI bits ≤ $N_1$
...
PUCCH resource set #(K-1), if $N_{K-2}$ < the number of UCI bits ≤ $N_{K1}$ Herein, K represents the number of PUCCH resource sets (K>1), and Ni represents the maximum number of UCI bits supported by PUCCH resource set #i. For example, PUCCH resource set #1 may include resources of PUCCH format 0 to PUCCH format 1, and the other PUCCH resource sets may include resources of PUCCH format 2 to PUCCH format 4.

Subsequently, the BS may transmit DCI to the UE on a PDCCH, indicating a PUCCH resource to be used for UCI transmission among the PUCCH resources of a specific PUCCH resource set by an ACK/NACK resource indicator (ARI) in the DCI. The ARI may be used to indicate a PUCCH resource for HARQ-ACK transmission, also called a PUCCH resource indicator (PRI).

Enhanced Mobile Broadband Communication (eMBB)

In the NR system, a massive MIMO environment in which the number of Tx/Rx antennas is significantly increased is under consideration. On the other hand, in an NR system operating at or above 6 GHz, beamforming is considered, in which a signal is transmitted with concentrated energy in a specific direction, not omni-directionally, to compensate for rapid propagation attenuation. Accordingly, there is a need for hybrid beamforming with analog beamforming and digital beamforming in combination according to a position to which a beamforming weight vector/precoding vector is applied, for the purpose of increased performance, flexible resource allocation, and easiness of frequency-wise beam control.

Hybrid Beamforming

Figure 7:
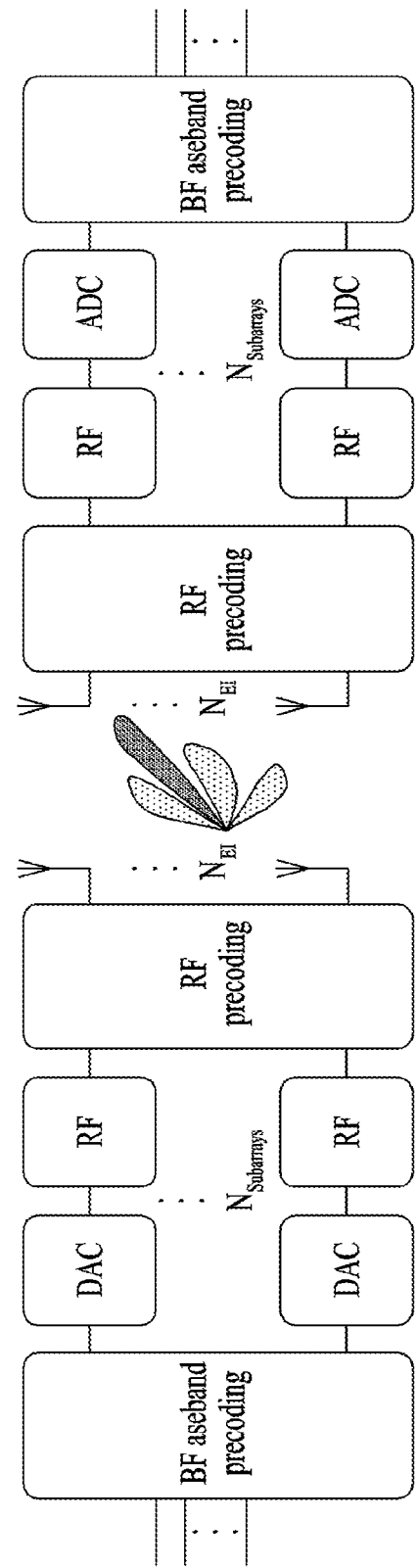
FIG. 7 is a block diagram illustrating an exemplary transmitter and receiver for hybrid beamforming.

FIG. 7 is a block diagram illustrating an exemplary transmitter and receiver for hybrid beamforming.

In hybrid beamforming, a BS or a UE may form a narrow beam by transmitting the same signal through multiple antennas, using an appropriate phase difference and thus increasing energy only in a specific direction.

Beam Management (BM)

BM is a series of processes for acquiring and maintaining a set of BS (or transmission and reception point (TRP)) beams and/or UE beams available for DL and UL transmissions/receptions. BM may include the following processes and terminology.

Beam measurement: the BS or the UE measures the characteristics of a received beamformed signal.

Beam determination: the BS or the UE selects its Tx beam/Rx beam.

Beam sweeping: a spatial domain is covered by using a Tx beam and/or an Rx beam in a predetermined method for a predetermined time interval.

Beam report: the UE reports information about a signal beamformed based on a beam measurement.

The BM procedure may be divided into (1) a DL BM procedure using an SSB or CSI-RS and (2) a UL BM procedure using an SRS. Further, each BM procedure may include Tx beam sweeping for determining a Tx beam and Rx beam sweeping for determining an Rx beam. The following description will focus on the DL BM procedure using an SSB.

The DL BM procedure using an SSB may include (1) transmission of a beamformed SSB from the BS and (2) beam reporting of the UE. An SSB may be used for both of Tx beam sweeping and Rx beam sweeping. SSB-based Rx beam sweeping may be performed by attempting SSB reception while changing Rx beams at the UE.

SSB-based beam reporting may be configured, when CSI/beam is configured in the RRC_CONNECTED state.

The UE receives information about an SSB resource set used for BM from the BS. The SSB resource set may be configured with one or more SSBIs. For each SSB resource set, SSBI 0 to SSBI 63 may be defined.

The UE receives signals in SSB resources from the BS based on the information about the SSB resource set.

When the BS configures the UE with an SSBRI and RSRP reporting, the UE reports a (best) SSBRI and an RSRP corresponding to the SSBRI to the BS.

The BS may determine a BS Tx beam for use in DL transmission to the UE based on a beam report received from the UE.

Beam Failure Recovery (BFR) Procedure

In a beamforming system, radio link failure (RLF) may often occur due to rotation or movement of a UE or beamforming blockage. Therefore, BFR is supported to prevent frequent occurrence of RLF in NR.

For beam failure detection, the BS configures beam failure detection RSs for the UE. If the number of beam failure indications from the physical layer of the UE reaches a threshold configured by RRC signaling within a period configured by RRC signaling of the BS, the UE declares beam failure.

After the beam failure is detected, the UE triggers BFR by initiating a RACH procedure on a Pcell. and performs BFR by selecting a suitable beam (if the BS provides dedicated RACH resources for certain beams, the UE performs the RACH procedure for BFR by using the dedicated RACH resources first of all). Upon completion of the RACH procedure, the UE considers that the BFR has been completed.

Ultra-Reliable and Low Latency Communication (URLLC)

A URLLC transmission defined in NR may mean a transmission with (1) a relatively small traffic size, (2) a relatively low arrival rate, (3) an extremely low latency requirement (e.g., 0.5 ms or 1 ms). (4) a relatively short transmission duration (e.g., 2 OFDM symbols), and (5) an emergency service/message.

Pre-Emption Indication

Although eMBB and URLLC services may be scheduled in non-overlapped time/frequency resources, a URLLC transmission may take place in resources scheduled for on-going eMBB traffic. To enable a UE receiving a PDSCH to determine that the PDSCH has been partially punctured due to URLLC transmission of another UE, a preemption indication may be used. The preemption indication may also be referred to as an interrupted transmission indication.

In relation to a preemption indication, the UE receives DL preemption RRC information (e.g., a DownlinkPreemption IE) from the BS by RRC signaling.

The UE receives DCI format 2_1 based on the DL preemption RRC information from the BS. For example, the UE attempts to detect a PDCCH conveying preemption indication-related DCI, DCI format 2_1 by using an int-RNTI configured by the DL preemption RRC information.

Upon detection of DCI format 2_1 for serving cell(s) configured by the DL preemption RRC information, the UE may assume that there is no transmission directed to the UE in RBs and symbols indicated by DCI format 2_1 in a set of RBs and a set of symbols during a monitoring interval shortly previous to a monitoring interval to which DCI format 2_1 belongs. For example, the UE decodes data based on signals received in the remaining resource areas, considering that a signal in a time-frequency resource indicated by a preemption indication is not a DL transmission scheduled for the UE.

Massive MTC (mMTC)

mMTC is one of 5G scenarios for supporting a hyper-connectivity service in which communication is conducted with multiple UEs at the same time. In this environment, a UE intermittently communicates at a very low transmission rate with low mobility. Accordingly, mMTC mainly seeks long operation of a UE with low cost. In this regard, MTC and narrow band-Internet of things (NB-IoT) handled in the 3GPP will be described below.

The following description is given with the appreciation that a transmission time interval (TTI) of a physical channel is a subframe. For example, a minimum time interval between the start of transmission of a physical channel and the start of transmission of the next physical channel is one subframe. However, a subframe may be replaced with a slot, a mini-slot, or multiple slots in the following description.

Machine Type Communication (MTC)

MTC is an application that does not require high throughput, applicable to machine-to-machine (M2M) or IoT. MTC is a communication technology which the 3GPP has adopted to satisfy the requirements of the IoT service.

While the following description is given mainly of features related to enhanced MTC (eMTC), the same thing is applicable to MTC, eMTC, and MTC to be applied to 5G (or NR), unless otherwise mentioned. The term MTC as used herein may be interchangeable with eMTC, LTE-M1/M2, bandwidth reduced low complexity (BL)/coverage enhanced (CE), non-BL UE (in enhanced coverage), NR MTC, enhanced BL/CE, and so on.

MTC General (1) MTC operates only in a specific system BW (or channel BW).

MTC may use a predetermined number of RBs among the RBs of a system band in the legacy LTE system or the NR system. The operating frequency BW of MTC may be defined in consideration of a frequency range and a subcarrier spacing in NR. A specific system or frequency BW in which MTC operates is referred to as an MTC narrowband (NB) or MTC subband. In NR. MTC may operate in at least one BWP or a specific band of a BWP.

While MTC is supported by a cell having a much larger BW (e.g., 10 MHz) than 1.08 MHz, a physical channel and signal transmitted/received in MTC is always limited to 1.08 MHz or 6 (LTE) RBs. For example, a narrowband is defined as 6 non-overlapped consecutive physical resource blocks (PRBs) in the frequency domain in the LTE system.

Figure 8:
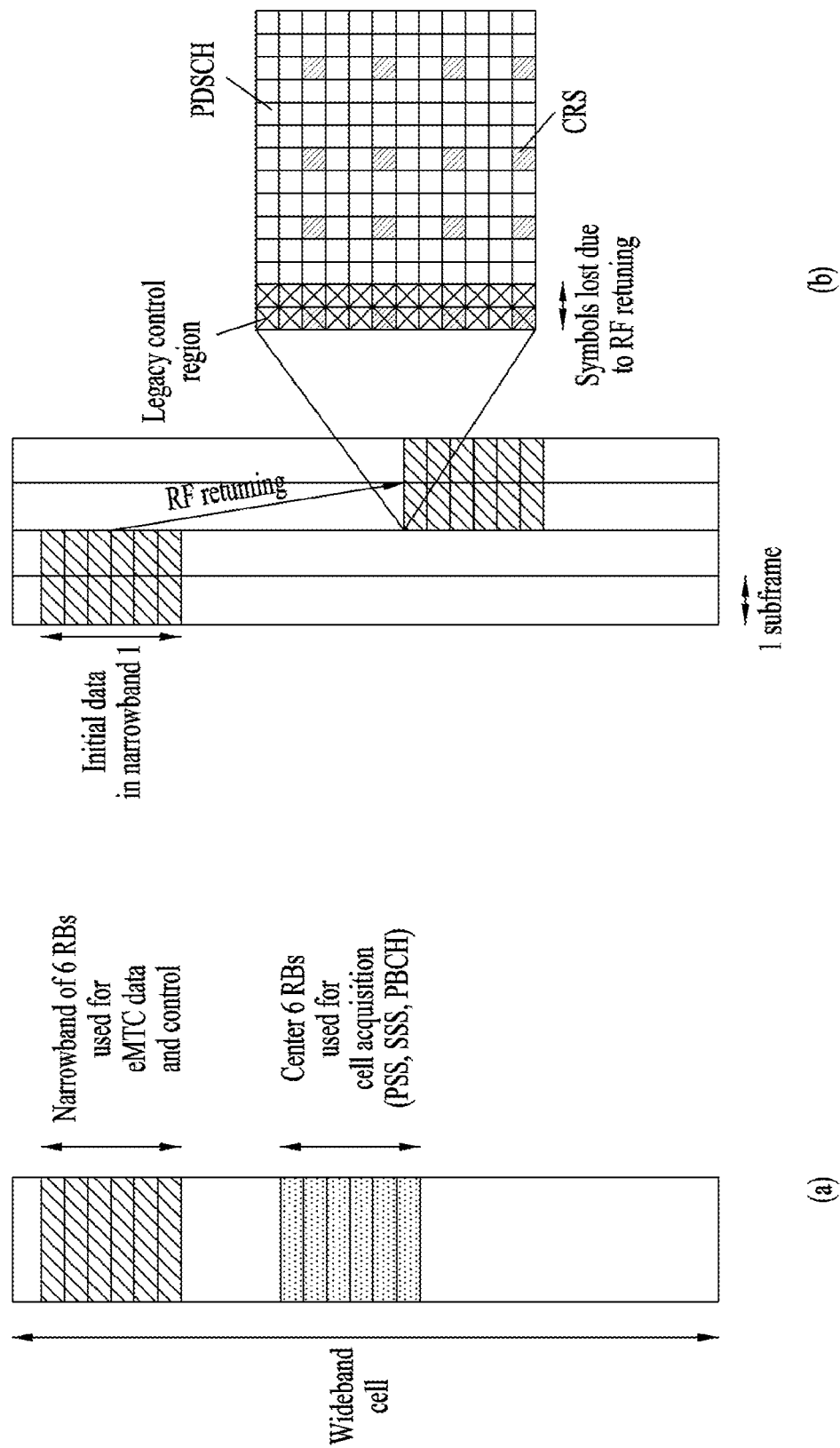
FIG. 8 shows diagrams where (a) is a diagram illustrating an exemplary narrowband operation, and (b) is a diagram illustrating exemplary machine type communication (MTC) channel repetition with radio frequency (RF) retuning.

In MTC, some DL and UL channels are allocated restrictively within a narrowband, and one channel does not occupy a plurality of narrowbands in one time unit. FIG. 8(a) is a diagram illustrating an exemplary narrowband operation, and FIG. 8(b) is a diagram illustrating exemplary MTC channel repetition with RF retuning.

An MTC narrowband may be configured for a UE by system information or DCI transmitted by a BS.

(2) MTC does not use a channel (defined in legacy LTE or NR) which is to be distributed across the total system BW of the legacy LTE or NR. For example, because a legacy LTE PDCCH is distributed across the total system BW, the legacy PDCCH is not used in MTC. Instead, a new control channel. MTC PDCCH (MPDCCH) is used in MTC. The MPDCCH is transmitted/received in up to 6 RBs in the frequency domain. In the time domain, the MPDCCH may be transmitted in one or more OFDM symbols starting with an OFDM symbol of a starting OFDM symbol index indicated by an RRC parameter from the BS among the OFDM symbols of a subframe.

(3) In MTC, PBCH, PRACH, MPDCCH, PDSCH, PUCCH, and PUSCH may be transmitted repeatedly. The MTC repeated transmissions may make these channels decodable even when signal quality or power is very poor as in a harsh condition like basement, thereby leading to the effect of an increased cell radius and signal penetration.

MTC Operation Modes and Levels

For CE, two operation modes, CE Mode A and CE Mode B and four different CE levels are used in MTC, as listed in [Table 2] below.

TABLE 2

| Mode | Level | Description |
|---|---|---|
| Mode A | Level 1 | No repetition for PRACH |
|  | Level 2 | Small Number of Repetition for PRACH |
| Mode B | Level 3 | Medium Number of Repetition for PRACH |
|  | Level 4 | Large Number of Repetition for PRACH |

An MTC operation mode is determined by a BS and a CE level is determined by an MTC UE.

MTC Guard Period

The position of a narrowband used for MTC may change in each specific time unit (e.g., subframe or slot). An MTC UE may tune to different frequencies in different time units. A certain time may be required for frequency retuning and thus used as a guard period for MTC. No transmission and reception take place during the guard period.

MTC Signal Transmission/Reception Method

Apart from features inherent to MTC, an MTC signal transmission/reception procedure is similar to the procedure illustrated in FIG. 2. The operation of S201 in FIG. 2 may also be performed for MTC. A PSS/SSS used in an initial cell search operation in MTC may be the legacy LTE PSS/SSS.

After acquiring synchronization with a BS by using the PSS/SSS, an MTC UE may acquire broadcast information within a cell by receiving a PBCH signal from the BS. The broadcast information transmitted on the PBCH is an MIB. In MTC, reserved bits among the bits of the legacy LTE MIB are used to transmit scheduling information for a new system information block 1 bandwidth reduced (SIB1-BR). The scheduling information for the SIB1-BR may include information about a repetition number and a TBS for a PDSCH conveying SIB1-BR. A frequency resource assignment for the PDSCH conveying SIB-BR may be a set of 6 consecutive RBs within a narrowband. The SIB-BR is transmitted directly on the PDSCH without a control channel (e.g., PDCCH or MPDCCH) associated with SIB-BR.

After completing the initial cell search, the MTC UE may acquire more specific system information by receiving an MPDCCH and a PDSCH based on information of the MPDCCH (S202).

Subsequently, the MTC UE may perform a RACH procedure to complete connection to the BS (S203 to S206). A basic configuration for the RACH procedure of the MTC UE may be transmitted in SIB2. Further, SIB2 includes paging-related parameters. In the 3GPP system, a paging occasion (PO) means a time unit in which a UE may attempt to receive paging. Paging refers to the network's indication of the presence of data to be transmitted to the UE. The MTC UE attempts to receive an MPDCCH based on a P-RNTI in a time unit corresponding to its PO in a narrowband configured for paging, paging narrowband (PNB). When the UE succeeds in decoding the MPDCCH based on the P-RNTI, the UE may check its paging message by receiving a PDSCH scheduled by the MPDCCH. In the presence of its paging message, the UE accesses the network by performing the RACH procedure.

In MTC, signals and/or messages (Msg1, Msg2, Msg3, and Msg4) may be transmitted repeatedly in the RACH procedure, and a different repetition pattern may be set according to a CE level.

For random access, PRACH resources for different CE levels are signaled by the BS. Different PRACH resources for up to 4 respective CE levels may be signaled to the MTC UE. The MTC UE measures an RSRP using a DL RS (e.g., CRS, CSI-RS, or TRS) and determines one of the CE levels signaled by the BS based on the measurement. The UE selects one of different PRACH resources (e.g., frequency, time, and preamble resources for a PARCH) for random access based on the determined CE level and transmits a PRACH. The BS may determine the CE level of the UE based on the PRACH resources that the UE has used for the PRACH transmission. The BS may determine a CE mode for the UE based on the CE level that the UE indicates by the PRACH transmission. The BS may transmit DCI to the UE in the CE mode.

Search spaces for an RAR for the PRACH and contention resolution messages are signaled in system information by the BS.

After the above procedure, the MTC UE may receive an MPDCCH signal and/or a PDSCH signal (S207) and transmit a PUSCH signal and/or a PUCCH signal (S208) in a general UL/DL signal transmission procedure. The MTC UE may transmit UCI on a PUCCH or a PUSCH to the BS.

Once an RRC connection for the MTC UE is established, the MTC UE attempts to receive an MDCCH by monitoring an MPDCCH in a configured search space in order to acquire UL and DL data allocations.

In legacy LTE, a PDSCH is scheduled by a PDCCH. Specifically, the PDCCH may be transmitted in the first N (N=1, 2 or 3) OFDM symbols of a subframe, and the PDSCH scheduled by the PDCCH is transmitted in the same subframe.

Compared to legacy LTE, an MPDCCH and a PDSCH scheduled by the MPDCCH are transmitted/received in different subframes in MTC. For example, an MPDCCH with a last repetition in subframe #n schedules a PDSCH starting in subframe #n+2. The MPDCCH may be transmitted only once or repeatedly. A maximum repetition number of the MPDCCH is configured for the UE by RRC signaling from the BS. DCI carried on the MPDCCH provides information on how many times the MPDCCH is repeated so that the UE may determine when the PDSCH transmission starts. For example, if DCI in an MPDCCH starting in subframe #n includes information indicating that the MPDCCH is repeated 10 times, the MPDCCH may end in subframe #n+9 and the PDSCH may start in subframe #n+11. The DCI carried on the MPDCCH may include information about a repetition number for a physical data channel (e.g., PUSCH or PDSCH) scheduled by the DCI. The UE may transmit/receive the physical data channel repeatedly in the time domain according to the information about the repetition number of the physical data channel scheduled by the DCI. The PDSCH may be scheduled in the same or different narrowband as or from a narrowband in which the MPDCCH scheduling the PDSCH is transmitted. When the MPDCCH and the PDSCH are in different narrowbands, the MTC UE needs to retune to the frequency of the narrowband carrying the PDSCH before decoding the PDSCH. For UL scheduling, the same timing as in legacy LTE may be followed. For example, an MPDCCH ending in subframe #n may schedule a PUSCH transmission starting in subframe #n+4. If a physical channel is repeatedly transmitted, frequency hopping is supported between different MTC subbands by RF retuning. For example, if a PDSCH is repeatedly transmitted in 32 subframes, the PDSCH is transmitted in the first 16 subframes in a first MTC subband, and in the remaining 16 subframes in a second MTC subband. MTC may operate in half-duplex mode.

Narrowband-Internet of Things (NB-IoT)

NB-IoT may refer to a system for supporting low complexity, low power consumption, and efficient use of frequency resources by a system BW corresponding to one RB of a wireless communication system (e.g., the LTE system or the NR system). NB-IoT may operate in half-duplex mode. NB-IoT may be used as a communication scheme for implementing IoT by supporting, for example, an MTC device (or UE) in a cellular system.

In NB-IoT, each UE perceives one RB as one carrier. Therefore, an RB and a carrier as mentioned in relation to NB-IoT may be interpreted as the same meaning.

While a frame structure, physical channels, multi-carrier operations, and general signal transmission/reception in relation to NB-IoT will be described below in the context of the legacy LTE system, the description is also applicable to the next generation system (e.g., the NR system). Further, the description of NB-IoT may also be applied to MTC serving similar technical purposes (e.g., low power, low cost, and coverage enhancement).

NB-IoT Frame Structure and Physical Resources

A different NB-IoT frame structure may be configured according to a subcarrier spacing. For example, for a subcarrier spacing of 15 kHz, the NB-IoT frame structure may be identical to that of a legacy system (e.g., the LTE system). For example, a 10-ms NB-IoT frame may include 10 1-ms NB-IoT subframes each including two 0.5-ms slots. Each 0.5-ms NB-IoT slot may include 7 OFDM symbols. In another example, for a BWP or cell/carrier having a subcarrier spacing of 3.75 kHz, a 10-ms NB-IoT frame may include five 2-ms NB-IoT subframes each including 7 OFDM symbols and one guard period (GP). Further, a 2-ms NB-IoT subframe may be represented in NB-IoT slots or NB-IoT resource units (RUs). The NB-IoT frame structures are not limited to the subcarrier spacings of 15 kHz and 3.75 kHz, and NB-IoT for other subcarrier spacings (e.g., 30 kHz) may also be considered by changing time/frequency units.

NB-IoT DL physical resources may be configured based on physical resources of other wireless communication systems (e.g., the LTE system or the NR system) except that a system BW is limited to a predetermined number of RBs (e.g., one RB, that is, 180 kHz). For example, if the NB-IoT DL supports only the 15-kHz subcarrier spacing as described before, the NB-IoT DL physical resources may be configured as a resource area in which the resource grid illustrated in FIG. 1 is limited to one RB in the frequency domain.

Like the NB-IoT DL physical resources, NB-IoT UL resources may also be configured by limiting a system BW to one RB. In NB-IoT, the number of UL subcarriers $N^{UL}_{sc}$ and a slot duration $T_{slot}$ may be given as illustrated in [Table 3] below. In NB-IoT of the LTE system, the duration of one slot, $T_{slot}$ is defined by 7 SC-FDMA symbols in the time domain.

TABLE 3

| Subcarrier spacing | $N^{UL}_{sc}$ | $T_{slot}$ |
|---|---|---|
| Δf = 3.75 kHz | 48 | 6144 · $T_s$ |
| Δf = 15 kHz | 12 | 15360 · $T_s$ |

In NB-IoT, RUs are used for mapping to REs of a PUSCH for NB-IoT (referred to as an NPUSCH). An RU may be defined by $N^{UL}_{symb}*N^{UL}_{slot}$ SC-FDMA symbols in the time domain by consecutive subcarriers in the frequency domain. For example, $N^{RU}_{sc}$ and $N^{UL}_{symb}$ are listed in [Table 4] for a cell/carrier having an FDD frame structure and in [fable 5] for a cell/carrier having a TDD frame structure.

TABLE 4

| NPUSCH format | Δf | $N^{RU}_{sc}$ | $N^{UL}_{slots}$ | $N^{UL}_{symb}$ |
|---|---|---|---|---|
| 1 | 3.75 kHz | 1 | 16 | 7 |
|   | 15 kHz | 1 | 16 |   |
|   |   | 3 | 8 |   |
|   |   | 6 | 4 |   |
|   |   | 12 | 2 |   |
| 2 | 3.75 kHz | 1 | 4 |   |
|   | 15 kHz | 1 | 4 |   |

TABLE 5

| NPUSCH format | Δf | Supported-uplink-downlink configurations | $N^{RU}_{sc}$ | $N^{UL}_{slots}$ | $N^{UL}_{symb}$ |
|---|---|---|---|---|---|
| 1 | 3.75 kHz | 1, 4 | 1 | 16 | 7 |
|   | 15 kHz | 1, 2, 3, 4, 5 | 1 | 16 |   |
|   |   |   | 3 | 8 |   |
|   |   |   | 6 | 4 |   |
|   |   |   | 12 | 2 |   |
| 2 | 3.75 kHz | 1, 4 | 1 | 4 |   |
|   | 15 kHz | 1, 2, 3, 4, 5 | 1 | 4 |   |

NB-IoT Physical Channels

OFDMA may be adopted for NB-IoT DL based on the 15-kHz subcarrier spacing. Because OFDMA provides orthogonality between subcarriers, co-existence with other systems (e.g., the LTE system or the NR system) may be supported efficiently. The names of DL physical channels/signals of the NB-IoT system may be prefixed with "N (narrowband)" to be distinguished from their counterparts in the legacy system. For example, DL physical channels may be named NPBCH, NPDCCH, NPDSCH, and so on, and DL physical signals may be named NPSS, NSSS, narrowband reference signal (NRS), narrowband positioning reference signal (NPRS), narrowband wake up signal (NWUS), and so on. The DL channels, NPBCH, NPDCCH, NPDSCH, and so on may be repeatedly transmitted to enhance coverage in the NB-IoT system. Further, new defined DCI formats may be used in NB-IoT, such as DCI format N0, DCI format N1, and DCI format N2.

SC-FDMA may be applied with the 15-kHz or 3.75-kHz subcarrier spacing to NB-IoT UL. As described in relation to DL, the names of physical channels of the NB-IoT system may be prefixed with "N (narrowband)" to be distinguished from their counterparts in the legacy system. For example, UL channels may be named NPRACH, NPUSCH, and so on, and UL physical signals may be named NDMRS and so on. NPUSCHs may be classified into NPUSCH format 1 and NPUSCH format 2. For example, NPUSCH format 1 may be used to transmit (or deliver) an uplink shared channel (UL-SCH), and NPUSCH format 2 may be used for UCI transmission such as HARQ ACK signaling. A UL channel, NPRACH in the NB-IoT system may be repeatedly transmitted to enhance coverage. In this case, the repeated transmissions may be subjected to frequency hopping.

Multi-Carrier Operation in NB-IoT

NB-IoT may be implemented in multi-carrier mode. A multi-carrier operation may refer to using multiple carriers configured for different usages (i.e., multiple carriers of different types) in transmitting/receiving channels and/or signals between a BS and a UE.

In the multi-carrier mode in NB-IoT, carriers may be divided into anchor type carrier (i.e., anchor carrier or anchor PRB) and non-anchor type carrier (i.e., non-anchor carrier or non-anchor PRB).

The anchor carrier may refer to a carrier carrying an NPSS, an NSSS, and an NPBCH for initial access, and an NPDSCH for a system information block, N-SIB from the perspective of a BS. That is, a carrier for initial access is referred to as an anchor carrier, and the other carrier(s) is referred to as a non-anchor carrier in NB-IoT.

NB-IoT Signal Transmission/Reception Process

In NB-IoT, a signal is transmitted/received in a similar manner to the procedure illustrated in FIG. 2, except for features inherent to NB-IoT. Referring to FIG. 2, when an NB-IoT UE is powered on or enters a new cell, the NB-IoT UE may perform an initial cell search (S201). For the initial cell search, the NB-IoT UE may acquire synchronization with a BS and obtain information such as a cell ID by receiving an NPSS and an NSSS from the BS. Further, the NB-IoT UE may acquire broadcast information within a cell by receiving an NPBCH from the BS.

Upon completion of the initial cell search, the NB-IoT UE may acquire more specific system information by receiving an NPDCCH and receiving an NPDSCH corresponding to the NPDCCH (S202). In other words, the BS may transmit more specific system information to the NB-IoT UE which has completed the initial call search by transmitting an NPDCCH and an NPDSCH corresponding to the NPDCCH.

The NB-IoT UE may then perform a RACH procedure to complete a connection setup with the BS (S203 to S206). For this purpose, the NB-IoT UE may transmit a preamble on an NPRACH to the BS (S203). As described before, it may be configured that the NPRACH is repeatedly transmitted based on frequency hopping, for coverage enhancement. In other words, the BS may (repeatedly) receive the preamble on the NPRACH from the NB-IoT UE. The NB-IoT UE may then receive an NPDCCH, and a RAR in response to the preamble on an NPDSCH corresponding to the NPDCCH from the BS (S204). In other words, the BS may transmit the NPDCCH, and the RAR in response to the preamble on the NPDSCH corresponding to the NPDCCH to the NB-IoT UE. Subsequently, the NB-IoT UE may transmit an NPUSCH to the BS, using scheduling information in the RAR (S205) and perform a contention resolution procedure by receiving an NPDCCH and an NPDSCH corresponding to the NPDCCH (S206).

After the above process, the NB-IoT UE may perform an NPDCCH/NPDSCH reception (S207) and an NPUSCH transmission (S208) in a general ULM, signal transmission procedure. In other words, after the above process, the BS may perform an NPDCCH/NPDSCH transmission and an NPUSCH reception with the NB-IoT UE in the general UL/DL signal transmission procedure.

In NB-IoT, the NPBCH, the NPDCCH, and the NPDSCH may be transmitted repeatedly, for coverage enhancement. A UL-SCH (i.e., general UL data) and UCI may be delivered on the PUSCH in NB-IoT. It may be configured that the UL-SCH and the UCI are transmitted in different NPUSCH formats (e.g., NPUSCH format 1 and NPUSCH format 2).

In NB-IoT, UCI may generally be transmitted on an NPUSCH. Further, the UE may transmit the NPUSCH periodically, aperiodically, or semi-persistently according to request/indication of the network (e.g., BS).

Wireless Communication Apparatus

Figure 9:
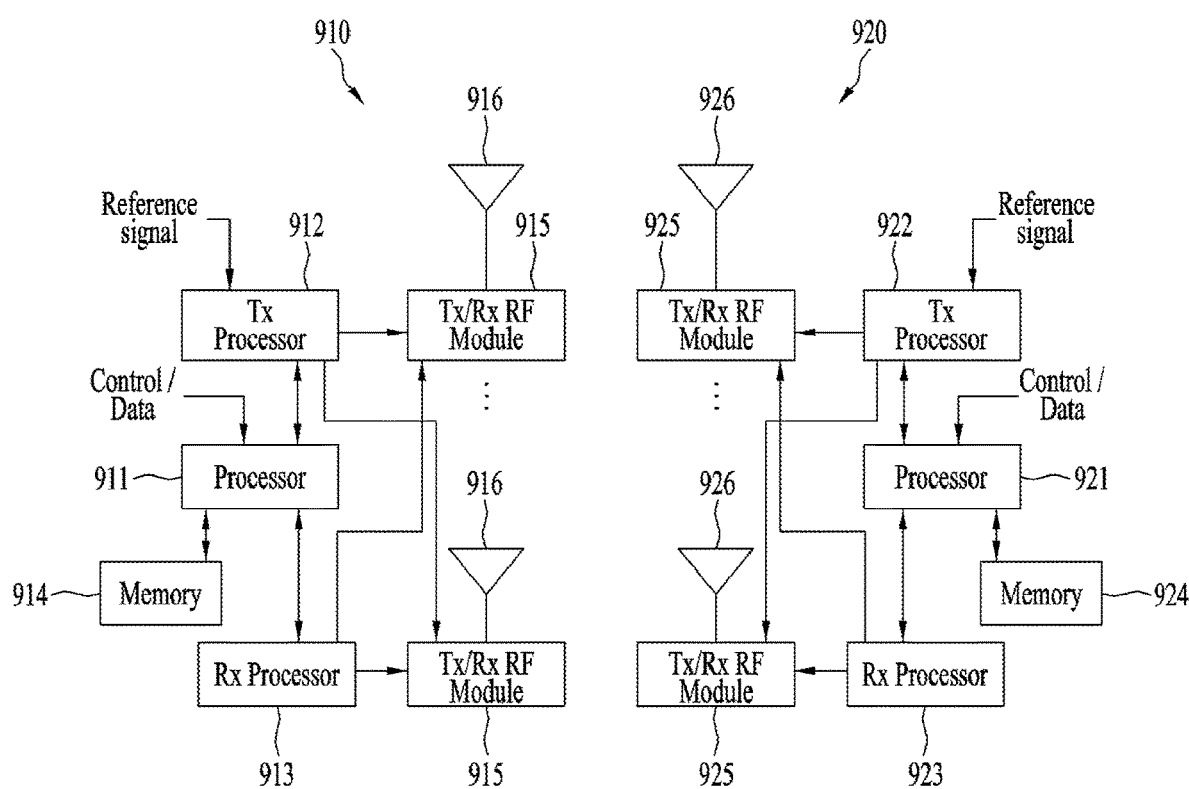
FIG. 9 is a block diagram illustrating an exemplary wireless communication system to which proposed methods according to the present disclosure are applicable.

FIG. 9 is a block diagram of an exemplary wireless communication system to which proposed methods of the present disclosure are applicable.

Referring to FIG. 9, the wireless communication system includes a first communication device 910 and/or a second communication device 920. The phrases "A and/or B" and "at least one of A or B" are may be interpreted as the same meaning. The first communication device 910 may be a BS, and the second communication device 920 may be a UE (or the first communication device 910 may be a UE, and the second communication device 920 may be a BS).

Each of the first communication device 910 and the second communication device 920 includes a processor 911 or 921, a memory 914 or 924, one or more Tx/Rx RF modules 915 or 925, a Tx processor 912 or 922, an Rx processor 913 or 923, and antennas 916 or 926. A Tx/Rx module may also be called a transceiver. The processor performs the afore-described functions, processes, and/or methods. More specifically, on DL (communication from the first communication device 910 to the second communication device 920), a higher-layer packet from a core network is provided to the processor 911. The processor 911 implements Layer 2 (i.e., L2) functionalities. On DL, the processor 911 is responsible for multiplexing between a logical channel and a transport channel, provisioning of a radio resource assignment to the second communication device 920, and signaling to the second communication device 920. The Tx processor 912 executes various signal processing functions of L1 (i.e., the physical layer). The signal processing functions facilitate forward error correction (FEC) of the second communication device 920, including coding and interleaving. An encoded and interleaved signal is modulated to complex-valued modulation symbols after scrambling and modulation. For the modulation, BPSK, QPSK, 16QAM, 64QAM, 246QAM, and so on are available according to channels. The complex-valued modulation symbols (hereinafter, referred to as modulation symbols) are divided into parallel streams. Each stream is mapped to OFDM subcarriers and multiplexed with an RS in the time and/or frequency domain. A physical channel is generated to carry a time-domain OFDM symbol stream by subjecting the mapped signals to IFFT. The OFDM symbol stream is spatially precoded to multiple spatial streams. Each spatial stream may be provided to a different antenna 916 through an individual Tx/Rx module (or transceiver) 915. Each Tx/Rx module 915 may upconvert the frequency of each spatial stream to an RF carrier, for transmission. In the second communication device 920, each Tx/Rx module (or transceiver) 925 receives a signal of the RF carrier through each antenna 926. Each Tx/Rx module 925 recovers the signal of the RF carrier to a baseband signal and provides the baseband signal to the Rx processor 923. The Rx processor 923 executes various signal processing functions of L1 (i.e., the physical layer). The Rx processor 923 may perform spatial processing on information to recover any spatial stream directed to the second communication device 920. If multiple spatial streams are directed to the second communication device 920, multiple Rx processors may combine the multiple spatial streams into a single OFDMA symbol stream. The Rx processor 923 converts an OFDM symbol stream being a time-domain signal to a frequency-domain signal by FFT. The frequency-domain signal includes an individual OFDM symbol stream on each subcarrier of an OFDM signal. Modulation symbols and an RS on each subcarrier are recovered and demodulated by determining most likely signal constellation points transmitted by the first communication device 910. These soft decisions may be based on channel estimates. The soft decisions are decoded and deinterleaved to recover the original data and control signal transmitted on physical channels by the first communication device 910. The data and control signal are provided to the processor 921.

On UL (communication from the second communication device 920 to the first communication device 910), the first communication device 910 operates in a similar manner as described in relation to the receiver function of the second communication device 920. Each Tx/Rx module 925 receives a signal through an antenna 926. Each Tx/Rx module 925 provides an RF carrier and information to the Rx processor 923. The processor 921 may be related to the memory 924 storing a program code and data. The memory 924 may be referred to as a computer-readable medium.

Artificial Intelligence (AI)

Artificial intelligence is a field of studying AI or methodologies for creating AI, and machine learning is a field of defining various issues dealt with in the AI field and studying methodologies for addressing the various issues. Machine learning is defined as an algorithm that increases the performance of a certain operation through steady experiences for the operation.

An artificial neural network (ANN) is a model used in machine learning and may generically refer to a model having a problem-solving ability, which is composed of artificial neurons (nodes) forming a network via synaptic connections. The ANN may be defined by a connection pattern between neurons in different layers, a learning process for updating model parameters, and an activation function for generating an output value.

The ANN may include an input layer, an output layer, and optionally, one or more hidden layers. Each layer includes one or more neurons, and the ANN may include a synapse that links between neurons. In the ANN, each neuron may output the function value of the activation function, for the input of signals, weights, and deflections through the synapse.

Model parameters refer to parameters determined through learning and include a weight value of a synaptic connection and deflection of neurons. A hyperparameter means a parameter to be set in the machine learning algorithm before learning, and includes a learning rate, a repetition number, a mini batch size, and an initialization function.

The purpose of learning of the ANN may be to determine model parameters that minimize a loss function. The loss function may be used as an index to determine optimal model parameters in the learning process of the ANN.

Machine learning may be classified into supervised learning, unsupervised learning, and reinforcement learning according to learning methods.

Supervised learning may be a method of training an ANN in a state in which a label for training data is given, and the label may mean a correct answer (or result value) that the ANN should infer with respect to the input of training data to the ANN. Unsupervised learning may be a method of training an ANN in a state in which a label for training data is not given. Reinforcement learning may be a learning method in which an agent defined in a certain environment is trained to select a behavior or a behavior sequence that maximizes cumulative compensation in each state.

Machine learning, which is implemented by a deep neural network (DNN) including a plurality of hidden layers among ANNs, is also referred to as deep learning, and deep learning is part of machine learning. The following description is given with the appreciation that machine learning includes deep learning.

<Robot>

A robot may refer to a machine that automatically processes or executes a given task by its own capabilities. Particularly, a robot equipped with a function of recognizing an environment and performing an operation based on its decision may be referred to as an intelligent robot.

Robots may be classified into industrial robots, medical robots, consumer robots, military robots, and so on according to their usages or application fields.

A robot may be provided with a driving unit including an actuator or a motor, and thus perform various physical operations such as moving robot joints. Further, a movable robot may include a wheel, a brake, a propeller, and the like in a driving unit, and thus travel on the ground or fly in the air through the driving unit.

<Self-Driving>

Self-driving refers to autonomous driving, and a self-driving vehicle refers to a vehicle that travels with no user manipulation or minimum user manipulation.

For example, self-driving may include a technology of maintaining a lane while driving, a technology of automatically adjusting a speed, such as adaptive cruise control, a technology of automatically traveling along a predetermined route, and a technology of automatically setting a route and traveling along the route when a destination is set.

Vehicles may include a vehicle having only an internal combustion engine, a hybrid vehicle having both an internal combustion engine and an electric motor, and an electric vehicle having only an electric motor, and may include not only an automobile but also a train, a motorcycle, and the like.

Herein, a self-driving vehicle may be regarded as a robot having a self-driving function.

<eXtended Reality (XR)>

Extended reality is a generical term covering virtual reality (VR), augmented reality (AR), and mixed reality (MR). VR provides a real-world object and background only as a computer graphic (CG) image, AR provides a virtual CG image on a real object image, and MR is a computer graphic technology that mixes and combines virtual objects into the real world.

MR is similar to AR in that the real object and the virtual object are shown together. However, in AR, the virtual object is used as a complement to the real object, whereas in MR, the virtual object and the real object are handled equally.

XR may be applied to a head-mounted display (HMD), a head-up display (HUD), a portable phone, a tablet PC, a laptop computer, a desktop computer, a TV, a digital signage, and so on. A device to which XR is applied may be referred to as an XR device.

Figure 10:
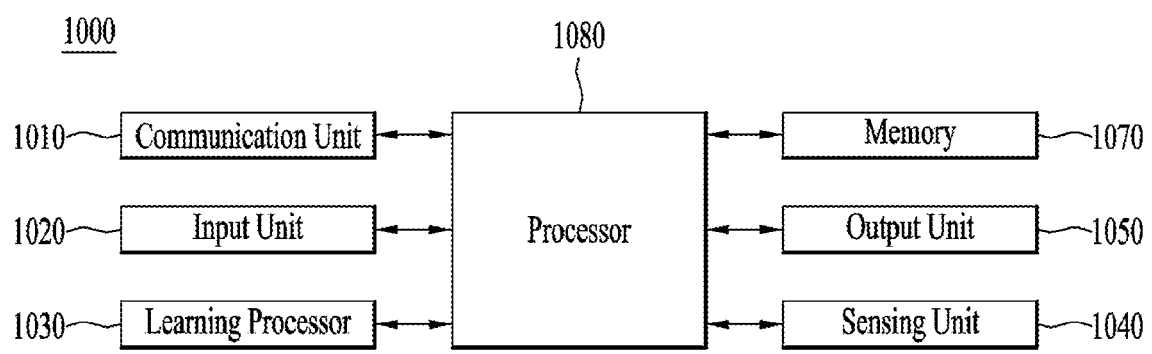
FIG. 10 is a block diagram illustrating an artificial intelligence (AI) device 100 according to an embodiment of the present disclosure.

FIG. 10 illustrates an AI device 1000 according to an embodiment of the present disclosure.

The AI device 1000 illustrated in FIG. 10 may be configured as a stationary device or a mobile device, such as a TV, a projector, a portable phone, a smartphone, a desktop computer, a laptop computer, a digital broadcasting terminal, a personal digital assistant (PDA), a portable multimedia player (PMP), a navigation device, a tablet PC, a wearable device, a set-top box (STB), a digital multimedia broadcasting (DMB) receiver, a radio, a washing machine, a refrigerator, a digital signage, a robot, or a vehicle.

Referring to FIG. 10, the AI device 1000 may include a communication unit 1010, an input unit 1020, a learning processor 1030, a sensing unit 1040, an output unit 1050, a memory 1070, and a processor 1080.

The communication unit 1010 may transmit and receive data to and from an external device such as another AI device or an AI server by wired or wireless communication. For example, the communication unit 1010 may transmit and receive sensor information, a user input, a learning model, and a control signal to and from the external device.

Communication schemes used by the communication unit 1010 include global system for mobile communication (GSM), CDMA, LTE, 5G, wireless local area network (WLAN), wireless fidelity (Wi-Fi), Bluetooth™, radio frequency identification (RFID), infrared data association (IrDA), ZigBee, near field communication (NFC), and so on. Particularly, the 5G technology described before with reference to FIGS. 1 to 9 may also be applied.

The input unit 1020 may acquire various types of data. The input unit 1020 may include a camera for inputting a video signal, a microphone for receiving an audio signal, and a user input unit for receiving information from a user. The camera or the microphone may be treated as a sensor, and thus a signal acquired from the camera or the microphone may be referred to as sensing data or sensor information.

The input unit 1020 may acquire training data for model training and input data to be used to acquire an output by using a learning model. The input unit 1020 may acquire raw input data. In this case, the processor 1080 or the learning processor 1030 may extract an input feature by preprocessing the input data.

The learning processor 1030 may train a model composed of an ANN by using training data. The trained ANN may be referred to as a learning model. The learning model may be used to infer a result value for new input data, not training data, and the inferred value may be used as a basis for determination to perform a certain operation.

The learning processor 1030 may perform AI processing together with a learning processor of an AI server.

The learning processor 1030 may include a memory integrated or implemented in the AI device 1000. Alternatively, the learning processor 1030 may be implemented by using the memory 1070, an external memory directly connected to the AI device 1000, or a memory maintained in an external device.

The sensing unit 1040 may acquire at least one of internal information about the AI device 1000, ambient environment information about the AI device 1000, and user information by using various sensors.

The sensors included in the sensing unit 1040 may include a proximity sensor, an illumination sensor, an accelerator sensor, a magnetic sensor, a gyro sensor, an inertial sensor, a red, green, blue (RGB) sensor, an IR sensor, a fingerprint recognition sensor, an ultrasonic sensor, an optical sensor, a microphone, a light detection and ranging (LiDAR), and a radar.

The output unit 1050 may generate a visual, auditory, or haptic output.

Accordingly, the output unit 1050 may include a display unit for outputting visual information, a speaker for outputting auditory information, and a haptic module for outputting haptic information.

The memory 1070 may store data that supports various functions of the AI device 1000. For example, the memory 1070 may store input data acquired by the input unit 1020, training data, a learning model, a learning history, and so on.

The processor 1080 may determine at least one executable operation of the AI device 100 based on information determined or generated by a data analysis algorithm or a machine learning algorithm. The processor 1080 may control the components of the AI device 1000 to execute the determined operation.

To this end, the processor 1080 may request, search, receive, or utilize data of the learning processor 1030 or the memory 1070. The processor 1080 may control the components of the AI device 1000 to execute a predicted operation or an operation determined to be desirable among the at least one executable operation.

When the determined operation needs to be performed in conjunction with an external device, the processor 1080 may generate a control signal for controlling the external device and transmit the generated control signal to the external device.

The processor 1080 may acquire intention information with respect to a user input and determine the user's requirements based on the acquired intention information.

The processor 1080 may acquire the intention information corresponding to the user input by using at least one of a speech to text (STT) engine for converting a speech input into a text string or a natural language processing (NLP) engine for acquiring intention information of a natural language.

At least one of the STT engine or the NLP engine may be configured as an ANN, at least part of which is trained according to the machine learning algorithm. At least one of the STT engine or the NLP engine may be trained by the learning processor, a learning processor of the AI server, or distributed processing of the learning processors. For reference, specific components of the AI server are illustrated in FIG. 11.

The processor 1080 may collect history information including the operation contents of the AI device 1000 or the user's feedback on the operation and may store the collected history information in the memory 1070 or the learning processor 1030 or transmit the collected history information to the external device such as the AI server. The collected history information may be used to update the learning model.

The processor 1080 may control at least a part of the components of AI device 1000 so as to drive an application program stored in the memory 1070. Furthermore, the processor 1080 may operate two or more of the components included in the AI device 1000 in combination so as to drive the application program.

Figure 11:
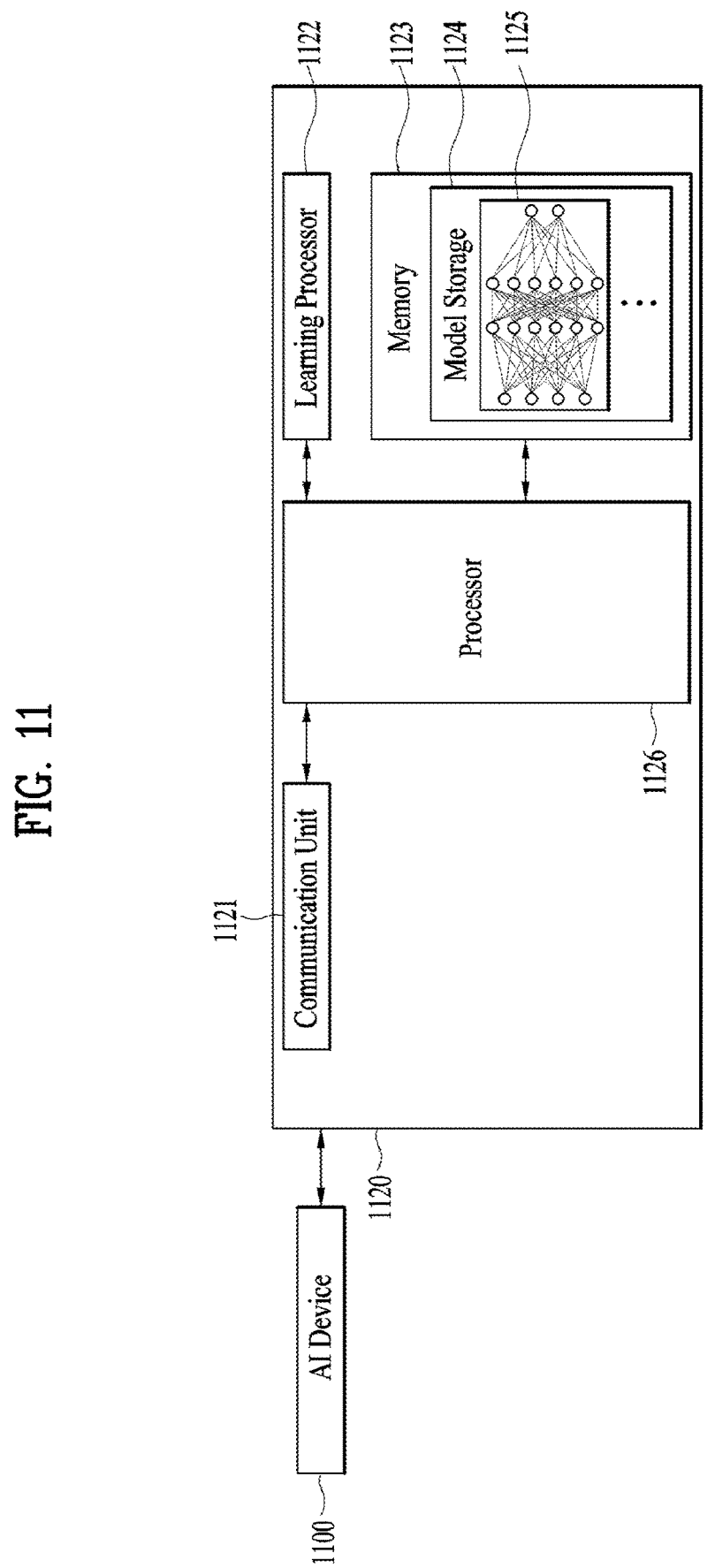
FIG. 11 is a block diagram illustrating an AI server 200 according to an embodiment of the present disclosure.

FIG. 11 illustrates an AI server 1120 according to an embodiment of the present disclosure.

Referring to FIG. 11, the AI server 1120 may refer to a device that trains an ANN by a machine learning algorithm or uses a trained ANN. The AI server 1120 may include a plurality of servers to perform distributed processing, or may be defined as a 5G network. The AI server 1120 may be included as part of the AI device 1100, and perform at least part of the AI processing.

The AI server 1120 may include a communication unit 1121, a memory 1123, a learning processor 1122, a processor 1126, and so on.

The communication unit 1121 may transmit and receive data to and from an external device such as the AI device 1100.

The memory 1123 may include a model storage 1124. The model storage 1124 may store a model (or an ANN 1125) which has been trained or is being trained through the learning processor 1122.

The learning processor 1122 may train the ANN 1125 by training data. The learning model may be used, while being loaded on the AI server 1120 of the ANN, or on an external device such as the AI device 1110.

The learning model may be implemented in hardware, software, or a combination of hardware and software. If all or part of the learning model is implemented in software, one or more instructions of the learning model may be stored in the memory 1123.

The processor 1126 may infer a result value for new input data by using the learning model and may generate a response or a control command based on the inferred result value.

Figure 12:
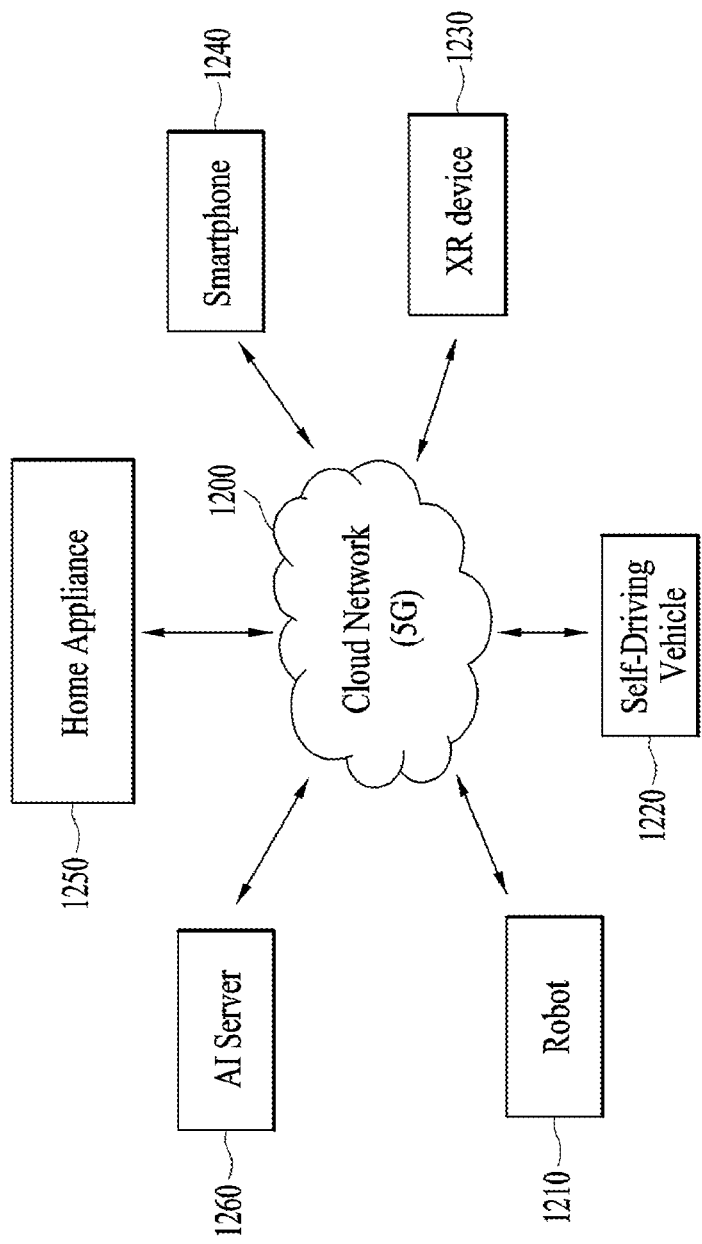
FIG. 12 is a diagram illustrating an AI system 1 according to an embodiment of the present disclosure.

FIG. 12 illustrates an AI system according to an embodiment of the present disclosure.

Referring to FIG. 12, in the AI system, at least one of an AI server 1260, a robot 1210, a self-driving vehicle 1220, an XR device 1230, a smartphone 1240, or a home appliance 1250 is connected to a cloud network 1200. The robot 1210, the self-driving vehicle 1220, the XR device 1230, the smartphone 1240, or the home appliance 1250, to which AI is applied, may be referred to as an AI device.

The cloud network 1200 may refer to a network that forms part of cloud computing infrastructure or exists in the cloud computing infrastructure. The cloud network 1200 may be configured by using a 3G network, a 4G or LTE network, or a 5G network.

That is, the devices 1210 to 1260 included in the AI system may be interconnected via the cloud network 1200. In particular, each of the devices 1210 to 1260 may communicate with each other directly or through a BS.

The AI server 1260 may include a server that performs AI processing and a server that performs computation on big data.

The AI server 1260 may be connected to at least one of the AI devices included in the AI system, that is, at least one of the robot 1210, the self-driving vehicle 1220, the XR device 1230, the smartphone 1240, or the home appliance 1250 via the cloud network 1200, and may assist at least part of AI processing of the connected AI devices 1210 to 1250.

The AI server 1260 may train the ANN according to the machine learning algorithm on behalf of the AI devices 1210 to 1250, and may directly store the learning model or transmit the learning model to the AI devices 1210 to 1250.

The AI server 1260 may receive input data from the AI devices 1210 to 1250, infer a result value for received input data by using the learning model, generate a response or a control command based on the inferred result value, and transmit the response or the control command to the AI devices 1210 to 1250.

Alternatively, the AI devices 1210 to 1250 may infer the result value for the input data by directly using the learning model, and generate the response or the control command based on the inference result.

Hereinafter, various embodiments of the AI devices 1210 to 1250 to which the above-described technology is applied will be described. The AI devices 1210 to 1250 illustrated in FIG. 12 may be regarded as a specific embodiment of the AI device 1000 illustrated in FIG. 10.

<AI+XR>

The XR device 1230, to which AI is applied, may be configured as a HMD, a HUD provided in a vehicle, a TV, a portable phone, a smartphone, a computer, a wearable device, a home appliance, a digital signage, a vehicle, a fixed robot, a mobile robot, or the like.

The XR device 1230 may acquire information about a surrounding space or a real object by analyzing 3D point cloud data or image data acquired from various sensors or an external device and thus generating position data and attribute data for the 3D points, and may render an XR object to be output. For example, the XR device 1230 may output an XR object including additional information about a recognized object in correspondence with the recognized object.

The XR device 1230 may perform the above-described operations by using the learning model composed of at least one ANN. For example, the XR device 1230 may recognize a real object from 3D point cloud data or image data by using the learning model, and may provide information corresponding to the recognized real object. The learning model may be trained directly by the XR device 1230 or by the external device such as the AI server 1260.

While the XR device 1230 may operate by generating a result by directly using the learning model, the XR device 1230 may operate by transmitting sensor information to the external device such as the AI server 1260 and receiving the result.

<AI+Robot+XR>

The robot 1210, to which AI and XR are applied, may be implemented as a guide robot, a delivery robot, a cleaning robot, a wearable robot, an entertainment robot, a pet robot, an unmanned flying robot, a drone, or the like.

The robot 1210, to which XR is applied, may refer to a robot to be controlled/interact within an XR image. In this case, the robot 1210 may be distinguished from the XR device 1230 and interwork with the XR device 1230.

When the robot 1210 to be controlled/interact within an XR image acquires sensor information from sensors each including a camera, the robot 1210 or the XR device 1230 may generate an XR image based on the sensor information, and the XR device 1230 may output the generated XR image. The robot 1210 may operate based on the control signal received through the XR device 1230 or based on the user's interaction.

For example, the user may check an XR image corresponding to a view of the robot 1210 interworking remotely through an external device such as the XR device 1210, adjust a self-driving route of the robot 1210 through interaction, control the operation or driving of the robot 1210, or check information about an ambient object around the robot 1210.

<AI+Self-Driving+XR>

The self-driving vehicle 1220, to which AI and XR are applied, may be implemented as a mobile robot, a vehicle, an unmanned flying vehicle, or the like.

The self-driving driving vehicle 1220, to which XR is applied, may refer to a self-driving vehicle provided with a means for providing an XR image or a self-driving vehicle to be controlled/interact within an XR image. Particularly, the self-driving vehicle 1220 to be controlled/interact within an XR image may be distinguished from the XR device 1230 and interwork with the XR device 1230.

The self-driving vehicle 1220 provided with the means for providing an XR image may acquire sensor information from the sensors each including a camera and output the generated XR image based on the acquired sensor information. For example, the self-driving vehicle 1220 may include an HUD to output an XR image, thereby providing a passenger with an XR object corresponding to a real object or an object on the screen.

When the XR object is output to the HUD, at least part of the XR object may be output to be overlaid on an actual object to which the passenger's gaze is directed. When the XR object is output to a display provided in the self-driving vehicle 1220, at least part of the XR object may be output to be overlaid on the object within the screen. For example, the self-driving vehicle 1220 may output XR objects corresponding to objects such as a lane, another vehicle, a traffic light, a traffic sign, a two-wheeled vehicle, a pedestrian, a building, and so on.

When the self-driving vehicle 1220 to be controlled/interact within an XR image acquires sensor information from the sensors each including a camera, the self-driving vehicle 1220 or the XR device 1230 may generate the XR image based on the sensor information, and the XR device 1230 may output the generated XR image. The self-driving vehicle 1220 may operate based on a control signal received through an external device such as the XR device 1230 or based on the user's interaction.

VR, AR, and MR technologies of the present disclosure are applicable to various devices, particularly, for example, a HMD, a HUD attached to a vehicle, a portable phone, a tablet PC, a laptop computer, a desktop computer, a TV, and a signage. The VR, AR, and MR technologies may also be applicable to a device equipped with a flexible or rollable display.

The above-described VR, AR, and MR technologies may be implemented based on CG and distinguished by the ratios of a CG image in an image viewed by the user.

That is, VR provides a real object or background only in a CG image, whereas AR overlays a virtual CG image on an image of a real object.

MR is similar to AR in that virtual objects are mixed and combined with a real world. However, a real object and a virtual object created as a CG image are distinctive from each other and the virtual object is used to complement the real object in AR, whereas a virtual object and a real object are handled equally in MR. More specifically, for example, a hologram service is an MR representation.

These days, VR, AR, and MR are collectively called XR without distinction among them. Therefore, embodiments of the present disclosure are applicable to all of VR, AR, MR, and XR.

For example, wired/wireless communication, input interfacing, output interfacing, and computing devices are available as hardware (HW)-related element techniques applied to VR, AR, MR, and XR. Further, tracking and matching, speech recognition, interaction and user interfacing, location-based service, search, and AI are available as software (SW)-related element techniques.

Particularly, the embodiments of the present disclosure are intended to address at least one of the issues of communication with another device, efficient memory use, data throughput decrease caused by inconvenient user experience/user interface (UX/UI), video, sound, motion sickness, or other issues.

Figure 13:
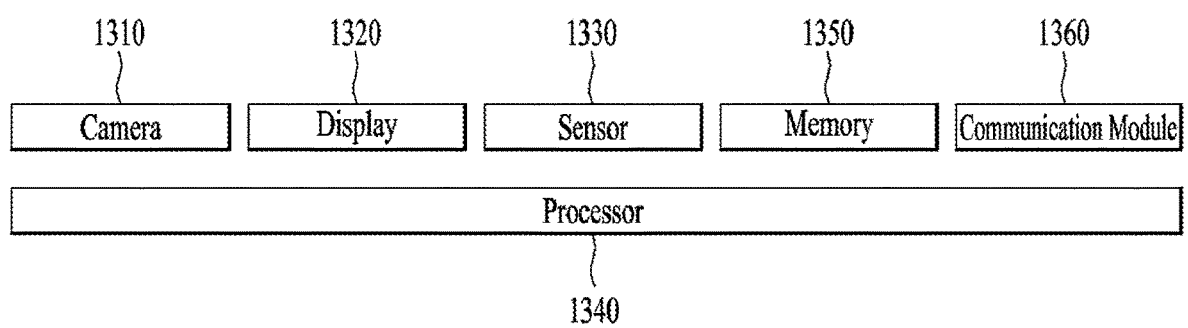
FIG. 13 is a block diagram illustrating an extended reality (XR) device according to embodiments of the present disclosure.

FIG. 13 is a block diagram illustrating an XR device according to embodiments of the present disclosure. The XR device 1300 includes a camera 1310, a display 1320, a sensor 1330, a processor 1340, a memory 1350, and a communication module 1360. Obviously, one or more of the modules may be deleted or modified, and one or more modules may be added to the modules, when needed, without departing from the scope and spirit of the present disclosure.

The communication module 1360 may communicate with an external device or a server, wiredly or wirelessly. The communication module 1360 may use, for example, Wi-Fi, Bluetooth, or the like, for short-range wireless communication, and for example, a 3GPP communication standard for long-range wireless communication. LTE is a technology beyond 3GPP TS 36.xxx Release 8. Specifically, LTE beyond 3GPP TS 36.xxx Release 10 is referred to as LTE-A, and LTE beyond 3GPP TS 36.xxx Release 13 is referred to as LTE-A pro. 3GPP 5G refers to a technology beyond TS 36.xxx Release 15 and a technology beyond TS 38.XXX Release 15. Specifically, the technology beyond TS 38.xxx Release 15 is referred to as 3GPP NR, and the technology beyond TS 36.xxx Release 15 is referred to as enhanced LTE. "xxx" represents the number of a technical specification. LTE/NR may be collectively referred to as a 3GPP system.

The camera 1310 may capture an ambient environment of the XR device 1300 and convert the captured image to an electric signal. The image, which has been captured and converted to an electric signal by the camera 1310, may be stored in the memory 1350 and then displayed on the display 1320 through the processor 1340. Further, the image may be displayed on the display 1320 by the processor 1340, without being stored in the memory 1350. Further, the camera 110 may have a field of view (FoV). The FoV is, for example, an area in which a real object around the camera 1310 may be detected. The camera 1310 may detect only a real object within the FoV. When a real object is located within the FoV of the camera 1310, the XR device 1300 may display an AR object corresponding to the real object. Further, the camera 1310 may detect an angle between the camera 1310 and the real object.

The sensor 1330 may include at least one sensor. For example, the sensor 1330 includes a sensing means such as a gravity sensor, a geomagnetic sensor, a motion sensor, a gyro sensor, an accelerator sensor, an inclination sensor, a brightness sensor, an altitude sensor, an olfactory sensor, a temperature sensor, a depth sensor, a pressure sensor, a bending sensor, an audio sensor, a video sensor, a global positioning system (GPS) sensor, and a touch sensor. Further, although the display 1320 may be of a fixed type, the display 1320 may be configured as a liquid crystal display (LCD), an organic light emitting diode (OLED) display, an electroluminescent display (ELD), or a micro LED (M-LED) display, to have flexibility. Herein, the sensor 1330 is designed to detect a bending degree of the display 1320 configured as the afore-described LCD, OLED display, ELD, or M-LED display.

The memory 1350 is equipped with a function of storing all or a part of result values obtained by wired/wireless communication with an external device or a service as well as a function of storing an image captured by the camera 1310. Particularly, considering the trend toward increased communication data traffic (e.g., in a 5G communication environment), efficient memory management is required. In this regard, a description will be given below with reference to FIG. 14.

Figure 14:
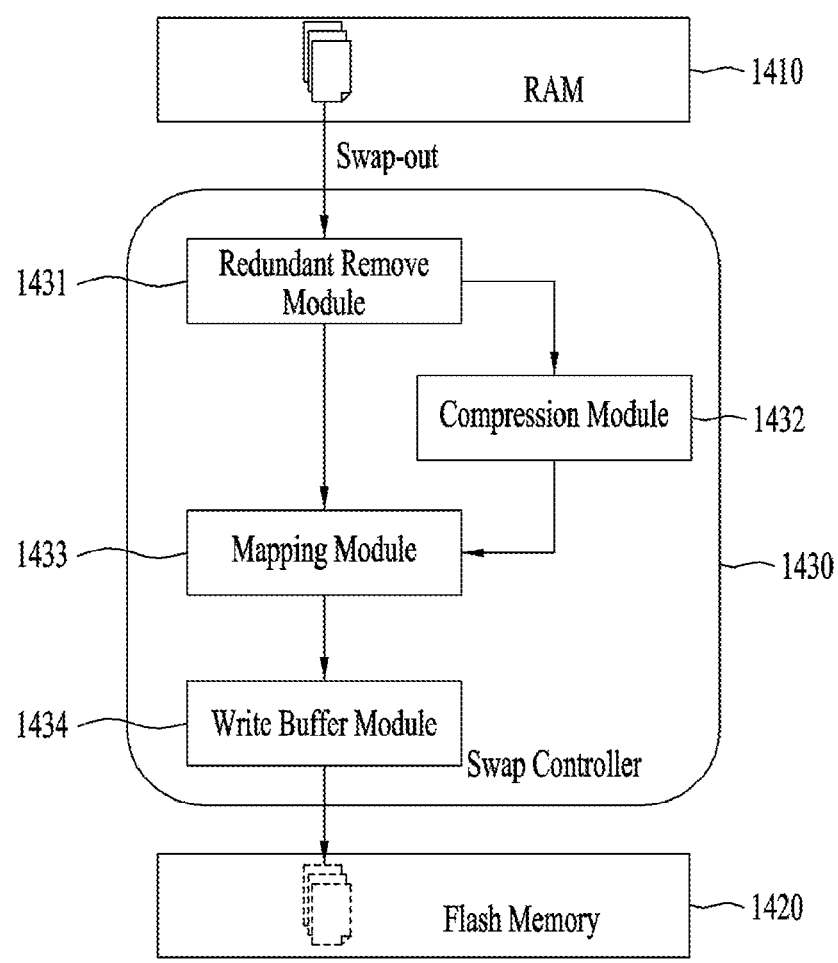
FIG. 14 is a detailed block diagram illustrating a memory illustrated in FIG. 13.

FIG. 14 is a detailed block diagram of the memory 1350 illustrated in FIG. 13. With reference to FIG. 14, a swap-out process between a random access memory (RAM) and a flash memory according to an embodiment of the present disclosure will be described.

When swapping out AR/VR page data from a RAM 1410 to a flash memory 1420, a controller 1430 may swap out only one of two or more AR/VR page data of the same contents among AR/VR page data to be swapped out to the flash memory 1420.

That is, the controller 1430 may calculate an identifier (e.g., a hash function) that identifies each of the contents of the AR/VR page data to be swapped out, and determine that two or more AR/VR page data having the same identifier among the calculated identifiers contain the same contents. Accordingly, the problem that the lifetime of an AR/VR device including the flash memory 1420 as well as the lifetime of the flash memory 1420 is reduced because unnecessary AR/VR page data is stored in the flash memory 1420 may be overcome.

The operations of the controller 1430 may be implemented in software or hardware without departing from the scope of the present disclosure. More specifically, the memory illustrated in FIG. 14 is included in a HMD, a vehicle, a portable phone, a tablet PC, a laptop computer, a desktop computer, a TV, a signage, or the like, and executes a swap function.

A device according to embodiments of the present disclosure may process 3D point cloud data to provide various services such as VR, AR, MR, XR, and self-driving to a user.

A sensor collecting 3D point cloud data may be any of, for example, a LiDAR, a red, green, blue depth (RGB-D), and a 3D laser scanner. The sensor may be mounted inside or outside of a HMD, a vehicle, a portable phone, a tablet PC, a laptop computer, a desktop computer, a TV, a signage, or the like.

Figure 15:
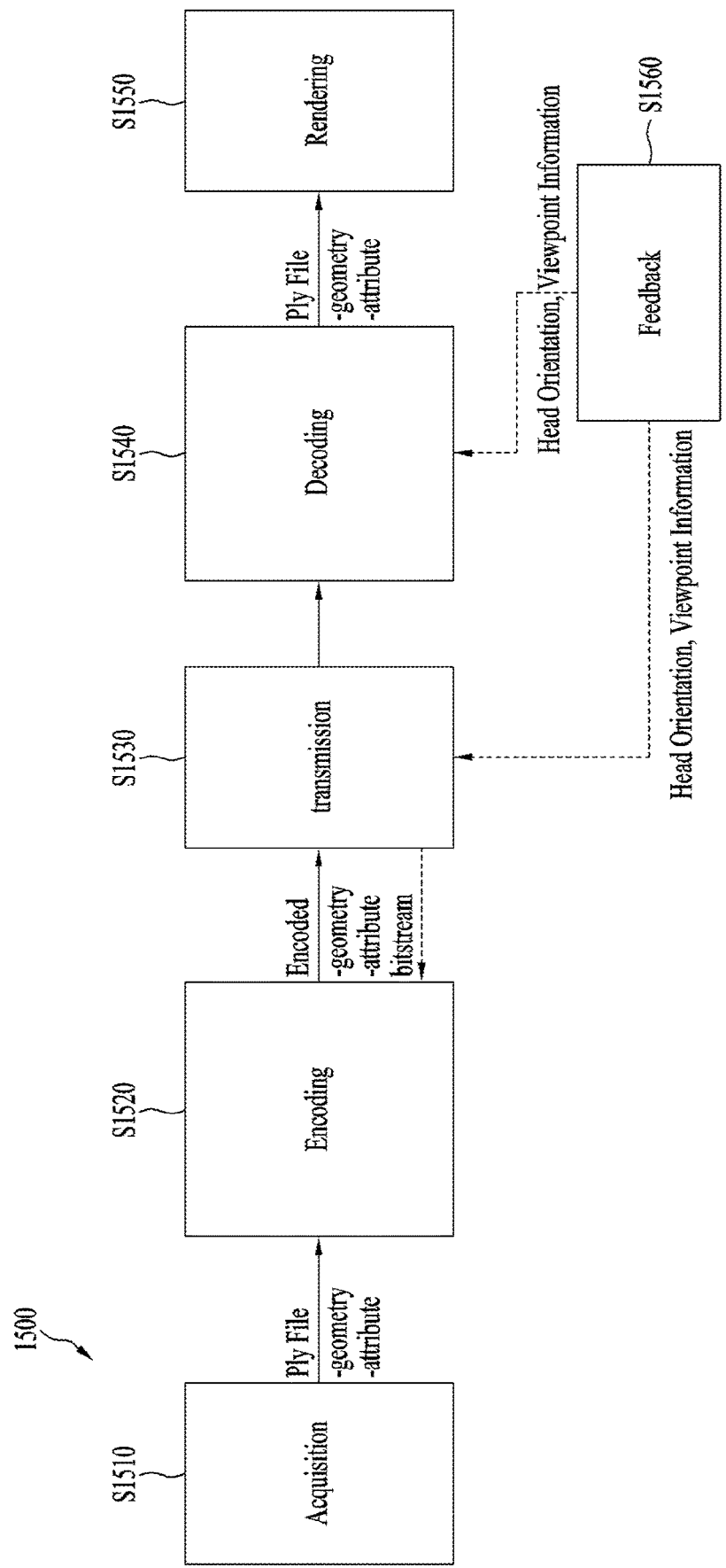
FIG. 15 is a block diagram illustrating a point cloud data processing system.

FIG. 15 illustrates a point cloud data processing system.

Referring to FIG. 15, a point cloud processing system 1500 includes a transmission device which acquires, encodes, and transmits point cloud data, and a reception device which acquires point cloud data by receiving and decoding video data. As illustrated in FIG. 15, point cloud data according to embodiments of the present disclosure may be acquired by capturing, synthesizing, or generating the point cloud data (S1510). During the acquisition, data (e.g., a polygon file format or standard triangle format (PLY) file) of 3D positions (x, y, z)/attributes (color, reflectance, transparency, and so on) of points may be generated. For a video of multiple frames, one or more files may be acquired. Point cloud data-related metadata (e.g., metadata related to capturing) may be generated during the capturing. The transmission device or encoder according to embodiments of the present disclosure may encode the point cloud data by video-based point cloud compression (V-PCC) or geometry-based point cloud compression (G-PCC), and output one or more video streams (S1520). V-PCC is a scheme of compressing point cloud data based on a 2D video codec such as high efficiency video coding (HEVC) or versatile video coding (VVC), G-PCC is a scheme of encoding point cloud data separately into two streams: geometry and attribute. The geometry stream may be generated by reconstructing and encoding position information about points, and the attribute stream may be generated by reconstructing and encoding attribute information (e.g., color) related to each point. In V-PCC, despite compatibility with a 2D video, much data is required to recover V-PCC-processed data (e.g., geometry video, attribute video, occupancy map video, and auxiliary information), compared to G-PCC, thereby causing a long latency in providing a service. One or more output bit streams may be encapsulated along with related metadata in the form of a file (e.g., a file format such as ISOBMFF) and transmitted over a network or through a digital storage medium (S1530).

The device or processor according to embodiments of the present disclosure may acquire one or more bit streams and related metadata by decapsulating the received video data, and recover 3D point cloud data by decoding the acquired bit streams in V-PCC or G-PCC (S1540). A renderer may render the decoded point cloud data and provide content suitable for VR/AR/MR/service to the user on a display (S1550).

As illustrated in FIG. 15, the device or processor according to embodiments of the present disclosure may perform a feedback process of transmitting various pieces of feedback information acquired during the rendering/display to the transmission device or to the decoding process (S1560). The feedback information according to embodiments of the present disclosure may include head orientation information, view port information indicating an area that the user is viewing, and so on. Because the user interacts with a service (or content) provider through the feedback process, the device according to embodiments of the present disclosure may provide a higher data processing speed by using the afore-described V-PCC or G-PCC scheme or may enable clear video construction as well as provide various services in consideration of high user convenience.

Figure 16:
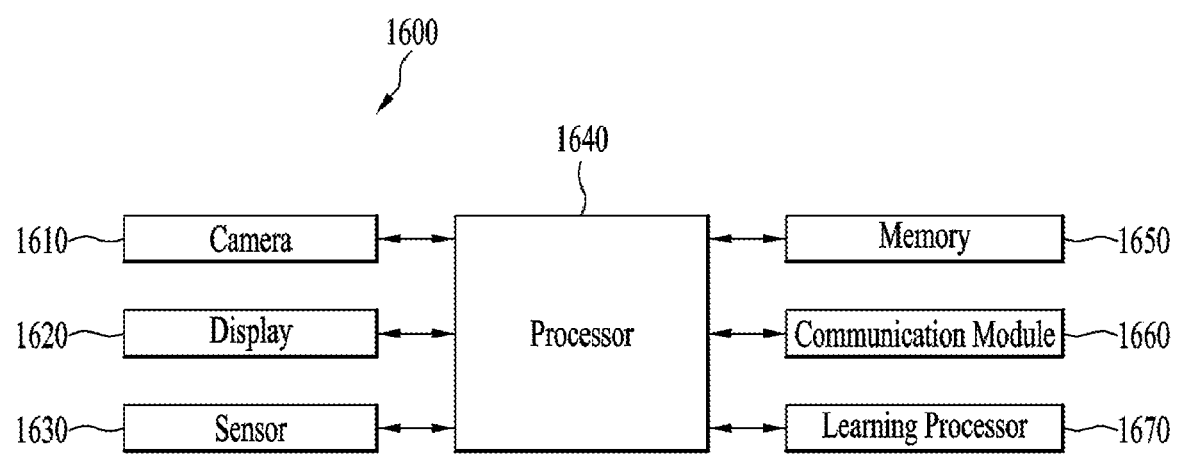
FIG. 16 is a block diagram illustrating a device including a learning processor.

FIG. 16 is a block diagram of an XR device 1600 including a learning processor. Compared to FIG. 13, only a learning processor 1670 is added, and thus a redundant description is avoided because FIG. 13 may be referred to for the other components.

Referring to FIG. 16, the XR device 1600 may be loaded with a learning model. The learning model may be implemented in hardware, software, or a combination of hardware and software. If the whole or part of the learning model is implemented in software, one or more instructions that form the learning model may be stored in a memory 1650.

According to embodiments of the present disclosure, a learning processor 1670 may be coupled communicably to a processor 1640, and repeatedly train a model including ANNs by using training data. An ANN is an information processing system in which multiple neurons are linked in layers, modeling an operation principle of biological neurons and links between neurons. An ANN is a statistical learning algorithm inspired by a neural network (particularly the brain in the central nervous system of an animal) in machine learning and cognitive science. Machine learning is one field of AI, in which the ability of learning without an explicit program is granted to a computer. Machine learning is a technology of studying and constructing a system for learning, predicting, and improving its capability based on empirical data, and an algorithm for the system. Therefore, according to embodiments of the present disclosure, the learning processor 1670 may infer a result value from new input data by determining optimized model parameters of an ANN. Therefore, the learning processor 1670 may analyze a device use pattern of a user based on device use history information about the user. Further, the learning processor 1670 may be configured to receive, classify, store, and output information to be used for data mining, data analysis, intelligent decision, and a machine learning algorithm and technique.

According to embodiments of the present disclosure, the processor 1640 may determine or predict at least one executable operation of the device based on data analyzed or generated by the learning processor 1670. Further, the processor 1640 may request, search, receive, or use data of the learning processor 1670, and control the XR device 1600 to perform a predicted operation or an operation determined to be desirable among the at least one executable operation. According to embodiments of the present disclosure, the processor 1640 may execute various functions of realizing intelligent emulation (i.e., knowledge-based system, reasoning system, and knowledge acquisition system). The various functions may be applied to an adaptation system, a machine learning system, and various types of systems including an ANN (e.g., a fuzzy logic system). That is, the processor 1640 may predict a user's device use pattern based on data of a use pattern analyzed by the learning processor 1670, and control the XR device 1600 to provide a more suitable XR service to the UE. Herein, the XR service includes at least one of the AR service, the VR service, or the MR service.

Figure 17:
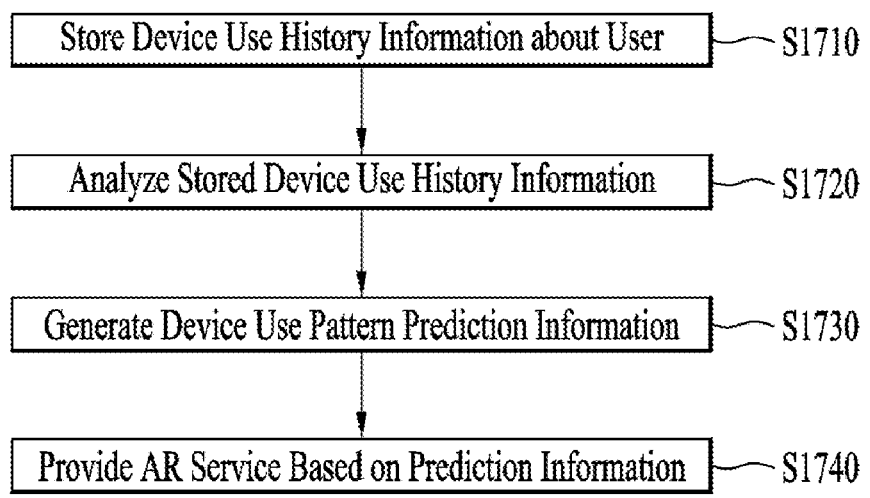
FIG. 17 is a flowchart illustrating a process of providing an XR service by an XR device 1600 of the present disclosure, illustrated in FIG. 16.

FIG. 17 illustrates a process of providing an XR service by the XR service 1600 of the present disclosure illustrated in FIG. 16.

According to embodiments of the present disclosure, the processor 1670 may store device use history information about a user in the memory 1650 (S1710). The device use history information may include information about the name, category, and contents of content provided to the user, information about a time at which a device has been used, information about a place in which the device has been used, time information, and information about use of an application installed in the device.

According to embodiments of the present disclosure, the learning processor 1670 may acquire device use pattern information about the user by analyzing the device use history information (S1720). For example, when the XR device 1600 provides specific content A to the user, the learning processor 1670 may learn information about a pattern of the device used by the user using the corresponding terminal by combining specific information about content A (e.g., information about the ages of users that generally use content A, information about the contents of content A, and content information similar to content A), and information about the time points, places, and number of times in which the user using the corresponding terminal has consumed content A.

According to embodiments of the present disclosure, the processor 1640 may acquire the user device pattern information generated based on the information learned by the learning processor 1670, and generate device use pattern prediction information (S1730). Further, when the user is not using the device 1600, if the processor 1640 determines that the user is located in a place where the user has frequently used the device 1600, or it is almost time for the user to usually use the device 1600, the processor 1640 may indicate the device 1600 to operate. In this case, the device according to embodiments of the present disclosure may provide AR content based on the user pattern prediction information (S1740).

When the user is using the device 1600, the processor 1640 may check information about content currently provided to the user, and generate device use pattern prediction information about the user in relation to the content (e.g., when the user requests other related content or additional data related to the current content). Further, the processor 1640 may provide AR content based on the device use pattern prediction information by indicating the device 1600 to operate (S1740). The AR content according to embodiments of the present disclosure may include an advertisement, navigation information, danger information, and so on.

Figure 18:
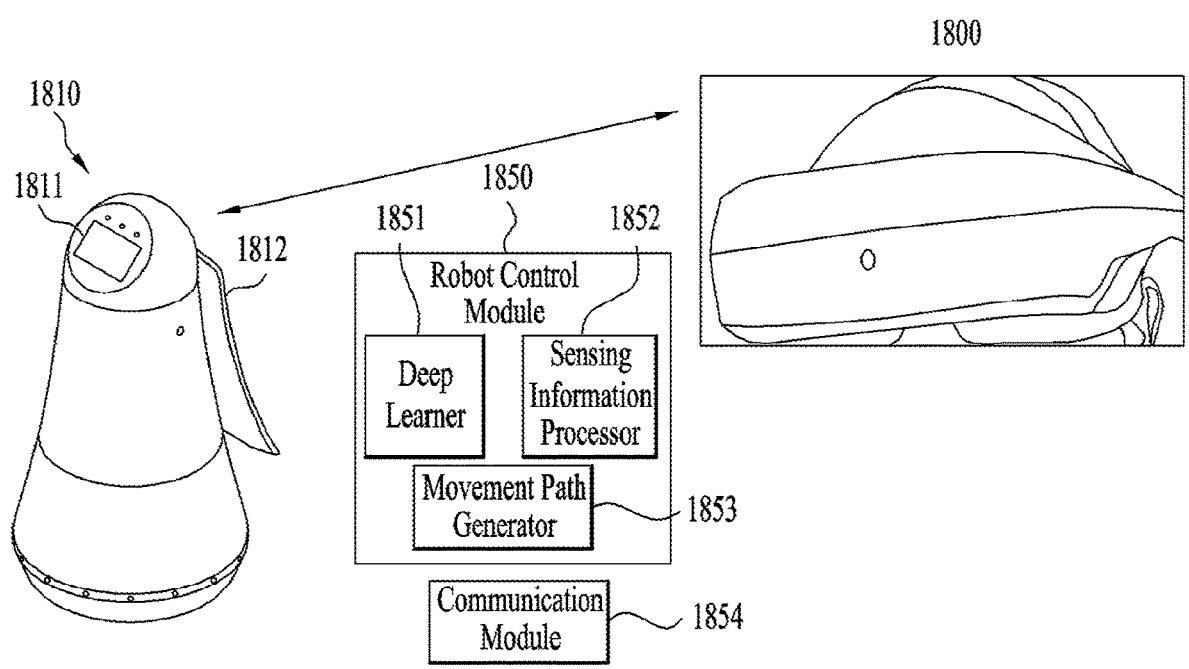
FIG. 18 is a diagram illustrating the outer appearances of an XR device and a robot.

FIG. 18 illustrates the outer appearances of an XR device and a robot.

Component modules of an XR device 1800 according to an embodiment of the present disclosure have been described before with reference to the previous drawings, and thus a redundant description is not provided herein.

The outer appearance of a robot 1810 illustrated in FIG. 18 is merely an example, and the robot 1810 may be implemented to have various outer appearances according to the present disclosure. For example, the robot 1810 illustrated in FIG. 18 may be a drone, a cleaner, a cook root, a wearable robot, or the like. Particularly, each component of the robot 1810 may be disposed at a different position such as up, down, left, right, back, or forth according to the shape of the robot 1810.

The robot 1810 may be provided, on the exterior thereof, with various sensors to identify ambient objects. Further, to provide specific information to a user, the robot 1810 may be provided with an interface unit 1811 on top or the rear surface 1812 thereof.

To sense movement of the robot 1810 and an ambient object, and control the robot 1810, a robot control module 1850 is mounted inside the robot 1810. The robot control module 1850 may be implemented as a software module or a hardware chip with the software module implemented therein. The robot control module 1850 may include a deep learner 1851, a sensing information processor 1852, a movement path generator 1853, and a communication module 1854.

The sensing information processor 1852 collects and processes information sensed by various types of sensors (e.g., a LiDAR sensor, an IR sensor, an ultrasonic sensor, a depth sensor, an image sensor, and a microphone) arranged in the robot 1810.

The deep learner 1851 may receive information processed by the sensing information processor 1851 or accumulative information stored during movement of the robot 1810, and output a result required for the robot 1810 to determine an ambient situation, process information, or generate a moving path.

The moving path generator 1852 may calculate a moving path of the robot 1810 by using the data calculated by the deep learner 8151 or the data processed by the sensing information processor 1852.

Because each of the XR device 1800 and the robot 1810 is provided with a communication module, the XR device 1800 and the robot 1810 may transmit and receive data by short-range wireless communication such as Wi-Fi or Bluetooth. or 5G long-range wireless communication. A technique of controlling the robot 1810 by using the XR device 1800 will be described below with reference to FIG. 19.

Figure 19:
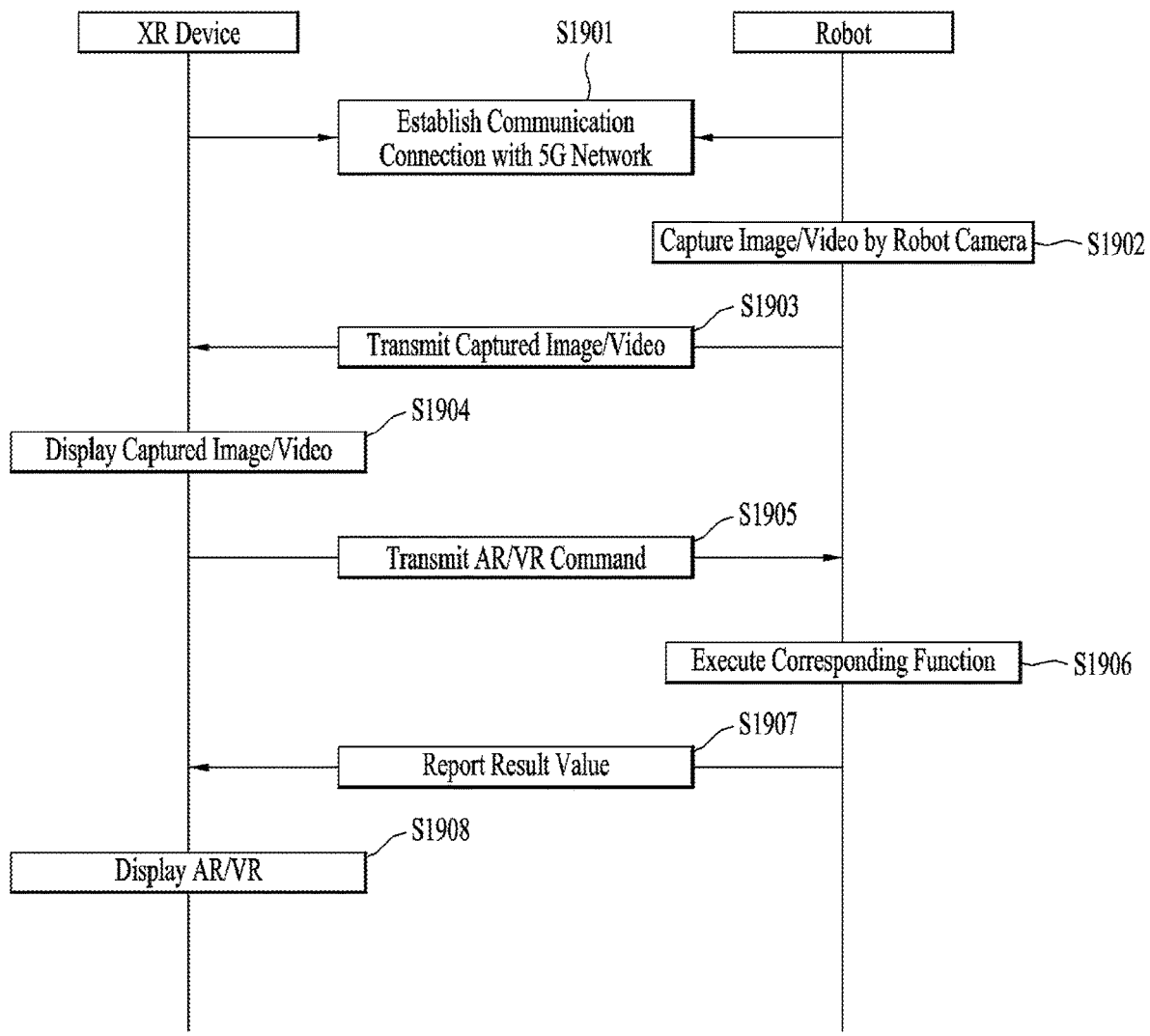
FIG. 19 is a flowchart illustrating a process of controlling a robot by using an XR device.

FIG. 19 is a flowchart illustrating a process of controlling a robot by using an XR device.

The XR device and the robot are connected communicably to a 5G network (S1901). Obviously, the XR device and the robot may transmit and receive data by any other short-range or long-range communication technology without departing from the scope of the present disclosure.

The robot captures an image/video of the surroundings of the robot by means of at least one camera installed on the interior or exterior of the robot (S1902) and transmits the captured image/video to the XR device (S1903). The XR device displays the captured image/video (S1904) and transmits a command for controlling the robot to the robot (S1905). The command may be input manually by a user of the XR device or automatically generated by AI without departing from the scope of the disclosure.

The robot executes a function corresponding to the command received in step S1905 (S1906) and transmits a result value to the XR device (S1907). The result value may be a general indicator indicating whether data has been successfully processed or not, a current captured image, or specific data in which the XR device is considered. The specific data is designed to change, for example, according to the state of the XR device. If a display of the XR device is in an off state, a command for turning on the display of the XR device is included in the result value in step S1907. Therefore, when an emergency situation occurs around the robot, even though the display of the remote XR device is turned off, a notification message may be transmitted.

AR/VR content is displayed according to the result value received in step S1907 (S1908).

According to another embodiment of the present disclosure, the XR device may display position information about the robot by using a GPS module attached to the robot.

The XR device 1300 described with reference to FIG. 13 may be connected to a vehicle that provides a self-driving service in a manner that allows wired/wireless communication, or may be mounted on the vehicle that provides the self-driving service. Accordingly, various services including AR/VR may be provided even in the vehicle that provides the self-driving service.

Figure 20:
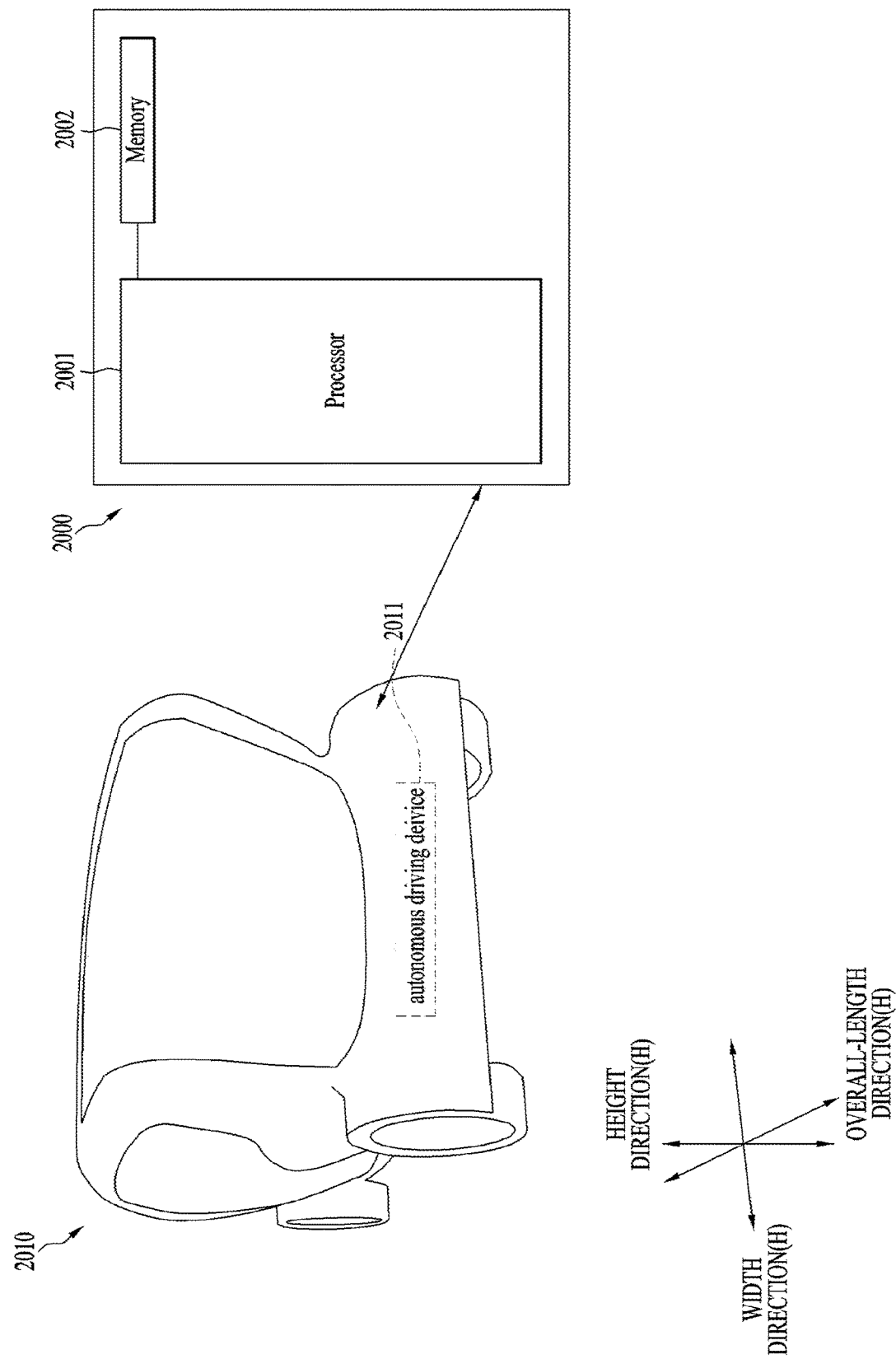
FIG. 20 is a diagram illustrating a vehicle that provides a self-driving service.

FIG. 20 illustrates a vehicle that provides a self-driving service.

According to embodiments of the present disclosure, a vehicle 2010 may include a car, a train, and a motor bike as transportation means traveling on a road or a railway. According to embodiments of the present disclosure, the vehicle 2010 may include all of an internal combustion engine vehicle provided with an engine as a power source, a hybrid vehicle provided with an engine and an electric motor as a power source, and an electric vehicle provided with an electric motor as a power source.

According to embodiments of the present disclosure, the vehicle 2010 may include the following components in order to control operations of the vehicle 2010: a user interface device, an object detection device, a communication device, a driving maneuver device, a main electronic control unit (ECU), a drive control device, a self-driving device, a sensing unit, and a position data generation device.

Each of the user interface device, the object detection device, the communication device, the driving maneuver device, the main ECU, the drive control device, the self-driving device, the sensing unit, and the position data generation device may generate an electric signal, and be implemented as an electronic device that exchanges electric signals.

The user interface device may receive a user input and provide information generated from the vehicle 2010 to a user in the form of a UI or UX. The user interface device may include an input/output (I/O) device and a user monitoring device. The object detection device may detect the presence or absence of an object outside of the vehicle 2010, and generate information about the object. The object detection device may include at least one of, for example, a camera, a LiDAR, an IR sensor, or an ultrasonic sensor. The camera may generate information about an object outside of the vehicle 2010. The camera may include one or more lenses, one or more image sensors, and one or more processors for generating object information. The camera may acquire information about the position, distance, or relative speed of an object by various image processing algorithms. Further, the camera may be mounted at a position where the camera may secure an FoV in the vehicle 2010, to capture an image of the surroundings of the vehicle 1020, and may be used to provide an AR/VR-based service. The LiDAR may generate information about an object outside of the vehicle 2010. The LiDAR may include a light transmitter, a light receiver, and at least one processor which is electrically coupled to the light transmitter and the light receiver, processes a received signal, and generates data about an object based on the processed signal.

The communication device may exchange signals with a device (e.g., infrastructure such as a server or a broadcasting station), another vehicle, or a terminal) outside of the vehicle 2010. The driving maneuver device is a device that receives a user input for driving. In manual mode, the vehicle 2010 may travel based on a signal provided by the driving maneuver device. The driving maneuver device may include a steering input device (e.g., a steering wheel), an acceleration input device (e.g., an accelerator pedal), and a brake input device (e.g., a brake pedal).

The sensing unit may sense a state of the vehicle 2010 and generate state information. The position data generation device may generate position data of the vehicle 2010. The position data generation device may include at least one of a GPS or a differential global positioning system (DGPS). The position data generation device may generate position data of the vehicle 2010 based on a signal generated from at least one of the GPS or the DGPS. The main ECU may provide overall control to at least one electronic device provided in the vehicle 2010, and the drive control device may electrically control a vehicle drive device in the vehicle 2010.

The self-driving device may generate a path for the self-driving service based on data acquired from the object detection device, the sensing unit, the position data generation device, and so on. The self-driving device may generate a driving plan for driving along the generated path, and generate a signal for controlling movement of the vehicle according to the driving plan. The signal generated from the self-driving device is transmitted to the drive control device, and thus the drive control device may control the vehicle drive device in the vehicle 2010.

As illustrated in FIG. 20, the vehicle 2010 that provides the self-driving service is connected to an XR device 2000 in a manner that allows wired/wireless communication. The XR device 2000 may include a processor 2001 and a memory 2002. While not shown, the XR device 2000 of FIG. 20 may further include the components of the XR device 1300 described before with reference to FIG. 13.

If the XR device 2000 is connected to the vehicle 2010 in a manner that allows wired/wireless communication. The XR device 2000 may receive/process AR/VR service-related content data that may be provided along with the self-driving service, and transmit the received/processed AR/VR service-related content data to the vehicle 2010. Further, when the XR device 2000 is mounted on the vehicle 2010, the XR device 2000 may receive/process AR/VR service-related content data according to a user input signal received through the user interface device and provide the received/processed AR/VR service-related content data to the user. In this case, the processor 2001 may receive/process the AR/VR service-related content data based on data acquired from the object detection device, the sensing unit, the position data generation device, the self-driving device, and so on. According to embodiments of the present disclosure, the AR/VR service-related content data may include entertainment content, weather information, and so on which are not related to the self-driving service as well as information related to the self-driving service such as driving information, path information for the self-driving service, driving maneuver information, vehicle state information, and object information.

Figure 21:
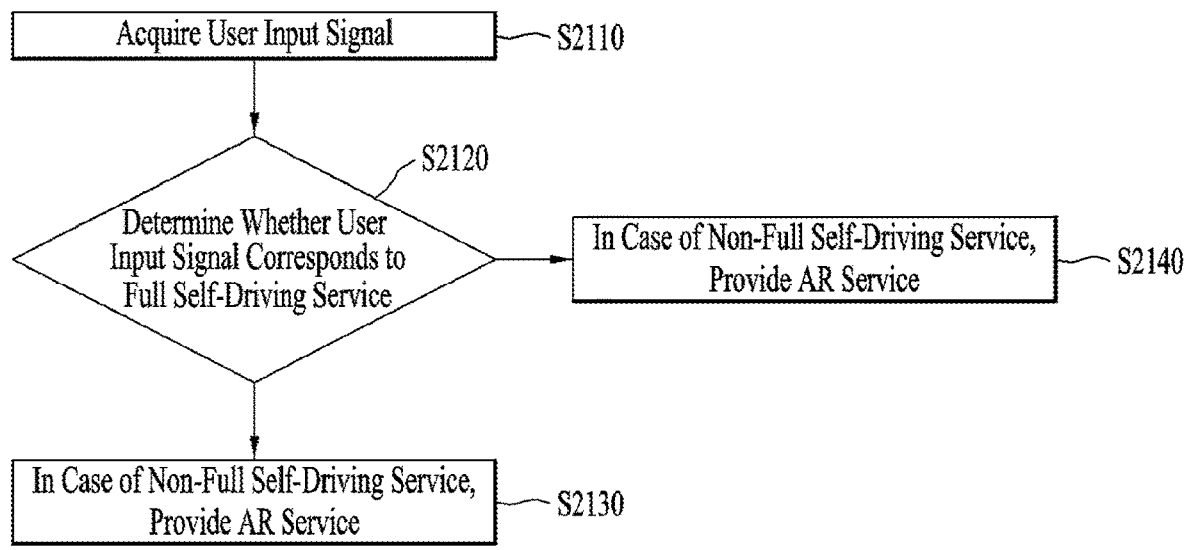
FIG. 21 is a flowchart illustrating a process of providing an augmented reality/virtual reality (AR/VR) service during a self-driving service in progress.

FIG. 21 illustrates a process of providing an AR/VR service during a self-driving service.

According to embodiments of the present disclosure, a vehicle or a user interface device may receive a user input signal (S2110). According to embodiments of the present disclosure, the user input signal may include a signal indicating a self-driving service. According to embodiments of the present disclosure, the self-driving service may include a full self-driving service and a general self-driving service. The full self-driving service refers to perfect self-driving of a vehicle to a destination without a user's manual driving, whereas the general self-driving service refers to driving a vehicle to a destination through a user's manual driving and self-driving in combination.

It may be determined whether the user input signal according to embodiments of the present disclosure corresponds to the full self-driving service (S2120). When it is determined that the user input signal corresponds to the full self-driving service, the vehicle according to embodiments of the present disclosure may provide the full self-driving service (S2130). Because the full self-driving service does not need the user's manipulation, the vehicle according to embodiments of the present disclosure may provide VR service-related content to the user through a window of the vehicle, a side mirror of the vehicle, an HMD, or a smartphone (S2130). The VR service-related content according to embodiments of the present disclosure may be content related to full self-driving (e.g., navigation information, driving information, and external object information), and may also be content which is not related to full self-driving according to user selection (e.g., weather information, a distance image, a nature image, and a voice call image).

If it is determined that the user input signal does not correspond to the full self-driving service, the vehicle according to embodiments of the present disclosure may provide the general self-driving service (S2140). Because the FoV of the user should be secured for the user's manual driving in the general self-driving service, the vehicle according to embodiments of the present disclosure may provide AR service-related content to the user through a window of the vehicle, a side mirror of the vehicle, an HMD, or a smartphone (S2140).

The AR service-related content according to embodiments of the present disclosure may be content related to full self-driving (e.g., navigation information, driving information, and external object information), and may also be content which is not related to self-driving according to user selection (e.g., weather information, a distance image, a nature image, and a voice call image).

While the present disclosure is applicable to all the fields of 5G communication, robot, self-driving, and AI as described before, the following description will be given mainly of the present disclosure applicable to an XR device with reference to following figures.

Figure 22:
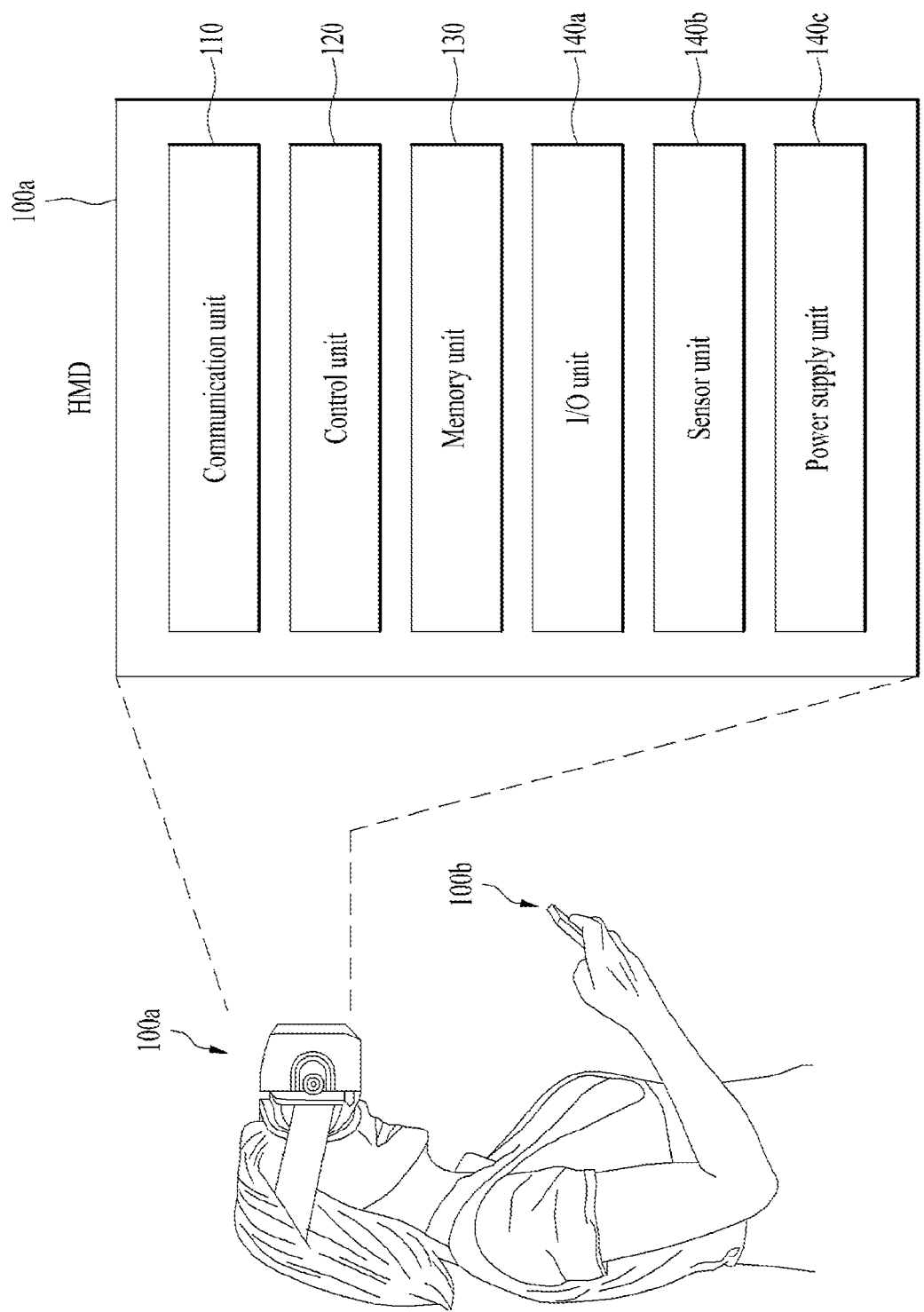
FIG. 22 is a conceptual diagram illustrating an exemplary method for implementing an XR device using an HMD type according to an embodiment of the present disclosure.

FIG. 22 is a conceptual diagram illustrating an exemplary method for implementing the XR device using an HMD type according to an embodiment of the present disclosure. The above-mentioned embodiments may also be implemented in HMD types shown in FIG. 22.

The HMD-type XR device 100*a* shown in FIG. 22 may include a communication unit 110, a control unit 120, a memory unit 130, an input/output (I/O) unit 140*a*, a sensor unit 140*b*, a power-supply unit 140*c*, etc. Specifically, the communication unit 110 embedded in the XR device 10*a* may communicate with a mobile terminal 100*b* by wire or wirelessly.

Figure 23:
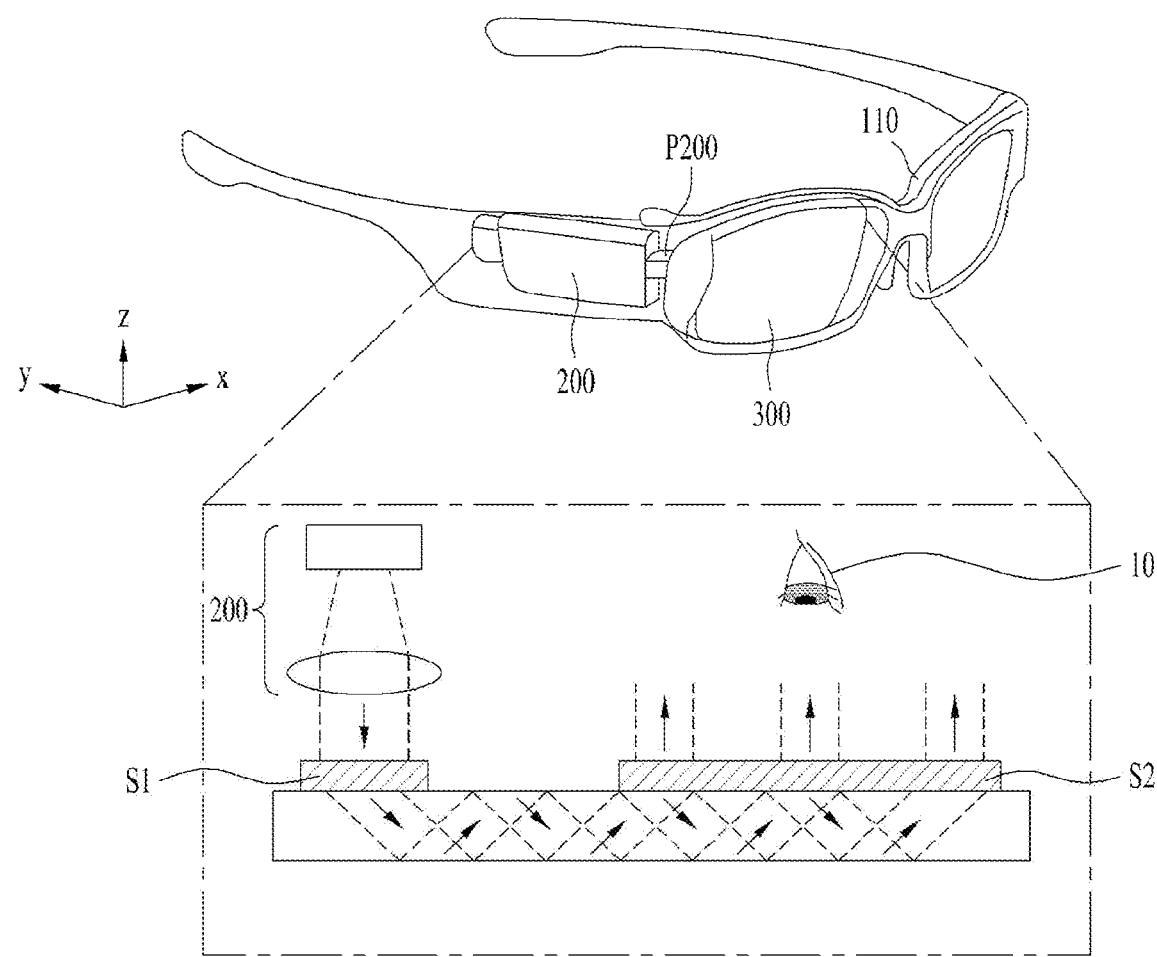
FIG. 23 is a conceptual diagram illustrating an exemplary method for implementing an XR device using AR glasses according to an embodiment of the present disclosure.

FIG. 23 is a conceptual diagram illustrating an exemplary method for implementing an XR device using AR glasses according to an embodiment of the present disclosure. The above-mentioned embodiments may also be implemented in AR glass types shown in FIG. 23.

Referring to FIG. 23, the AR glasses may include a frame, a control unit 200, and an optical display unit 300.

Although the frame may be formed in a shape of glasses worn on the face of the user 10 as shown in FIG. 23, the scope or spirit of the present disclosure is not limited thereto, and it should be noted that the frame may also be formed in a shape of goggles worn in close contact with the face of the user 10.

The frame may include a front frame 110 and first and second side frames.

The front frame 110 may include at least one opening, and may extend in a first horizontal direction (i.e., an X-axis direction). The first and second side frames may extend in the second horizontal direction (i.e., a Y-axis direction) perpendicular to the front frame 110, and may extend in parallel to each other.

The control unit 200 may generate an image to be viewed by the user 10 or may generate the resultant image formed by successive images. The control unit 200 may include an image source configured to create and generate images, a plurality of lenses configured to diffuse and converge light generated from the image source, and the like. The images generated by the control unit 200 may be transferred to the optical display unit 300 through a guide lens P200 disposed between the control unit 200 and the optical display unit 300.

The controller 200 may be fixed to any one of the first and second side frames. For example, the control unit 200 may be fixed to the inside or outside of any one of the side frames, or may be embedded in and integrated with any one of the side frames.

The optical display unit 300 may be formed of a translucent material, so that the optical display unit 300 can display images created by the control unit 200 for recognition of the user 10 and can allow the user to view the external environment through the opening.

The optical display unit 300 may be inserted into and fixed to the opening contained in the front frame 110, or may be located at the rear surface (interposed between the opening and the user 10) of the opening so that the optical display unit 300 may be fixed to the front frame 110. For example, the optical display unit 300 may be located at the rear surface of the opening, and may be fixed to the front frame 110 as an example.

Referring to the XR device shown in FIG. 23, when images are incident upon an incident region S1 of the optical display unit 300 by the control unit 200, image light may be transmitted to an emission region S2 of the optical display unit 300 through the optical display unit 300, images created by the controller 200 can be displayed for recognition of the user 10.

Accordingly, the user 10 may view the external environment through the opening of the frame 100, and at the same time may view the images created by the control unit 200.

Figure 24:
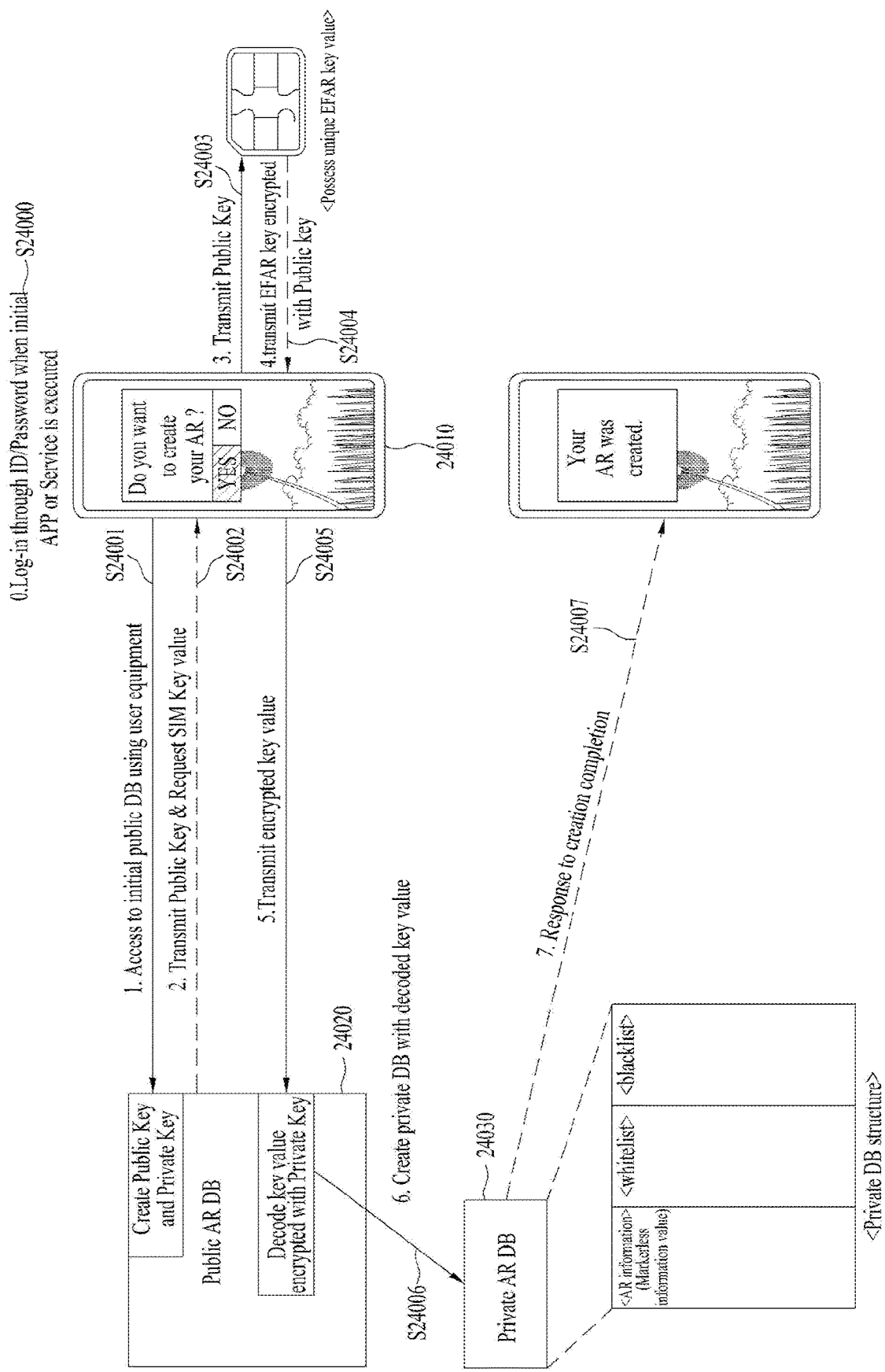
FIG. 24 is a conceptual diagram illustrating a method for allowing an XR device to access a database (DB) according to embodiments of the present disclosure.

FIG. 24 is a conceptual diagram illustrating a method for allowing the XR device to access a database (DB) according to embodiments of the present disclosure.

The XR device according to embodiments of the present disclosure can access or create a database (DB) using the following method.

In association with a process S24000, the XR device may be used by a user. In the present disclosure, the XR device may refer to a mobile device. The XR device 24010 may receive an application request or a service execution request from the user. The XR device 24010 may receive an ID or password from the user, and may allow the user to log in to the device.

In association with a process S24001, the XR device may access a public DB 24020. In the present disclosure, the public DB 24020 may refer to a database (DB) which all users can access. The public DB may include AR information. In other words, when a plurality of XR devices and a plurality of users are present, each user can access the public DB through the XR device. In the present disclosure, AR information contained in the public DB may hereinafter be referred to as public AR information.

In association with a process S24002, the XR device 24010 may receive a public key from the public DB 24020. The XR device 24010 may receive a request for a SIM key about the XR device 24010 from the public DB 24020. In this case, when the XR device 24010 initially accesses the public DB 24020, the public DB 24020 may generate a public key and/or a private key. The XR device 24010 may receive the generated public key from the public DB 24020.

In association with processes S24003 and S24004, the XR device 24010 may encrypt an Emergency First Aid Responder (EFAR) key about a subscriber identification module (SIM) of the XR device 24010 using the public key. The XR device 24010 may include a unique Emergency First Aid Responder (EFAR) key. The XR device 24010 may encrypt a unique key of the XR device 24010 using the public key of the public DB 24020.

In the present disclosure, the EFAR key may refer to unique information of the XR device 24010. According to the embodiments of the present disclosure, the XR device 24010 may be a mobile device and/or AR glasses, etc.

If the XR device 24010 is a mobile device, the EFAR key may be unique information for identifying a subscriber identification module (SIM) chip contained in the mobile device. If the XR device 24010 is implemented as the AR glasses, the EFAR key may be unique information for identifying the AR glasses. In the present disclosure, the EFAR key may be referred to as ID information, first information, or the like.

In association with a process S24005, the XR device 24010 may transmit an encrypted key to the public DB 24020. The public DB 24020 may decode the encrypted key received as the private key.

In association with a process S24006, the XR device 24010 may generate the private DB 24030 using the decoded key. In the present disclosure, the private DB 24030 may refer to a database (DB) which only a specific XR device having a unique key can access. The private DB 24030 may include AR information. The private DB 24030 may include AR information provided with markerless information, a whiteklist, and/or a blacklist. The whitelist and the blacklist according to embodiments of the present disclosure will hereinafter be described in detail. In the present disclosure, AR information contained in the private DB may be referred to as private AR information.

In association with a process S24007, the XR device 24010 may inform the user of creation of the AR mode. The XR device 24010 may inform the user of creation of the AR mode based on display information, voice information, or the like.

5G Coupling

In addition, the XR device 24010 according to the embodiments of the present disclosure may construct the public DB 24020 and the private DB 24030 based on the above-mentioned 3GPP NR (e.g., 5G)-based system shown in FIGS. 1 to 9.

Figure 25:
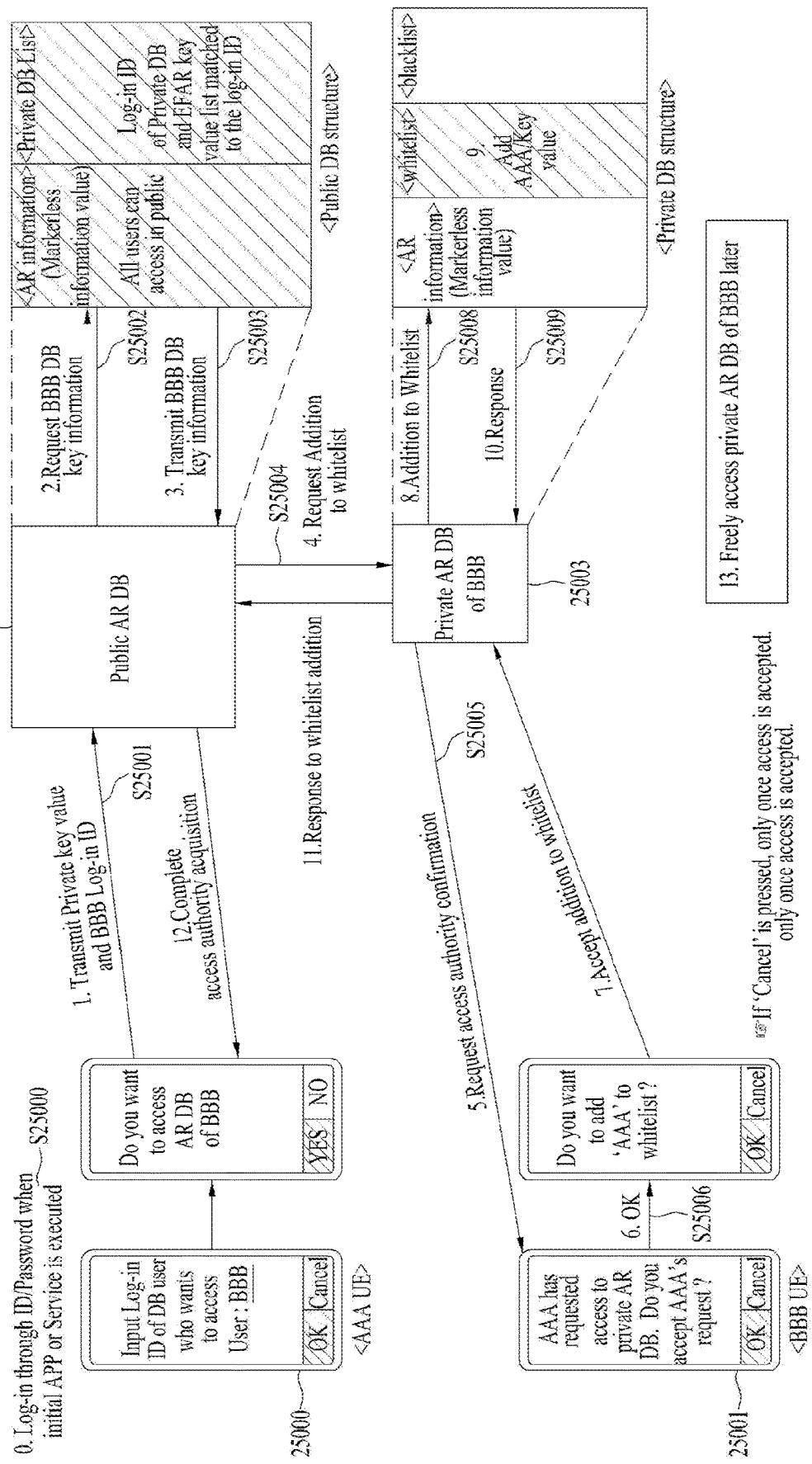
FIG. 25 is a conceptual diagram illustrating a method for allowing an XR device to add and control a whitelist according to embodiments of the present disclosure.

FIG. 25 is a conceptual diagram illustrating a method for allowing the XR device to add and control the whitelist according to embodiments of the present disclosure.

A method for allowing a first XR device 25000 and a second XR device 25001 to create or control the whitelist using the public DB 25002 and the private DB 25003 according to the embodiments of the present disclosure will hereinafter be described with reference to FIG. 25.

The first XR device 25000 may refer to a device used by the first user, for example, User AAA. The second device 25001 may refer to a device used by the second user, for example, User BBB.

In association with a process S25000, the first XR device 25000 may receive an initial application request or a service execution request from the first user, and may receive an ID and/or password from the first user, so that the first user may allow the first user to log in to the device. The ID and the password may be information about the first user. The first user AAA may access the private DB 25003 of the second user BBB using the first XR device.

The public DB 25002 may refer to a public DB which all users can access.

The private DB 25003 may refer to a DB of a specific person. In order for other users other than the authorized user of the private DB 25003 to access the private DB, an authentication process such as whitelist processing is needed.

In the present embodiment, the private DB 25003 may hereinafter be referred to as a DB of the second user BBB for convenience of description.

The first XR device 25000 may receive a request to access the second-user DB from the first user. The first XR device 25000 may enable the first user AAA to confirm that the first user AA has accessed the DB of the second user BBB.

In association with a process S25001, after the first XR device 25000 has confirmed that the first user has accessed the DB of the second user BBB, the first XR device may transmit the private key of the first user and/or a log-in ID of the second user BBB to the public DB. The first XR device 25000 may transmit, to the public DB 25002, the private key of the first user and/or the ID of the second user who is a user of the private DB which the first user wishes to access.

In association with a process S25022, the first XR device may request a database (DB) key of the second user BBB from the public DB. In the present disclosure, the public DB may include AR information provided with a markerless information value and/or the list of private DBs (hereinafter referred to as a private-DB list). AR information of the public DB may be commonly accessible by all users. The private-DB list may include a log-in ID of the private DB and the list of matched EFAR keys.

Markerless information of the AR information may be information corresponding to a specific type and/or a specific category. The AR information may include marker information and/or markerless information.

The private-DB list may include log-in ID information of the private DB for the user, and may refer to the list of EFAR keys matched to the user of the private DB.

In association with a process S25003, the first XR device 25000 may receive a DB key of the second user BBB.

In association with a process S25004, the first XR device 25000 may request that the whitelist for the first user AAA be added to the private DB of the second user BBB.

In association with a process S25005, the second XR device 25001 may confirm an access request of the first user about the second user.

In association with a process S25006, the second XR device 25001 may confirm the request of the first user. In this case, when the second XR device has confirmed the request of the first user, the first user AAA may be added to the whitelist. When the second XR device has cancelled the request of the first user, the first XR device may not access the private DB 25003 of the second user. In accordance with the embodiments of the present disclosure, when the second XR device has cancelled the above request, the first XR device can access the private DB 25003 of the second user only once. In this case, the first user may not be added to the whitelist.

In association with a process S25007, when the second XR device 25001 accepts the access request of the first user, information indicating that the first user is added to the whitelist may be transmitted to the private DB 25003 of the second user BBB.

In association with a process S25008, the second XR device 25001 may add the first user AAA and/or the key to the whitelist contained in the private DB.

In association with a process S25009, the second XR device 25001 may receive a response signal indicating completion of whitelist update.

If the first user AAA is added to the whitelist of the private DB 25003 of the second user BBB, the first user can freely access the private DB of the second user. The first user can freely use AR information contained in the private DB of the second user.

Figure 26:
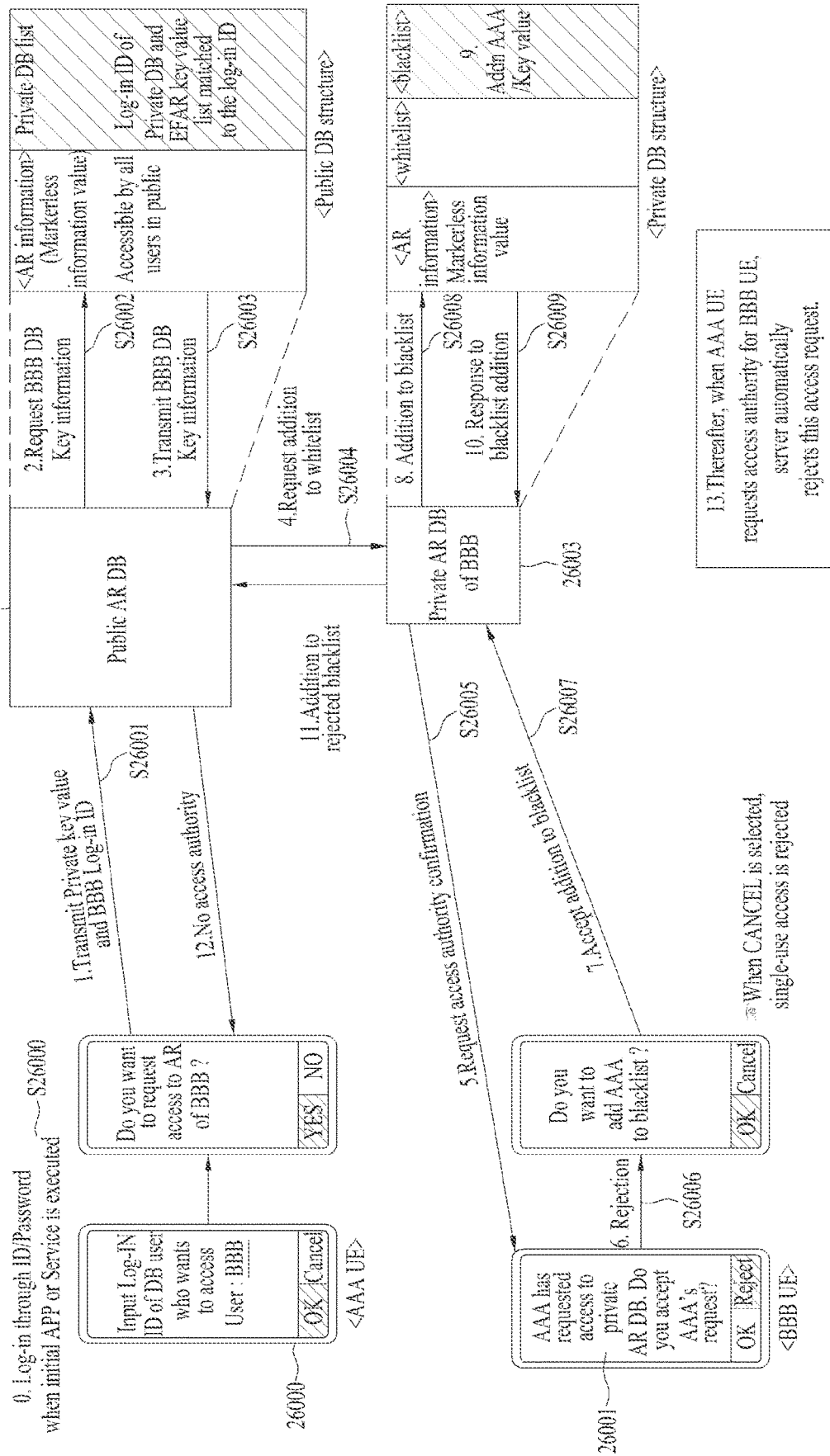
FIG. 26 is a conceptual diagram illustrating a method for allowing an XR device to add and control a blacklist according to embodiments of the present disclosure.

FIG. 26 is a conceptual diagram illustrating a method for allowing the XR device to add and control a blacklist according to embodiments of the present disclosure.

A method for allowing a first XR device 26000 and a second XR device 26001 to create or control the whitelist using the public DB 26002 and the private DB 26003 according to the embodiments of the present disclosure will hereinafter be described with reference to FIG. 26.

The first XR device 2600 may refer to a device used by the first user, for example, the user AAA. The second XR device 26001 may refer to a device used by the second user, for example, the user BBB.

A process S26000 may correspond to the process S25000. A process S26001 may correspond to the process S25001. A process S26002 may correspond to the process S25002. A process S26003 may correspond to the process S25003. A process S26004 may correspond to the process S25004. A process S26005 may correspond to the process S25005.

In association with a process S26006, the second XR device 26001 may reject the access request of the first user. The second XR device 26001 may inform the second user that the first user will be added to the blacklist.

In association with a process S26007, the second XR device may transmit, to the private DB 26003 of the second user BBB, an acknowledgement (ACK) message for accepting that the first user is added to the blacklist.

In association with a process S26008, the second XR device 26001 may add the first user AAA to the blacklist of the private DB 26003. The first user AAA and the key may be added to the blacklist.

In association with a process S26009, the second XR device 26001 may receive a response to such blacklist addition from the private DB 26003.

When the first XR device 26000 transmits the access request of the second user who desires to access the private DB 26003, the server may automatically reject the request of the first user corresponding to the blacklist. The second XR device 26001 may not inform the user of the access request of the first user corresponding to the blacklist using pop-up messaging or the like.

Figure 27:
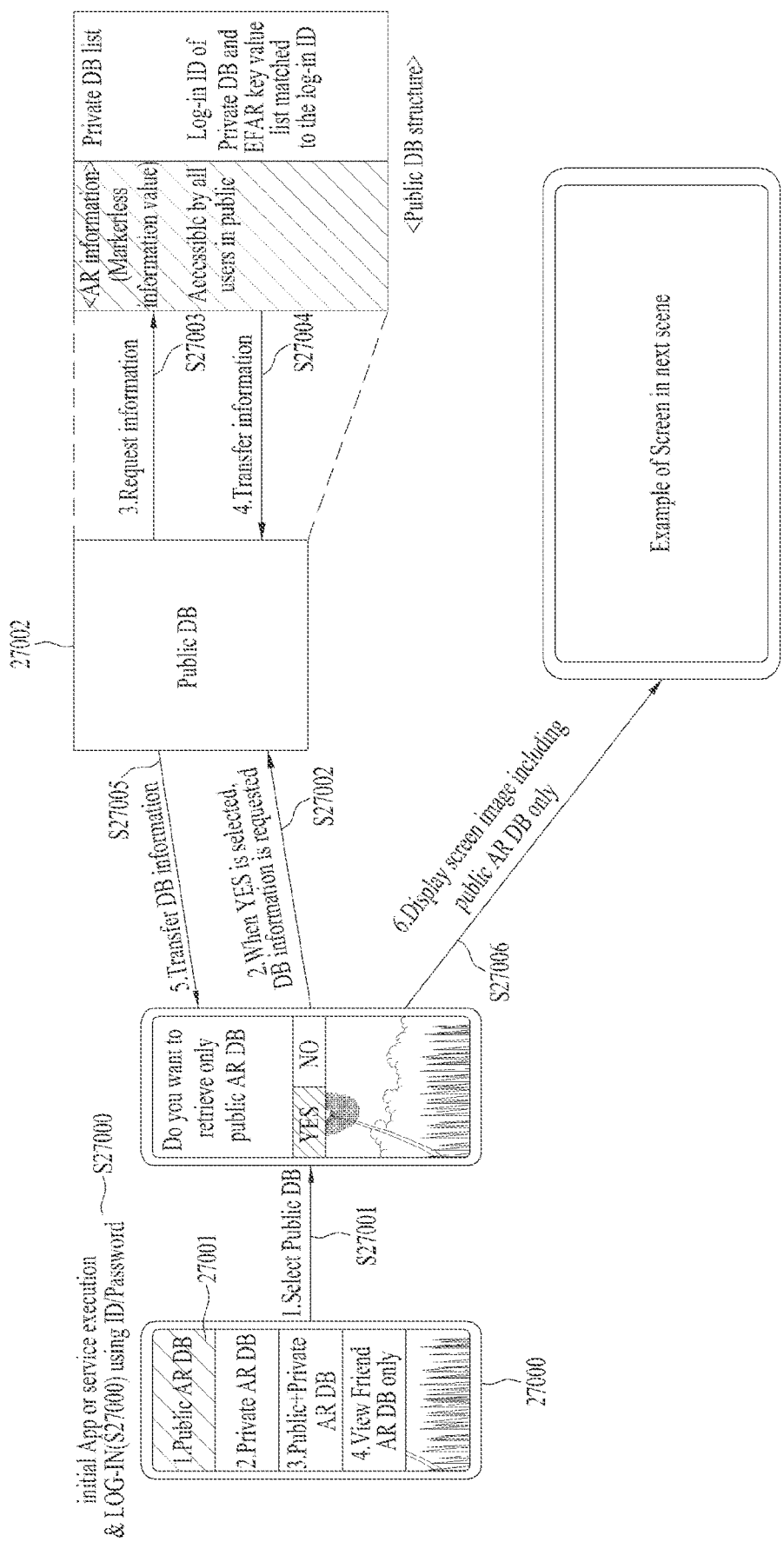
FIG. 27 is a conceptual diagram illustrating a method for allowing an XR device to use a public DB according to embodiments of the present disclosure.

FIG. 27 is a conceptual diagram illustrating a method for allowing the XR device to use the public DB according to embodiments of the present disclosure.

The XR device 27000 according to the embodiments may provide various modes including a public DB, a private DB, a public/private DB, a friend DB, etc.

A mode 27001 of the public DB (i.e., the public DB mode 27001) may refer to a mode in which AR information contained in the public DB can be used using the public DB only. The public DB mode 27001 can be implemented as follows.

In association with a process S27000, the XR device 27000 may receive an initial application command or a service execution command from the user. The XR device 27000 may receive the ID and/or password from the user, and may allow the user to log in to the device (or server).

In association with a process S27001, the XR device 27000 may receive a signal for selecting the public DB mode (hereinafter referred to as the public-DB-mode selection signal) from the user.

In association with a process S27002, the XR device 27000 may receive the public-DB-mode selection signal from the user, and may transmit a request for DB information to the public DB 27002.

In association with a process S27003, the XR device 27000 may request AR information from the public DB 27002.

In association with a process S27004, the XR device 27000 may receive AR information from the public DB 27002.

In association with a process S27005, the XR device 27000 may receive AR information, the whitelist, and/or the blacklist from the public DB 27002.

In association with a process S27006, the XR device 27000 may display AR information based on the AR information of the public DB 27002. In accordance with the embodiments of the present disclosure, AR information may be displayed on the screen of the XR device 27000. If the XR device 27000 is a mobile device, the AR information may be displayed in the display region. If the XR device 27000 is a multimedia device, AR information may be displayed in the display region. If Device-A 27000 is implemented as AR glasses, AR information may be displayed in the display region. A detailed display method will be given below.

Figure 28:
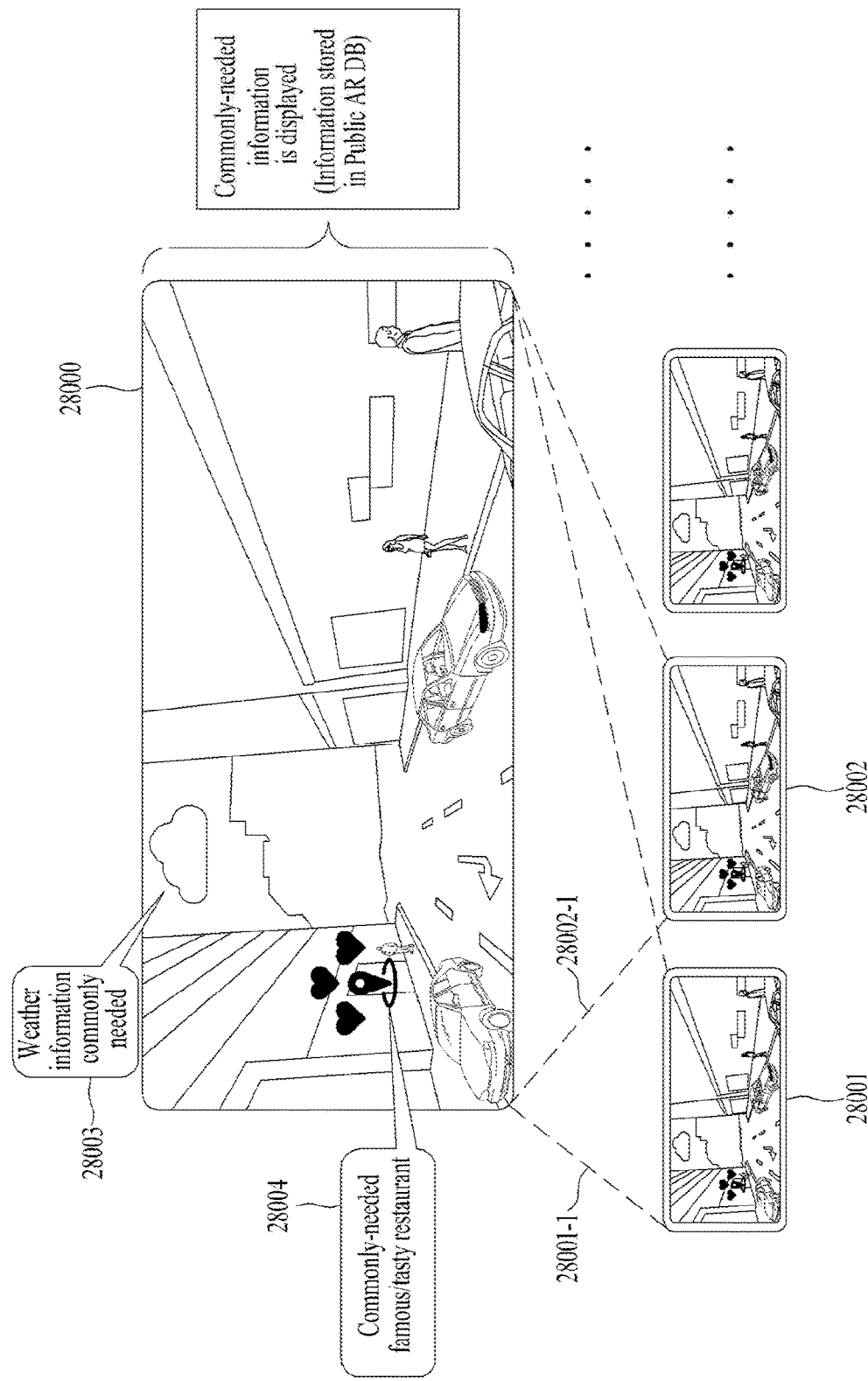
FIG. 28 is a view illustrating an exemplary display of AR information for use in a public DB mode.

FIG. 28 is a view illustrating an exemplary display of AR information for use in the public DB mode.

Referring to FIG. 28, the display 28000 according to the embodiments may display information based on AR information of the public DB. The display 28000 may display an example of the AR information.

In response to the position or viewpoint of the XR device according to the embodiments, the display 28000 may be classified into a first display region 28001-1 in which the XR device 28001 having a first viewpoint is displayed and a second display region 28002-1 in which the XR device 28002 having a second viewpoint is displayed.

The display 28000 according to the embodiments of the present disclosure may include only AR information of the public DB. AR information of the public DB may be commonly needed for all users. For example, AR information of the public DB may include weather information 28003 and/or place information 28004. In the present disclosure, AR information stored in a database (DB) may refer to information for representing the display related to the AR information, and the like. For example, AR information of the public DB may include weather information and place information. The weather information 28003 and/or the place information 28004 may be displayed as images or symbols based on AR information. In the present disclosure, the weather information 28003 and/or the place information 28004 may be referred to as an AR object.

If the region facing the XR devices 28001 and 28002 includes the sky, the weather information 28003 may appear in the sky. The XR device may display weather information indicating sky-related information based on AR information. Information such as weather may be commonly needed for all users. For example, the XR device may display such weather information indicating whether the weather is sunny, cloudy, or raining, etc. using images or symbols.

If the region located to face the XR devices 28001 and 28002 includes a specific spot or building, the place information 28004 may appear in the specific spot or building. The XR device may display information related to the specific spot or building based on the AR information. For example, when a restaurant is present in the display region of the XR device and the present restaurant is a famous and tasty restaurant, the XR device may display a mark indicating the famous restaurant based on images, symbols, etc.

Figure 29:
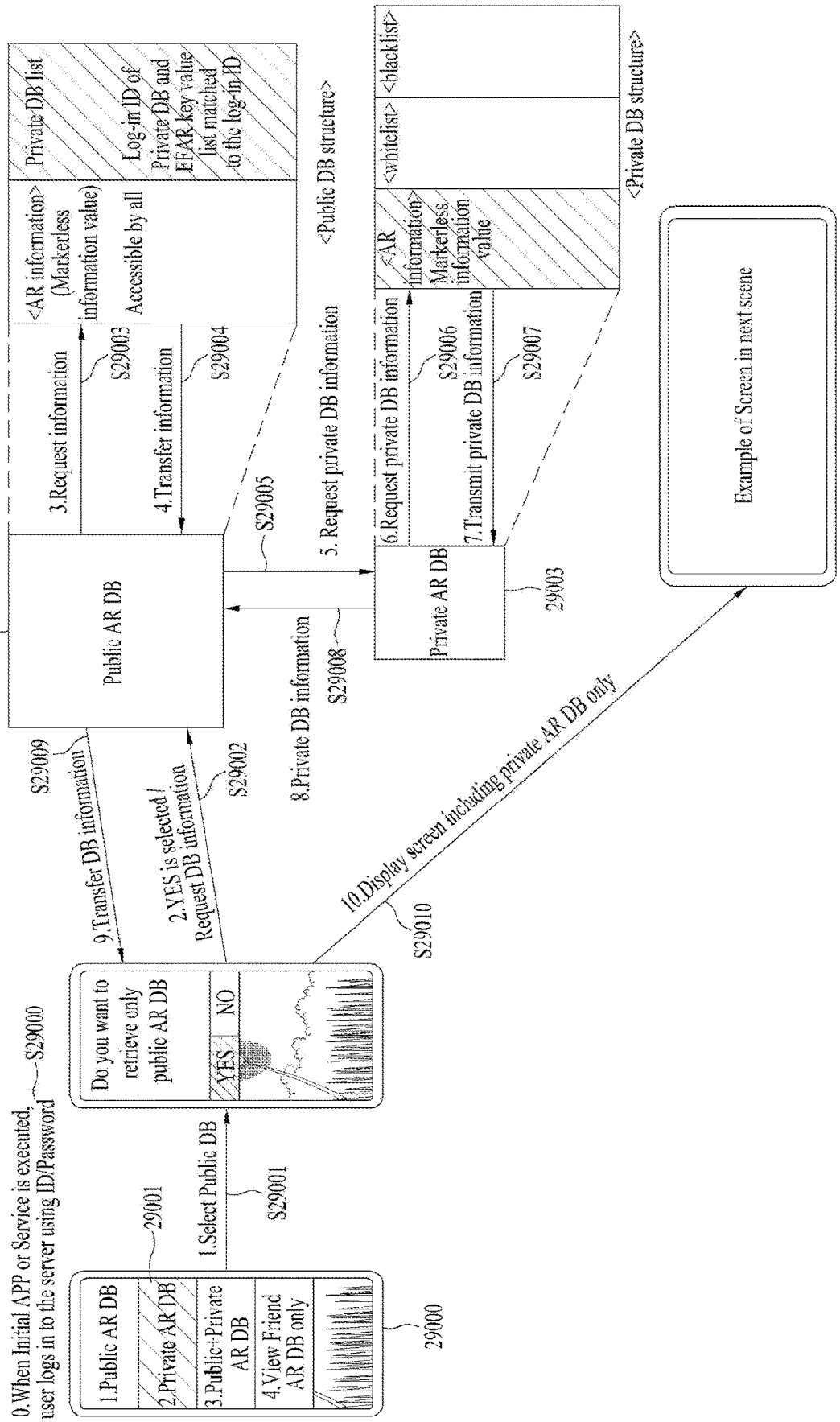
FIG. 29 is a view illustrating a method for allowing an XR device to use a private DB according to embodiments of the present disclosure.

FIG. 29 is a view illustrating a method for allowing the XR device 29000 to use the private DB according to embodiments of the present disclosure.

Referring to FIG. 29, the XR device 29000 according to the embodiments of the present disclosure may provide various modes including a public DB, a private DB, a public/private DB, a friend DB, etc.

A mode 29001 of the private DB (i.e., the private DB mode 29001) may refer to a mode in which AR information contained in the private DB can be used using the private DB only. The private DB mode 29001 can be implemented using the following method.

In association with a process S29000, the XR device 2900 may receive an initial application command or a service execution command from the user. The XR device 29000 may receive the ID and/or password from the user, and may allow the user to log in to the device (or server).

In association with a process S29001, the XR device 29000 may receive an input signal from the user, and may inform the user whether the private DB mode is selected.

In association with a process S29002, the XR device 2900 may receive a signal of selecting the private DB mode (hereinafter referred to as the private-DB-mode selection signal) from the user, and may transmit a DB information request to the public DB 29002.

In association with a process S29003, the XR device 29000 may request information of the private DB key from the public DB 29002. The public DB 29002 may include AR information and the list of private DBs (i.e., the private-DB list), which are capable of being acquired by all users. The private-DB list may include a log-in ID of the private DB and the list of EFAR keys matched to the log-in ID.

In association with a process S29004, the XR device 29000 may receive the private-DB key information from the public DB 29002.

In association with a process S29005, the XR device 29000 may request the private-DB information from the private DB 29003. The private DB 29003 may refer to a database (DB) that can be accessed by the user for the private DB, instead of by all users. The private DB 29003 may include AR information, the whitelist, and/or the blacklist. The AR information may include markerless information.

In association with a process S29006, the XR device 29000 may request the private DB information (i.e., AR information, the whitelist, and/or the blacklist) from the private DB 29003.

In association with a process S29007, the XR device 29000 may receive the private-DB information from the private DB 29003. In accordance with the embodiments of the present disclosure, the XR device 29000 may receive the private-DB information through the private DB 29003, or the private DB 29003 may transmit the private-DB information to the public DB 29002. The XR device 29000 may also receive DB information through the public DB 29002.

In association with a process S29008, the private DB 29003 may transmit the private-DB information to the public DB 29002. The private-DB information may include AR information, the whitelist, and/or the blacklist, etc.

In association with a process S29009, the XR device 29000 may receive DB information from the public DB 29002.

In association with a process S29010, the XR device 29000 may display AR information using information stored in the private DB 29003. In accordance with the embodiments of the present disclosure, the AR information may be displayed on the screen of the XR device 29000. If the XR device 29000 is a mobile device, AR information may be displayed in the display region. If the XR device 29000 is a multimedia device, AR information may be displayed in the display region. If the XR device 29000 is implemented as AR glasses, AR information may be displayed in the display region. A detailed display method will hereinafter be given.

Figure 30:
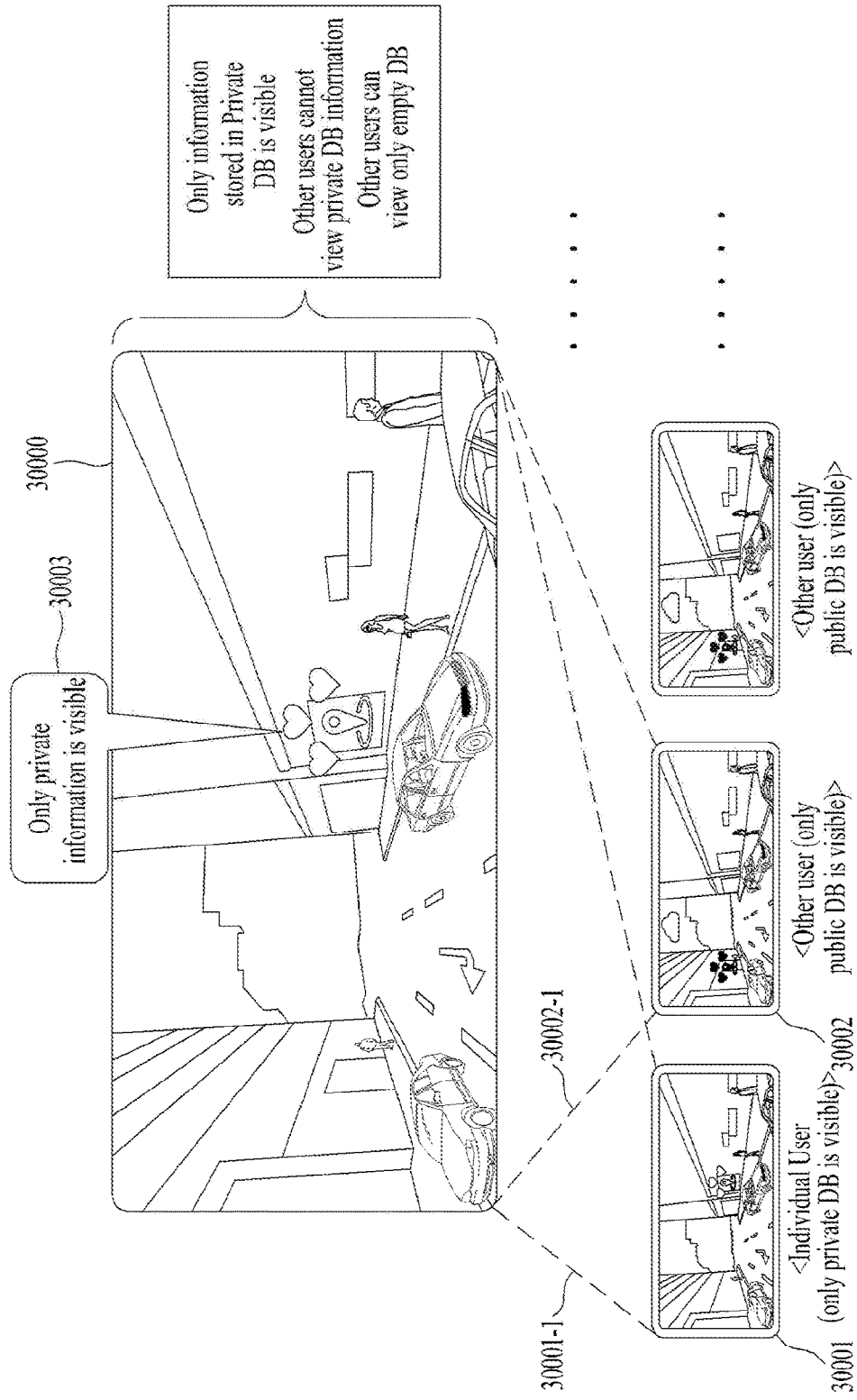
FIG. 30 is a view illustrating a display of AR information for use in a private DB mode.

FIG. 30 is a view illustrating a display of AR information for use in the private DB mode.

Referring to FIG. 30, the display 30000 according to the embodiments of the present disclosure may display information based on AR information of the private DB. The display 30000 may be an example of a display of the AR information.

In response to the position or viewpoint of the XR device according to the embodiments, the display 30000 may be classified into a first display region 30001-1 in which the XR device 30001 having a first viewpoint is displayed and a second display region 30002-1 in which the XR device 30002 having a second viewpoint is displayed.

The display according to the embodiments of the present disclosure may include only AR information 30003 of the private DB. The AR information of the private DB may indicate information of a specific user. For example, AR information of the private DB may be either AR information for the individual user or AR information including information related to the individual user. Even though the specific user and other users are viewing the same place, it is impossible for the other users to view the private AR information.

AR information of the private DB can be viewed by the individual user only. For example, when a specific building is in the display region of the XR device and the specific building is a building related to the individual user, AR information visible only to the individual user may be displayed in the specific building using images, symbols, or the like. In addition, if the specific building or the specific place is of interest to the individual user, or if a notification message about the specific building or the specific place should be sent to the individual user, AR information can be displayed through images, symbols, or the like.

Although plural users or plural XR devices display the same region, different AR information can be displayed for different users. At this time, it is possible for the other users to view only AR information stored in the public DB.

Figure 31:
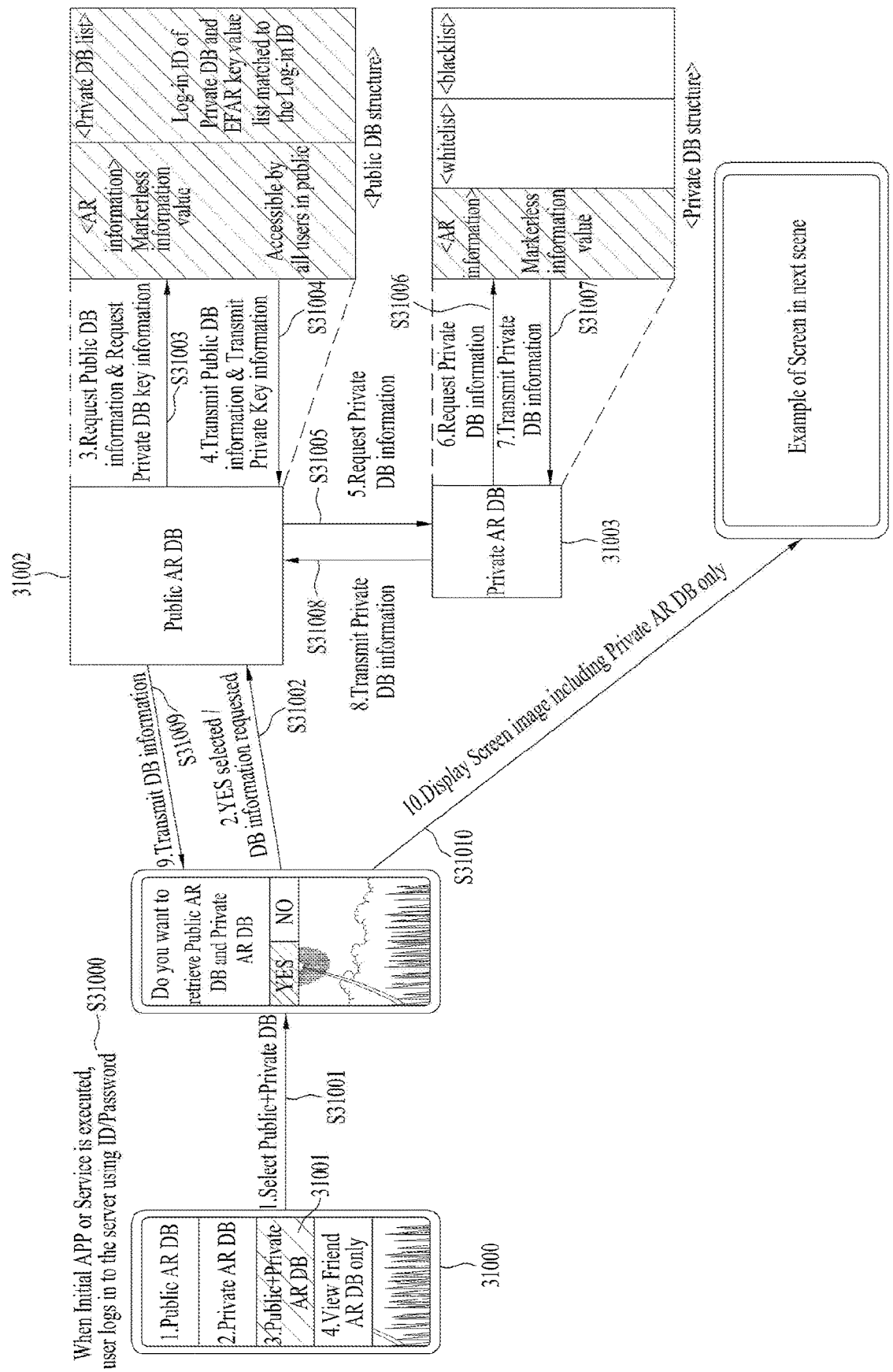
FIG. 31 is a conceptual diagram illustrating a method for allowing the XR device to use a public DB and a private DB according to embodiments of the present disclosure.

FIG. 31 is a conceptual diagram illustrating a method for allowing the XR device to use the public DB and the private DB according to embodiments of the present disclosure.

The XR device 31000 according to the embodiments of the present disclosure may provide various modes including a public DB, a private DB, a public/private DB, a friend DB, etc.

The public-DB-and-private-DB mode 31001 may refer to a mode in which AR information contained in the public DB 31002 and AR information contained in the private DB 31003 can be utilized. The public-DB-and-private-DB mode 31001 can be implemented as follows.

In association with a process S31000, the XR device 31000 may receive an initial application command or a service execution command from the user. The XR device 31000 may receive the ID and/or password from the user, and may enable the user to log in to the device.

In association with a process S31001, the XR device 31000 may receive a signal for selecting the public-DB-and-private-DB mode (i.e., the public-DB-and-private-DB mode selection signal) from the user.

In association with a process S31002, the XR device 31000 may receive the public-DB-and-private-DB mode selection signal from the user, and may transmit a signal for requesting the DB information (i.e., DB-information request) to the public DB 31002.

In association with a process S31003, the XR device 31000 may transmit the public-DB-information request to the public DB 31002, and may request information of the private DB key from the public DB 31002. The public DB 31002 may include AR information including markerless information.

AR information can be commonly used by all users, and can also be accessed by all users. The public DB 31002 may include the private-DB list. The private-DB list may include a log-in ID of the private DB and the list of matched EFAR keys.

In association with a process S31004, the XR device 31000 may receive the public-DB information and the private-DB key information from the public DB 31002.

In association with a process S31005, the XR device 31000 may request the private-DB information from the private DB 310003. The private-DB key stored in the public DB 310002 may be used. The private DB 29003 may be a database (DB) that can be accessed by the user for the private DB, instead of by all users. The private DB 31003 may include AR information, the whitelist, and/or the blacklist. The AR information may include markerless information.

In association with a process S31006, the XR device 31000 may request the private-DB information (i.e., AR information, the whitelist, and/or the blacklist) from the private DB 31003.

In association with a process S31007, the XR device 31000 may receive the private-DB information from the private DB 31003. In accordance with the embodiments of the present disclosure, the XR device 31000 may receive the private-DB information through the private DB 31003, the private DB 31003 may transmit the private-DB information to the public DB 31002, and the XR device 31000 may further receive DB information through the public DB 31002.

In association with a process S31008, the private DB 31003 may transmit the private-DB information to the public DB 31002. The private-DB information may include AR information, the whitelist, and/or the blacklist, etc.

In association with a process S31009, the XR device 31000 may receive DB information from the public DB 31002.

In association with a process S31010, the XR device 31000 may display AR information using information of the private DB 31003. In accordance with the embodiments, the AR information may be displayed on the screen of the XR device 31000. If the XR device 31000 is a mobile device, AR information may be displayed in the display region. If the XR device 31000 is a multimedia device, AR information may be displayed in the display region. If the XR device 31000 is implemented as the AR glasses, AR information may be displayed in the display region. A detailed display method will hereinafter be given.

Figure 32:
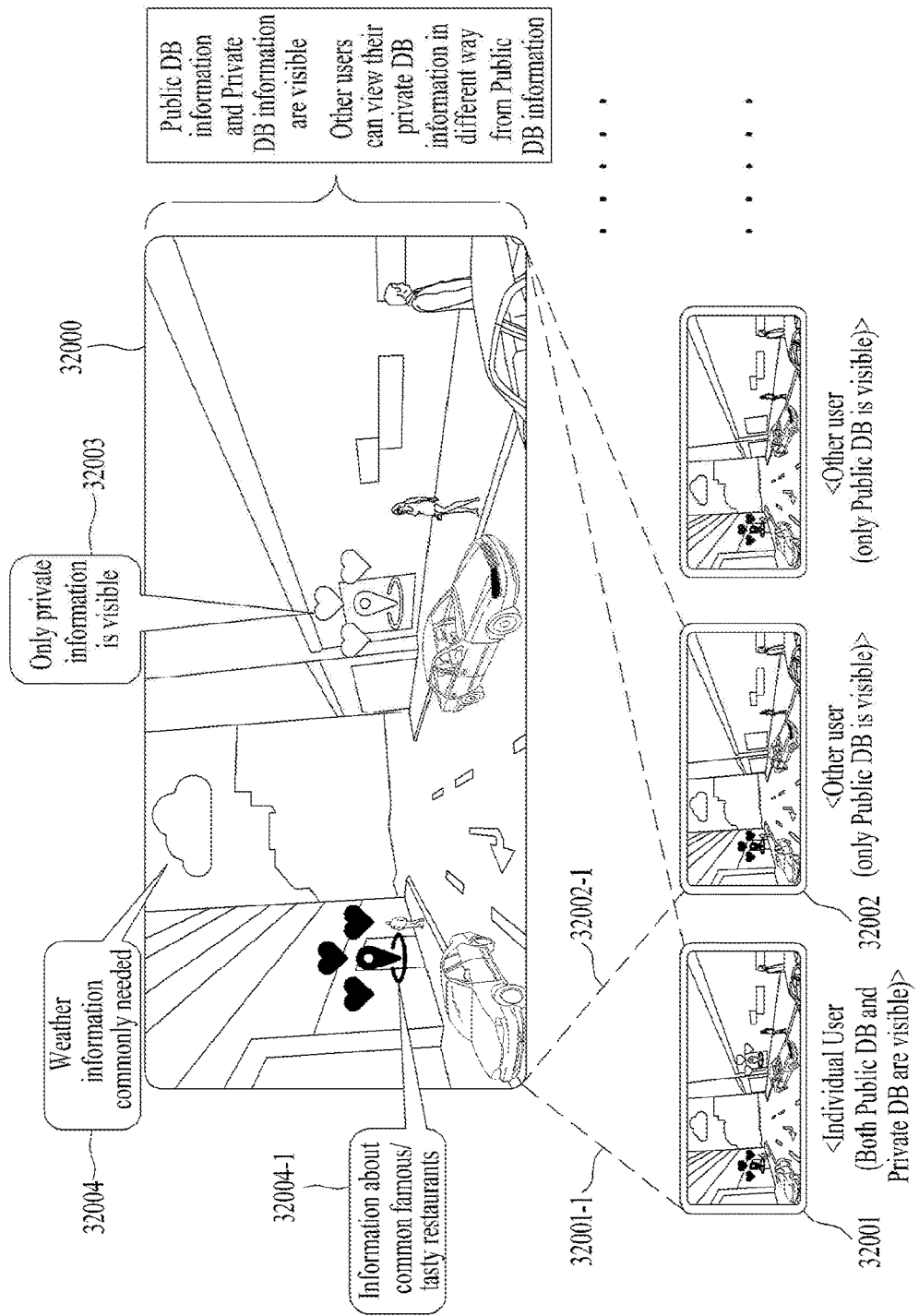
FIG. 32 is a view illustrating a display of AR information about a public DB mode and AR information about a private DB mode.

FIG. 32 is a view illustrating a display of AR information about the public DB mode and a display of AR information about the private DB mode.

The display 32000 according to the embodiments may display information based on AR information of the public DB and AR information of the private DB. The display 32000 may be an example of a display on which AR information is displayed.

In response to the position or viewpoint of the XR device according to the embodiments, the display 32000 may be classified into a first display region 32001-1 in which the XR device 32001 having a first viewpoint is displayed and a second display region 32002-1 in which the XR device 32002 having a second viewpoint is displayed. The display 32000 according to the embodiments may include not only the AR information 32003 of the private DB, but also AR information 32004 and 32004-1 of the public DB.

The AR information 32002 of the private DB may be displayed for each user. In this case, the AR information 32003 of the private DB may be displayed for each user, not only based on AR information contained in the private DB, but also based on images or symbols, etc.

The AR information 32004 of the public DB may be weather information that is commonly needed for all users.

AR information 32004-1 of the public DB may be specific information related to buildings or places commonly needed for all users. For example, the AR information 32004-1 may be information about famous restaurants commonly interest to all users.

Since the XR device 32001 uses not only AR information of the public DB and AR information of the private DB, the XR device 32001 can provide not only AR information for a specific user, but also commonly-needed AR information.

Figure 33:
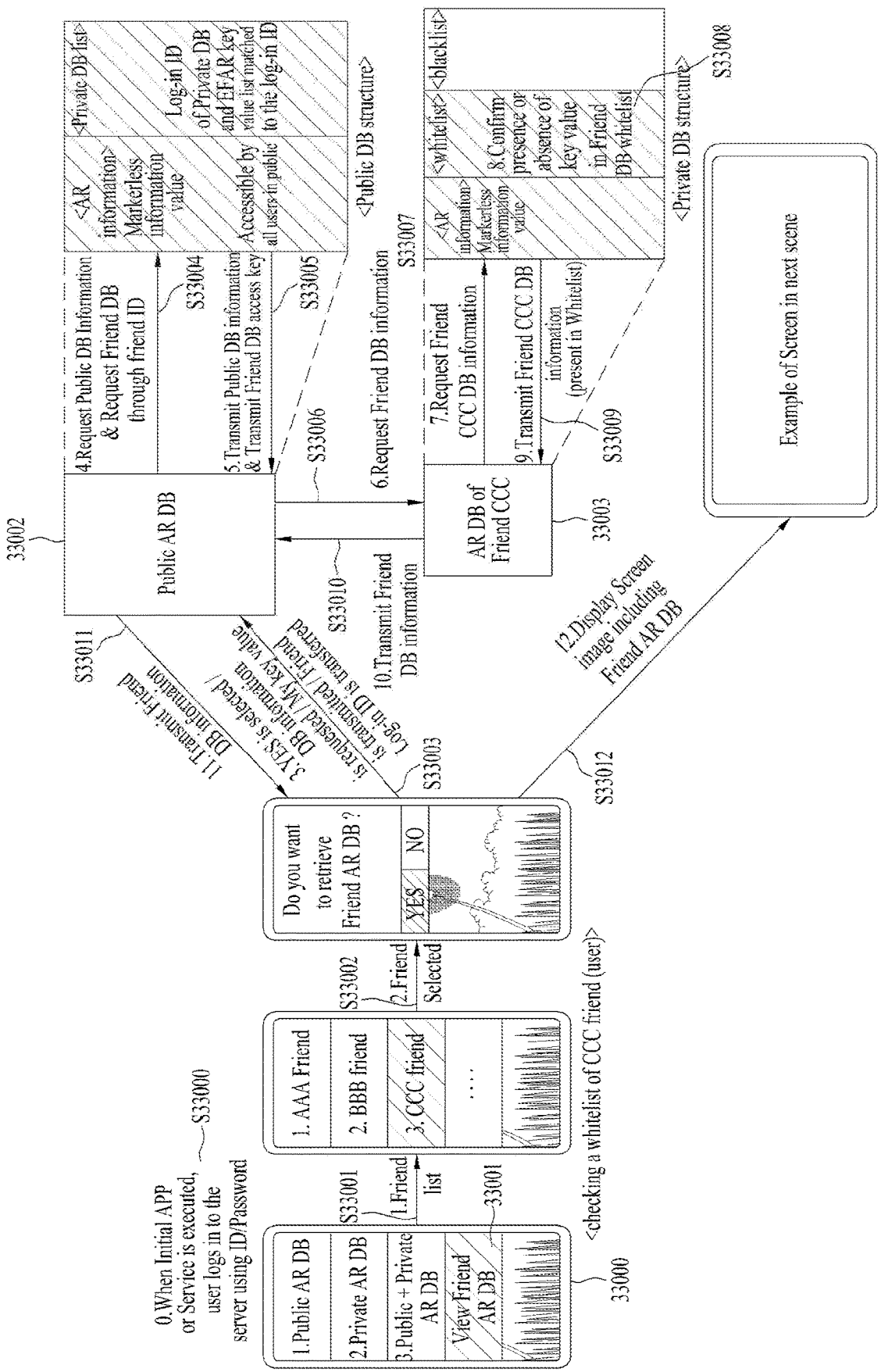
FIG. 33 is a conceptual diagram illustrating a method for allowing an XR device to utilize a database (DB) of another user according to embodiments of the present disclosure.

FIG. 33 is a conceptual diagram illustrating a method for allowing the XR device to utilize a database (DB) of another user according to embodiments of the present disclosure.

A method for allowing the first user of the XR device 33000 to use the database (DB) of the second user different from the first user according to the embodiments of the present disclosure will hereinafter be described with reference to FIG. 33. For convenience of description and better understanding of the present disclosure, the second user may also be referred to as another user, a different user, or the like, as needed.

In the following description, the user of the XR device 33000 will hereinafter be referred to as a first user.

The XR device 33000 according to the embodiments may provide various modes including a public DB, a private DB, a public/private DB, a friend DB, etc.

The friend AR mode 33001 may refer to a mode in which the first user can use AR information of another user. The friend AR mode 33001 can be implemented as follows.

In association with a process S33000, the XR device 33000 may receive an initial application command or a service execution command from the user.

The XR device 33000 may receive the ID and/or password from the user, and may allow the user to log in to device (or server).

In association with a process S33001, the XR device 33000 may display the list of friends (i.e., the friend list) for the friend AR mode 33001. For example, the friend list, for example, a User AAA, a User BBB, a User CCC, etc., may be displayed. The XR device 33000 may select the user from among the friend list, and may confirm the whitelist of the selected user.

In association with a process S33002, the XR device 33000 may select the user CCC. The user CCC will hereinafter be referred to as a second user or a friend.

In association with a process S33003, when the XR device 33000 receives a notification signal indicating that the first user selects the second user, the XR device 33000 may request DB information from the public DB 33002. In this case, the XR device 33000 may transmit, to the public DB 330002, the key about the XR device 33000 and/or the log-in ID about the second user.

In association with a process S33004, the XR device 33000 may request public-DB information from the public DB 330002, and may request a friend DB from the public DB 33002 through the friend ID. The public DB 33002 may include AR information including markerless information. The public DB 33002 can be commonly accessible by all users. The public DB 33002 may include the private-DB list. The private-DB list may include a log-in ID of the private DB and the EFAR-key list matched to the log-in ID.

In association with a process S33005, the XR device 33000 may receive the public-DB information and a key for accessing the friend DB (hereinafter referred to as the friend-DB access key) from the public DB 33002.

In association with a process S33006, the XR device 33000 may request the friend DB information from the private DB 33003 of the friend CCC through the public DB 33002. The friend-DB access key stored in the public DB 33002 may be used. The private DB 33003 of the friend CCC may include AR information for the friend CCC (User CCC). The private DB 33003 of the friend CCC may include AR information having markerless information, the whitelist, and/or the blacklist.

In association with a process S33007, the XR device 33000 may request DB information of the user CCC from the private DB 33003. In order for the first user of the XR device 33000 to use the AR information stored in the private DB of the friend CCC, there is a need for the whitelist of the private DB of the friend CCC to include information of the first user.

In association with a process S33008, the private DB 33003 of the friend may confirm whether the key value of the first user is contained in the whitelist. If the first user is present in the whitelist, this means that the first user is a friend of the user CCC. The private DB 33003 of the friend CCC may transmit AR information of the user CCC to the first user.

In association with a process S33009, the private DB 33003 of the friend CCC may access AR information or DB information so as to transmit DB information of the user CCC to the first user.

In association with a process S33010, in order to transmit DB information of the user CCC to the first user, the private DB 33003 of the friend CCC may transmit DB information of the user CCC to the public DB 33002.

In association with a process S33011, the XR device 33000 may receive friend-DB information from the public DB 33002.

In association with a process S33011, the XR device 33000 may display AR information contained in the friend-DB information. In accordance with the embodiments of the present disclosure, AR information may be displayed on the screen of the XR device 33000. If the XR device 33000 is a mobile device, the AR information may be displayed in the display region. If the XR device 33000 is a multimedia device, AR information may be displayed in the display region. If the XR device 33000 is implemented as AR glasses, AR information may be displayed in the display region. A detailed display method will hereinafter be given below.

Figure 34:
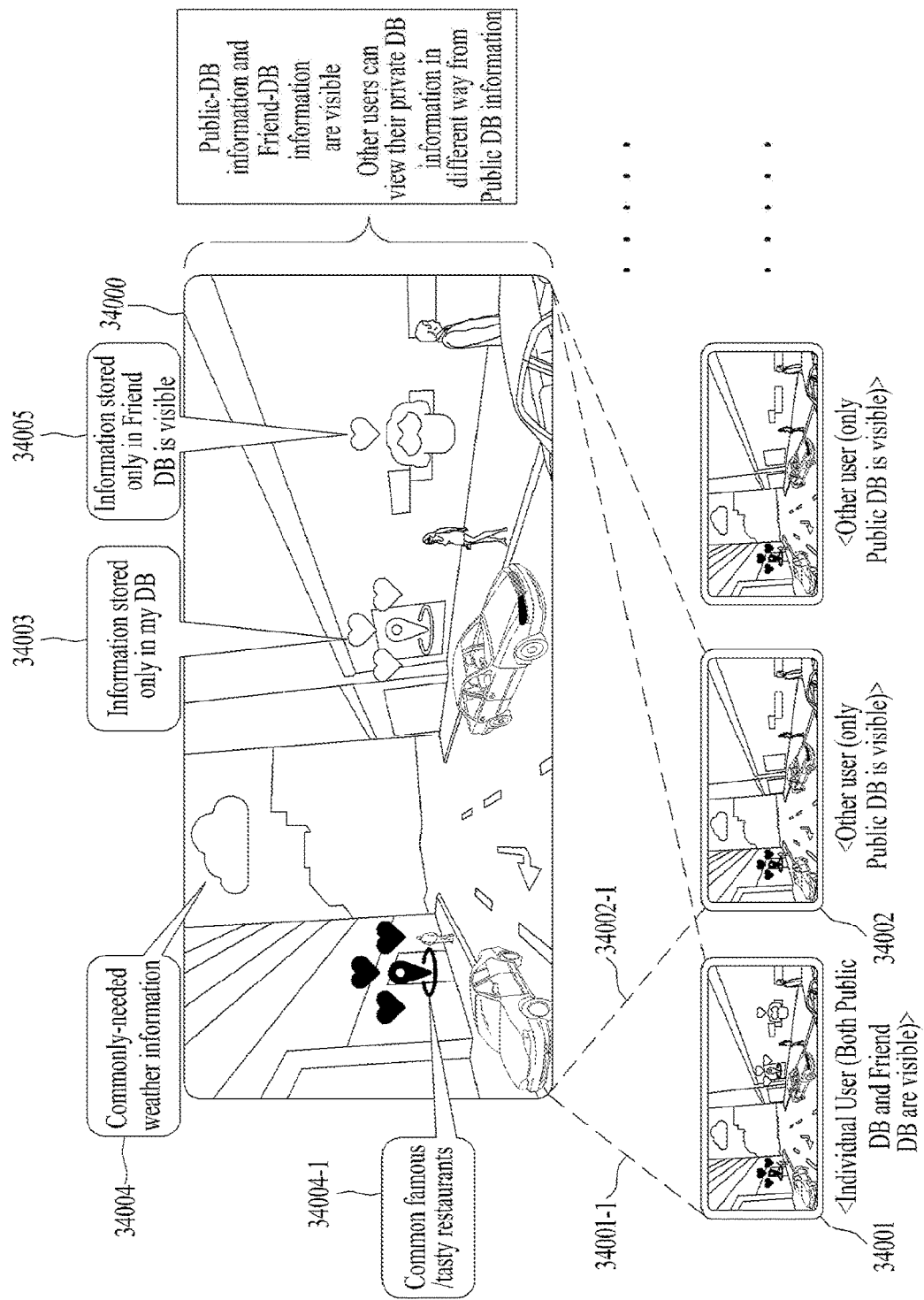
FIG. 34 is a view illustrating an exemplary display of AR information during a friend AR mode.

FIG. 34 is a view illustrating an exemplary display of AR information during the friend AR mode.

The display 34000 according to the embodiments may display information not only based on the friend AR mode, but also based on AR information of the public DB, the private DB, and the friend DB. The display 34000 may display an example of the AR information.

In response to the position or viewpoint of the XR device according to the embodiments, the display 34000 may be classified into a first display region 34001-1 in which the XR device 34001 having a first viewpoint is displayed and a second display region 34002-1 in which the XR device 34002 having a second viewpoint is displayed.

The display 34000 according to the embodiments may include AR information 34003 of the private DB, AR information 34004 and 34004-1 of the public DB, and AR information 34005 of the friend DB.

AR information 32003 of the private DB may be displayed using images, symbols, etc. based on AR information contained in the DB for each user.

AR information 32004 of the public DB may be weather information commonly needed for all users.

AR information 32004-1 of the public DB may be information related to buildings or places commonly needed for all users. For example, the AR information 32004-1 may be information about famous restaurants commonly of interest to all users.

The AR information 34005 of the friend DB may be information related to the friend. For example, the AR information 34005 may be a specific place that is of interest to the friend, or a friend-desired spot individually marked by the friend.

The XR device 34001 may simultaneously use AR information of the public DB, AR information of the private DB, and AR information of the friend DB, so that the XR device 34001 can simultaneously provide not only AR information for a specific user, but also commonly-needed AR information and AR information of the friend.

Figure 35:
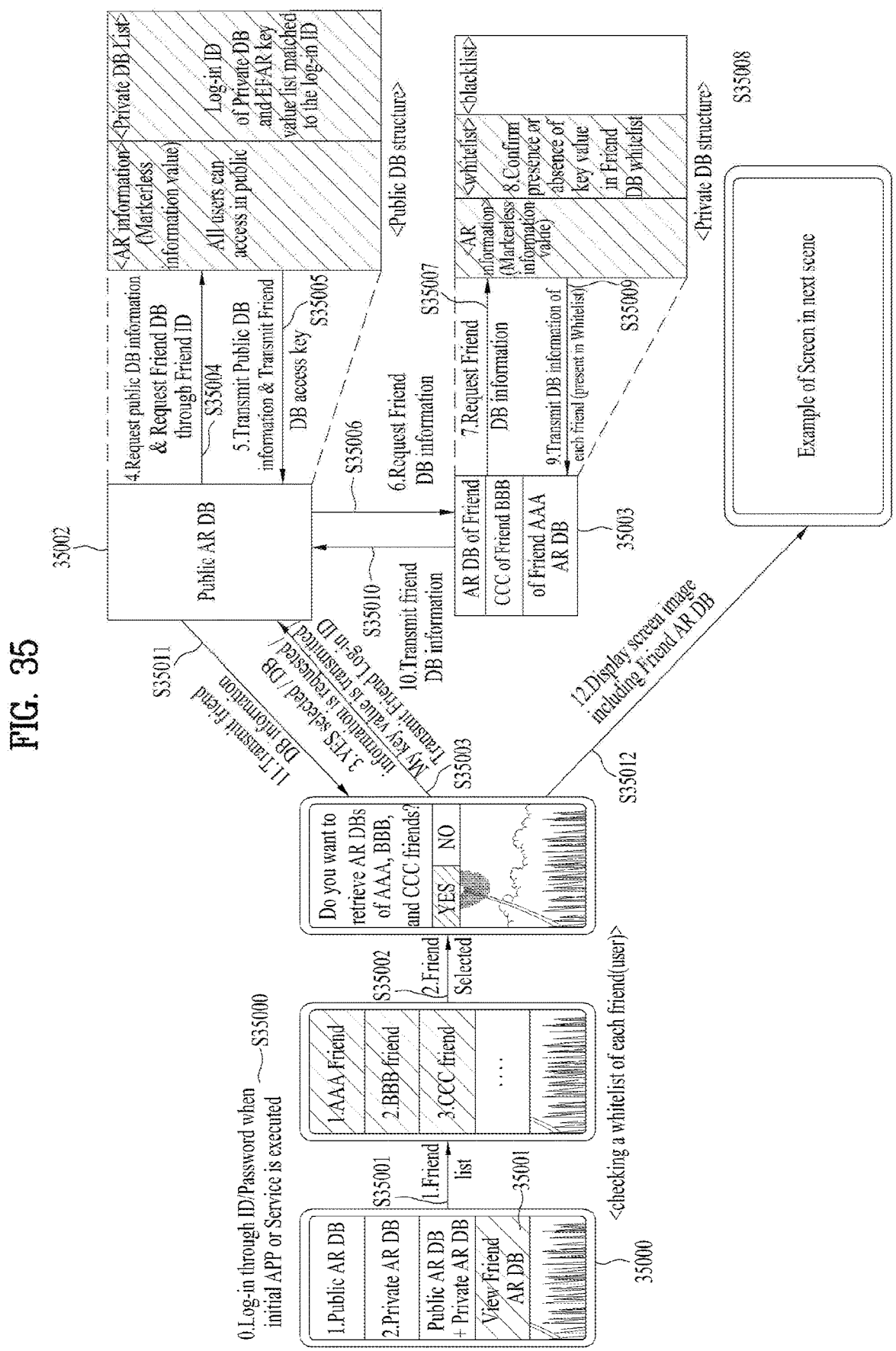
FIG. 35 is a conceptual diagram illustrating a method for allowing an XR device to utilize databases (DBs) of other users according to embodiments of the present disclosure.

FIG. 35 is a conceptual diagram illustrating a method for allowing the XR device to utilize databases (DBs) of other users according to embodiments of the present disclosure.

The XR device 35000 according to the embodiments may utilize a plurality of friend DBs.

In the following description, a user of the XR device 35000 will hereinafter be referred to as a first user.

The XR device 35000 according to the embodiments may provide various modes including the public DB, the private DB, the public/private DB, the friend DB, etc.

The friend AR mode 35001 may refer to a mode in which the first user can use AR information of other users. In this case, the other users may refer to a plurality of friends. The friend AR mode 35001 can be implemented as follows.

In association with a process S35000, the XR device 35000 may receive an initial application command or a service execution command from the user. The XR device 35000 may receive the ID and/or password from the user, and may enable the user to log in to the server.

In association with a process S35001, the XR device 35000 may display the list of friends (i.e., the friend list). The friend list may refer to a plurality of friends. For example, the friend list may include a friend AAA, a friend BBB, a friend CCC, etc. That is, the XR device 35000 may confirm the whitelist of each friend contained in the friend list, and may perform the friend AR mode.

In association with a process S35002, the XR device 35000 may receive a selection signal for selecting a desired friend from among friends of the friend list from the first user. In this case, the XR device 35000 may select a plurality of friends contained in the friend list.

In association with a process S35003, the XR device 35000 may receive a signal for requesting the DB of the friend AAA, the DB of the friend BBB, and the DB of the friend CCC from the first user, and may request DB information from the public DB 35002. In this case, the XR device may transmit a key of the first user and/or log-in IDs of friends to the public DB 35002.

In association with a process S35004, the XR device 35000 may request public-DB information from the public DB 350002, and may request friend-DB information through IDs of the friends. The public DB 35002 may include AR information provided with markerless information. The public DB 35002 is a database (DB) that can be commonly accessed by all users. The public DB 35002 may include the private-DB list. The private-DB list may include a log-in ID of the private DB and the EFAR-key list matched to the log-in ID.

In association with a process S35005, the XR device 35000 may receive the public DB information and/or the friend-DB access key from the public DB 35002.

In association with a process S35006, the XR device 35000 may request friend-DB information from the private DBs 35003 of the friends through the public DB 35002. In this case, the friend-DB access key stored in the public DB 35002 may be used. The private DBs 35003 of the friends may include a DB of the friend AAA, a DB of the friend BBB, and a DB of the friend CCC. DBs of the respective friends may include AR information provided with a markerless information value, and may further include a whitelist and/or the blacklist.

In association with a process S35007, the XR device 35000 may request DB information of each friend.

In association with a process S35008, the XR device 35000 may confirm whether the key of the first user is present in the whitelist of the private DB 35003 of each friend. That is, the XR device 35000 may confirm whether the first user can access the private DB of each friend through the whitelist.

In association with a process S35009, when the first user is present in the whitelist of each friend DB, each friend DB 35003 may provide AR information of each friend. The XR device 35000 may receive the friend AR information, or may receive the friend AR information through the public DB 35002.

In association with a process S35010, the private DB 35003 of each friend may transmit AR information of each friend or DB information of each friend to the public DB 35002.

In association with a process S35011, the XR device 35000 may receive friend-DB information from the public DB 35002. The friend-DB information may include information of the public DB (public-DB information) or private-DB information of each friend.

In association with a process S35012, the XR device 35000 may display AR information contained in the friend DB. In accordance with the embodiments, AR information may be displayed on the screen of the XR device 35000. If the XR device 35000 is a mobile device, AR information may be displayed in the display region. If the XR device 35000 is a multimedia device, AR information may be displayed in the display region. If the XR device 35000 is implemented as AR glasses, the AR information may be displayed in the display region. A detailed display method will hereinafter be given.

Figure 36:
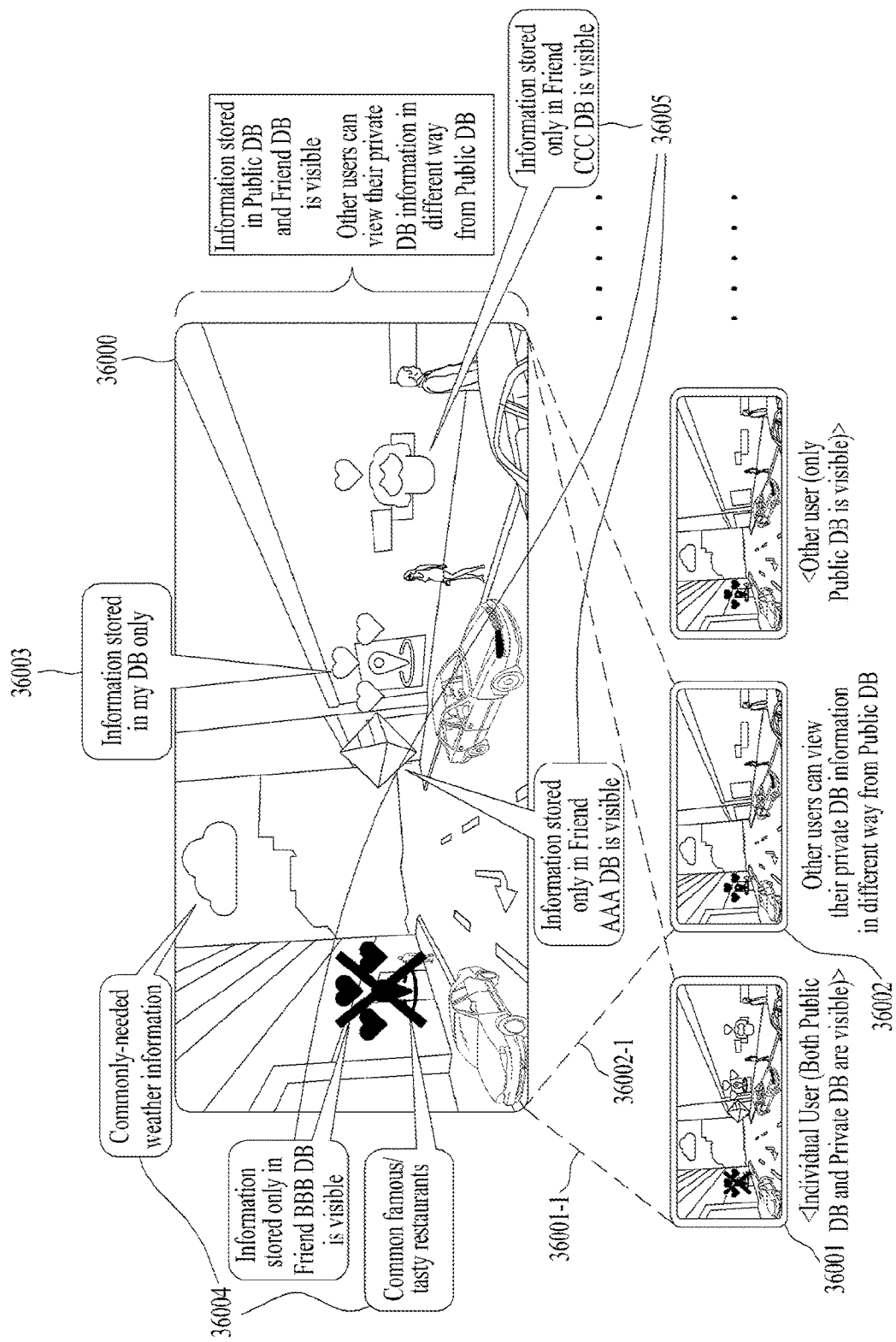
FIG. 36 is a view illustrating a method for displaying AR information based on private DBs of plural friends.

FIG. 36 is a view illustrating a method for displaying AR information based on private DBs of plural friends.

Referring to FIG. 36, the display 36000 according to the embodiments may display information based on the friend AR mode by referring to AR information of the public DB, the private DB, and the friend DB. The display 36000 may display an example of the AR information. Specifically, the display 36000 may represent an example of the display in which several friend DBs are used through the friend AR mode.

In response to the position or viewpoint of the XR device 36001 according to the embodiments, the display 36000 may be classified into a first display region 36001-1 in which the XR device 36001 having a first viewpoint is displayed and a second display region 36002-1 in which the XR device 36002 having a second viewpoint is displayed.

The display 36000 according to the embodiments may include AR information 36003 of the private DB, AR information 36004 of the public DB, and/or AR information 36005 of the friend DBs.

AR information 36003 of the private DB may refer to private AR information stored in the DB of the user who uses the XR device. Target objects related to the user may be represented using images, symbols, or the like.

AR information 36004 of the public DB may refer to AR information that can be accessed by all users. The AR information 36004 may represent either common interest information that is of common interest to all users or commonly-needed information commonly needed for all users using images, symbols, and the like. For example, the AR information 36004 may be weather information, famous restaurant information, etc., that are commonly of interest to all users.

AR information 36005 of the friend DBs may refer to AR information stored in DBs of the respective friends. The user may further confirm AR information of the friends based on the whitelist. For example, AR information of the DB of the friend AAA may display target objects related to the friend AAA using images, symbols, etc. AR information of the DB of the friend BBB may display target objects related to the friend BBB using images, symbols, etc. AR information of the friend-CCC DB may display target objects related to the friend CCC using images, symbols, etc.

The display 36000 according to the embodiments may include AR information 34003 of the private DB, AR information 36004 of the public DB, and/or AR information 36005 of the friend DBs.

Figure 37:
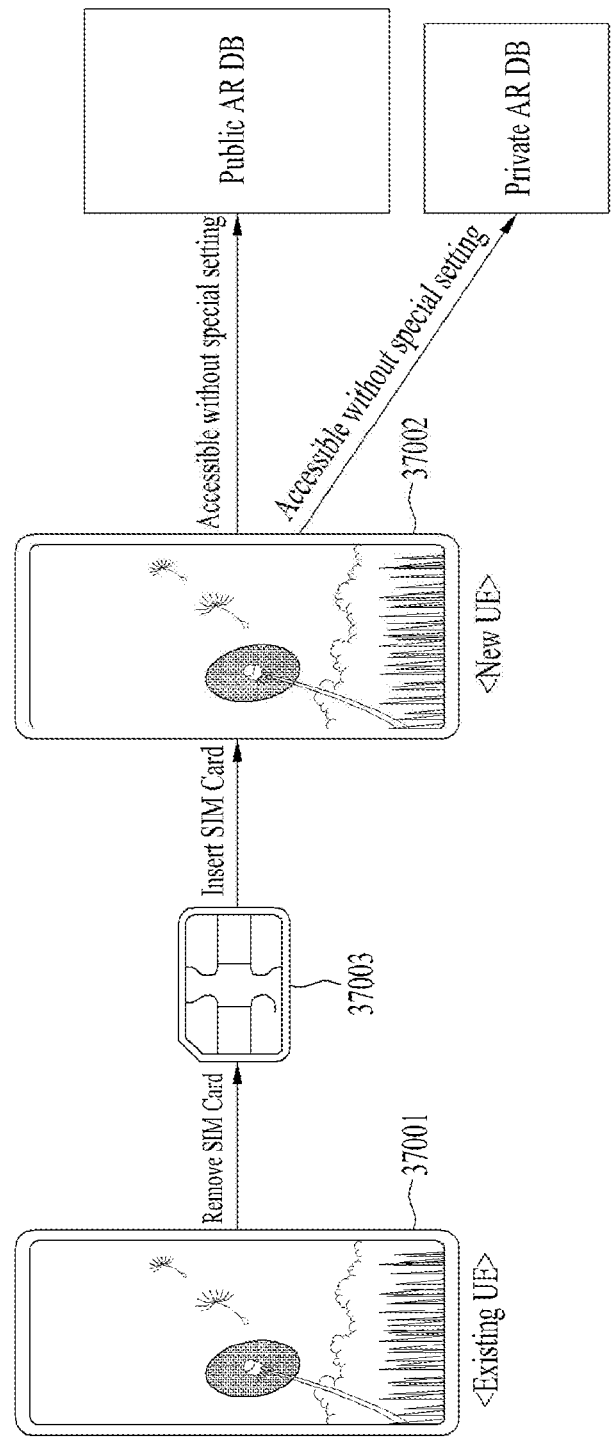
FIG. 37 is a conceptual diagram illustrating extensibility between XR devices.

FIG. 37 is a conceptual diagram illustrating extensibility between XR devices.

The XR device according to the embodiments may provide high extensibility between the XR devices. The first XR device 37001 is an existing (old) XR device previously used by the user, and the second XR device 37003 is a new device to be newly used by the user.

The SIM card 37003 is a card contained in the first XR device 37001. The SIM card 3703 may support a database (DB) access and processing operation of the XR device. The SIM card 37003 may correspond to the memory 1350 and the processor 1340 shown in FIG. 13 illustrating the XR device, or may be any one of a controller, an application unit, and a control chip that are connected to the memory 1350 and the processor 1340.

If the XR device is a mobile device, the SIM card 37003 may be used as a SIM card. If the XR device is a multimedia device, the SIM card 37003 may be a control chip, a controller, or an application unit of the multimedia device. If the XR device is implemented as AR glasses, the SIM card 37003 may be a control chip, a controller, an application unit, an embedded application, or an embedded information unit of the AR glasses.

If the SIM card 37003 contained in the first XR device 37001 is inserted into the second XR device 37002, the SIM card 37003 can immediately access the public DB and the private DB without using special setting.

After only the SIM card 37003 is replaced, although a new device is used, the existing private DB can also be used in the new device without change. For the private DB that has been used in the existing device, special setting or data backup need not be used. In a state in which one or more devices are used, if a current device is replaced with another device (new device), it is difficult to transfer a key or DB information, each of which requires high security, to the new device.

Figure 38:
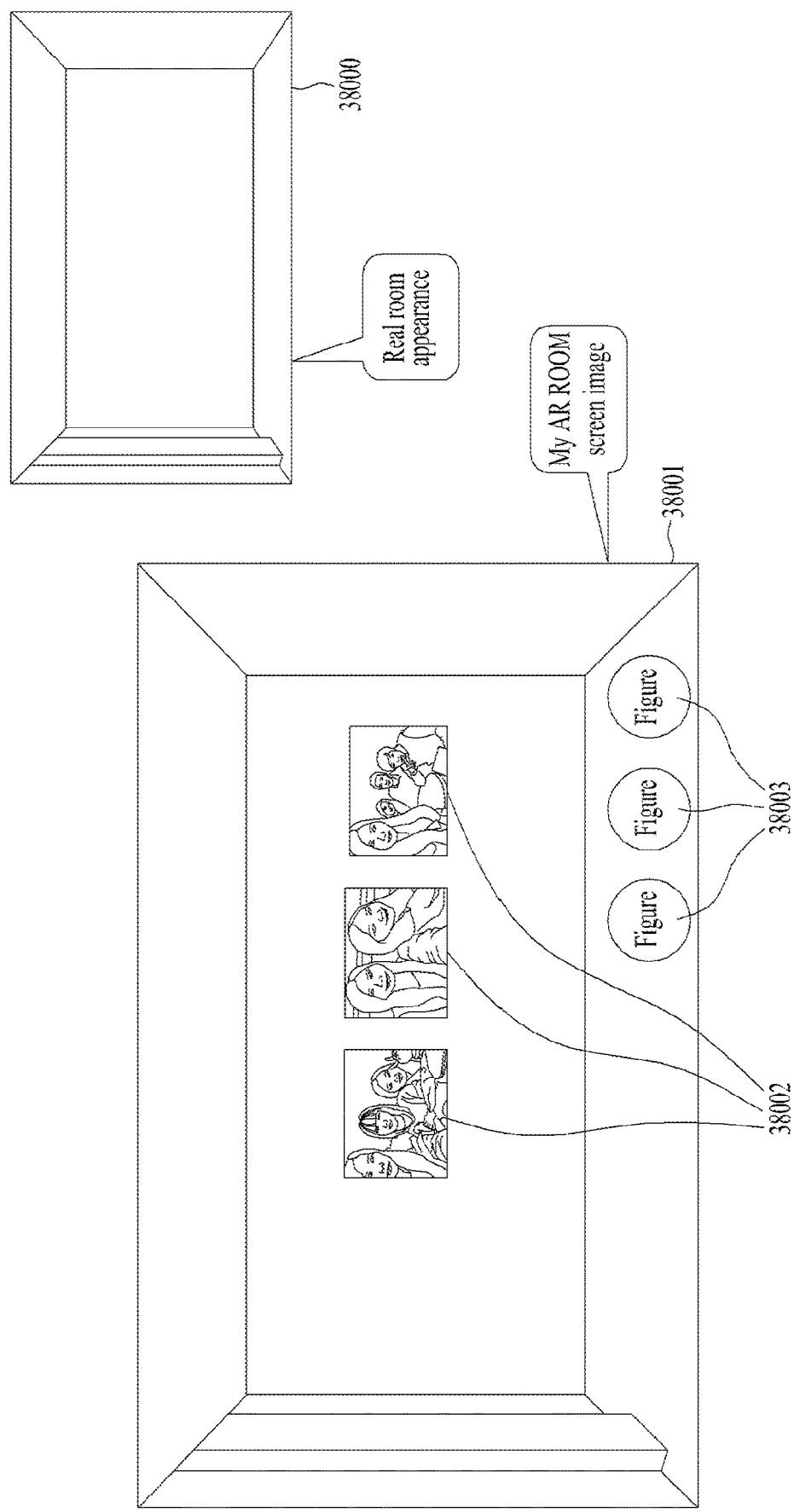
FIG. 38 is a conceptual diagram illustrating a method for implementing an AR room using the XR device according to embodiments of the present disclosure.

FIG. 38 is a conceptual diagram illustrating a method for implementing an AR room using the XR device according to embodiments of the present disclosure.

Referring to FIG. 38, a reference number 38000 may indicate the real room appearance that can be viewed by the user's eyes through the XR device according to the embodiments of the present disclosure. If the AR mode is not used, the reference number 38000 can be visible to the user as if they were in the real room.

When the AR mode is activated by the XR device according to the embodiments, the AR room 38001 indicating appearance of the user's room can be displayed. For example, a poster item 38002 based on AR information may be displayed on a wall of the AR room, and a figure (or miniature) item 38002 based on AR information may be displayed in one region of the AR room.

The XR device according to the embodiments can enable the user who wears the XR device to implement a private AR room using the AR mode. In this case, the user can decorate their AR room with items visible to the user only. In this case, the items may be displayed based on AR information of the private DB of the user. Therefore, the user who views the AR room can enjoy a hobby life corresponding to their private life that the user does not want to expose to other people. If the user's room-related data that has already been captured by an omnidirectional camera (360° camera) is present, it is possible for the user to view and check their AR room anywhere. In addition, the user can add items related to AR information to their AR room using the XR device.

The user can add information about club members who have the same hobby lives to the whitelist, so that the user can enjoy the same hobby lives together with the club members as needed.

Figure 39:
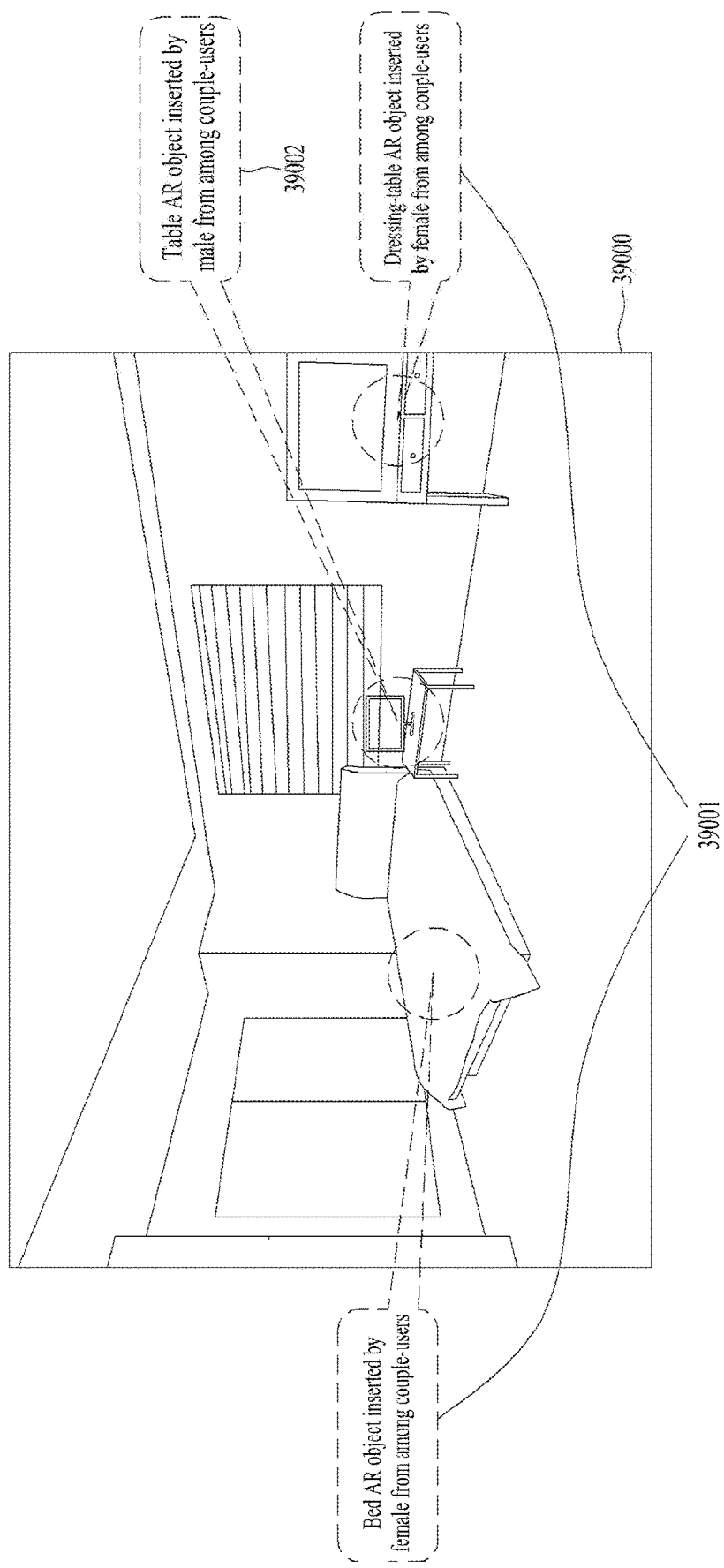
FIG. 39 is a conceptual diagram illustrating a method for implementing a couple AR room using the XR device according to embodiments of the present disclosure.

FIG. 39 is a conceptual diagram illustrating a method for implementing a couple AR room using the XR device according to embodiments of the present disclosure.

Referring to FIG. 39, reference number 39000 may indicate the real room appearance that can be viewed by the user through the XR device according to the embodiments of the present disclosure. If the AR mode is not used, the reference number 39000 can be visible to the user as if they were in a real room.

A couple AR room may be displayed using AR information by referring to the real room appearance 39000. If a couple of users (hereinafter referred to as couple-users) is present, each wearing the XR device, users who belong to the couple-users can acquire AR information from the public DB and/or the private DB, and can thus decorate the couple AR room using the acquired AR information.

For example, a display item 39001 of the AR information may represent a bed AR object and a dressing-table AR object that are created by a female from among the couple-users. A display item 39002 of the AR information may represent a computer AR object and a table AR object that are created by a male from among the couple-users.

The XR device may acquire AR information stored in a DB of the couple-users (i.e., the couple-users DB), and may enable objects about the acquired AR information to be displayed on the real room appearance.

Through the couple AR room of the XR device according to the embodiments, the XR device may enable a husband and a wife or a couple of users (i.e., couple users) to store their desired furniture in only one DB (i.e., an initial couple AR room creator) in a manner that the husband and wife or the couple users can mutually view the continuously synchronized screen images. In addition, the private DB of the couple users may be designed in a manner that a couple access authority is added to the private DB of the couple users so that only the authorized couple-users can view the above private DB.

Figure 40:
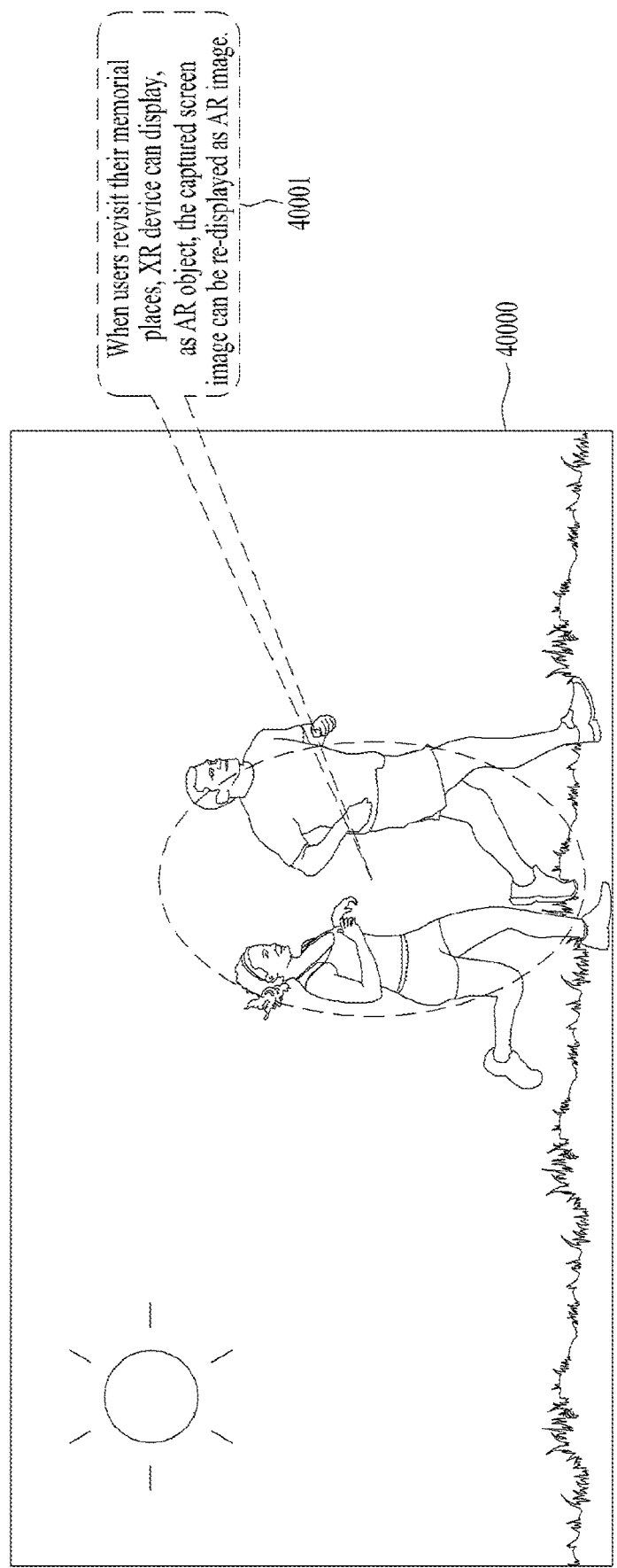
FIG. 40 is a conceptual diagram illustrating a method for implementing a memorial AR using the XR device according to embodiments of the present disclosure.

FIG. 40 is a conceptual diagram illustrating a method for implementing memorial AR using the XR device according to embodiments of the present disclosure.

Referring to FIG. 40, reference number 40000 may denote a real background image that is visible to users (i.e., a husband and a wife or couple-users) through the XR device without using AR information.

If AR information related to the real background image 40000 or AR information related to a place or object in the real background image is present in the database (DB), the XR device may display one or more AR objects using AR information.

For example, if the place the user has actually visited before appears in the real background image 40000, a screen image having been captured by the user who has visited the place can be displayed as a display item indicating the AR object 40001.

Through the memorial AR of the XR device according to the embodiments, when two users (i.e., the couple users or the husband and wife) revisit their date places, the XR device can display, as the AR object, their exact posture that they took at when the users were photographed, on the real background image 40000. The XR device may re-perform such photographing at the same place, and may store the re-photographed result as the AR object information in the DB, so that the initially-photographed resultant image and the re-photographed resultant image can be displayed to overlap with each other. In addition, the couple access authority may be added to the private DB by the XR device, so that only two users (the couple users or the husband and wife) can view and use AR information.

Figure 41:
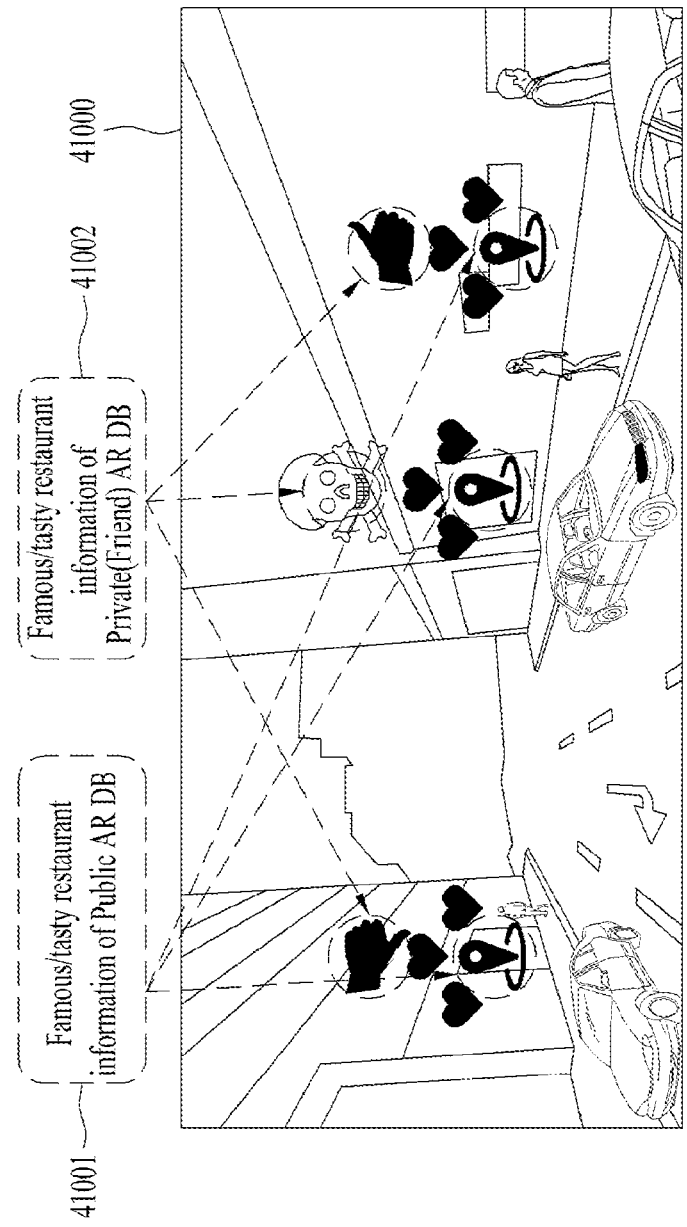
FIG. 41 is a conceptual diagram illustrating a method for implementing an advertisement filtering function using the XR device according to embodiments of the present disclosure.

FIG. 41 is a conceptual diagram illustrating a method for implementing an advertisement filtering function using the XR device according to embodiments of the present disclosure.

Referring to FIG. 41, reference number 40000 may denote a real background image that is visible to users through the XR device without using AR information.

If AR information related to the real background image 40000 or AR information related to a place or object in the real background image is present in the database (DB), the XR device may display one or more AR objects using AR information.

For example, AR information 41001 of the public DB may be displayed in the real background image 41000 through the XR device. The public DB may include AR information (e.g., famous restaurant information) that can be accessed by all users. AR information 41001 of the database (DB) may be filtered out based on the AR information of the private DB.

For example, the AR information 41002 of the private DB or the friend DB may include famous and tasty restaurant information. The XR device may compare AR information 41001 of the private DB or the friend DB with AR information 41001 of the public DB, and may display specific information indicating whether the corresponding information is famous and tasty restaurant information or advertisement information. In more detail, if AR information of the friend DB includes information about the presence of the famous/tasty restaurant information, a specific image "Yes" or "Good" may be displayed as AR information by the XR device. In contrast, if AR information of the friend DB includes information about the absence of the famous/tasty restaurant information, a specific image "No" or "Bad" may be displayed as such AR information by the XR device.

Indeed, the famous/tasty restaurants stored in the public DB are often designated as famous restaurant symbols for advertisement only, such that the XR device can perform filtering of such advertisement information and can thus increase accuracy of the famous/tasty restaurant information. For example, AR information, that is stored in the public DB to indicate that the target restaurant is a famous/tasty restaurant, may be provided with additional AR information indicating either that the famous restaurant information stored in the public DB is only for advertisement or that food of the famous restaurant does not taste good, such that the resultant AR information can be shared by users or friends. Therefore, the XR device can enable only friends to distinguish a true famous/tasty restaurant (high-reliability information) and a false famous/tasty restaurant (low-reliability advertisement information) from each other by referring to AR information of the public DB and the private DB (including the friend DB).

Figure 42:
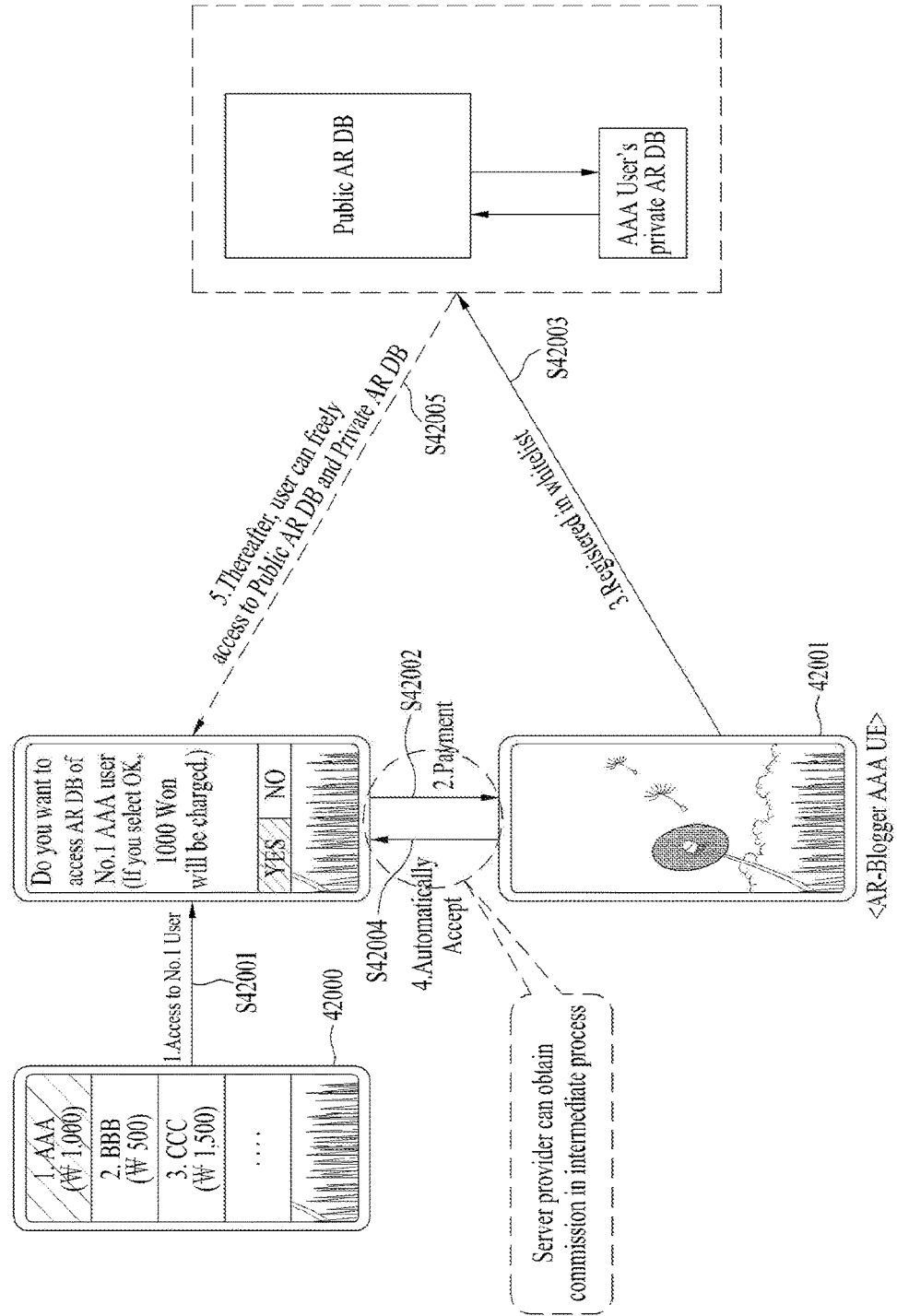
FIG. 42 is a conceptual diagram illustrating a method for implementing an AR blogger using the XR device according to embodiments of the present disclosure.

FIG. 42 is a conceptual diagram illustrating a method for implementing an AR blogger using the XR device according to embodiments of the present disclosure.

Referring to FIG. 42, the XR device 42000 according to the embodiments may provide AR blogger ranking. For example, the list of DB of User AAA, DB of User BBB, and DB of User CCC may be displayed as an order or ranking information. In accordance with the embodiments of the present disclosure, the XR device 42000 may access or acquire AR information of another person for free of charge or by payment.

In association with a process S42001, the XR device 42000 may request access to the DB of the No. 1 user AAA indicating the first-ranked user AAA. The XR device 42000 may receive a usage fee from the user.

In association with a process S42002, if the XR device 42000 acknowledges payment of the usage fee, the XR device 42001 of the user AAA may receive the usage fee.

In association with a process S42003, the XR device 42001 of the user AAA may add the user who has requested such access to the whitelist.

In association with a process S42004, the XR device 42001 of the user AAA may automatically acknowledge the access request. In this case, a server provider may also acquire fees in an intermediate process as needed.

In association with a process S42005, the XR device 42000 may freely access the DB of the No. 1 user AAA, such that the XR device 42000 can use the AR information of the user AAA.

Through the AR blogger of the XR device according to the embodiments, people (or bloggers) who specialize in operating AR DBs can be shown based on their ranking information. For example, the ranking of the bloggers may be measured in the order of the number of persons added to the whitelist. When the XR device desiring to access the AR DB of a specific blogger pays the amount specified by an administrator (or operator) of the AR DB, the applicant who has requested such access can be automatically registered in the whitelist. Thereafter, the XR device can access the private DB of the blogger. In addition, the AR DB server provider or the service provider may use a business model in which the AR DB server provider or the service provider can receive fees in the intermediate process.

Figure 43:
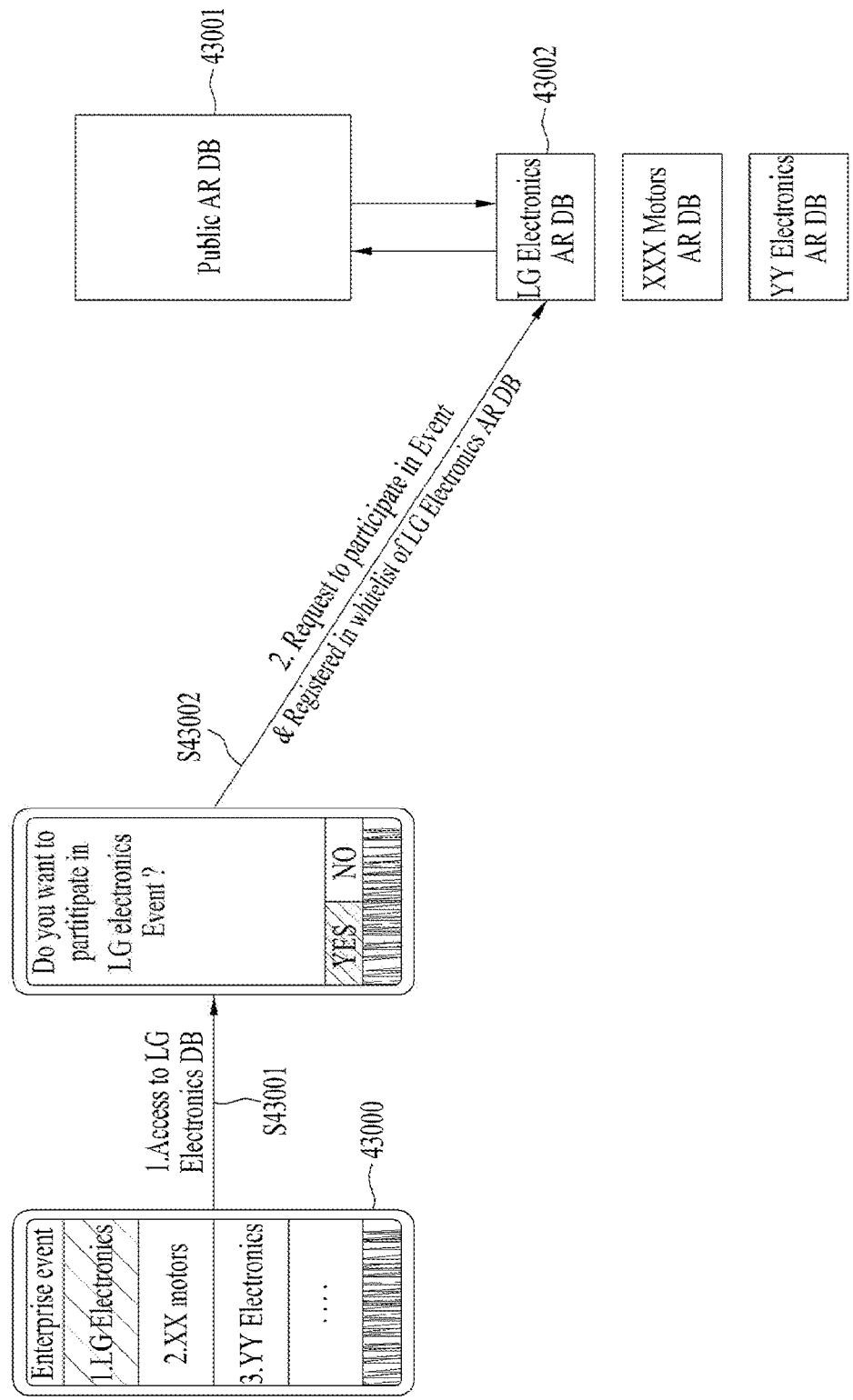
FIG. 43 is a conceptual diagram illustrating a method for implementing AR publicity using the XR device according to embodiments of the present disclosure.

FIG. 43 is a conceptual diagram illustrating a method for implementing AR publicity using the XR device according to embodiments of the present disclosure.

Referring to FIG. 43, the XR device 43000 may perform AR publicity. For example, the XR device 43000 may display the list of enterprise DBs (i.e., the enterprise-DB list). For example, the XR device can display the enterprise list such as LG Electronics, "XX" Motors, and "YY" Electronics, etc.

In association with a process S43001, the XR device 43000 may request access to a database (DB) of tLG Electronics in response to the user selection signal.

In association with a process S43002, the XR device 43000 can request participation in LG Electronics' events, and can apply to user registration in the whitelist of the LG-Electronics DB.

The public DB 43001 may include AR information that can be accessed by all users.

The enterprise DB 43002 may include AR information related to a specific enterprise. Differently from the public DB 43001, only the user who has already registered in the whitelist of the enterprise DB can access the enterprise DB. The enterprise DB 43002 may be similar to the private DB, and the respective enterprises can construct their unique DB having AR information.

Through AR publicity using the XR device according to the embodiments, the plurality of enterprises can implement AR publicity through a single common application without using unique dedicated applications. For example, under the condition that an enterprise has already created a specific AR DB, if a user who is located in front of a specific agency of the enterprise, a head office, and a branch office views images through the XR device, a mission such as an event can be provided to this user. Thus, if this mission is carried out by the user through the XR device, the enterprise can provide the user with a certain product.

Figure 44:
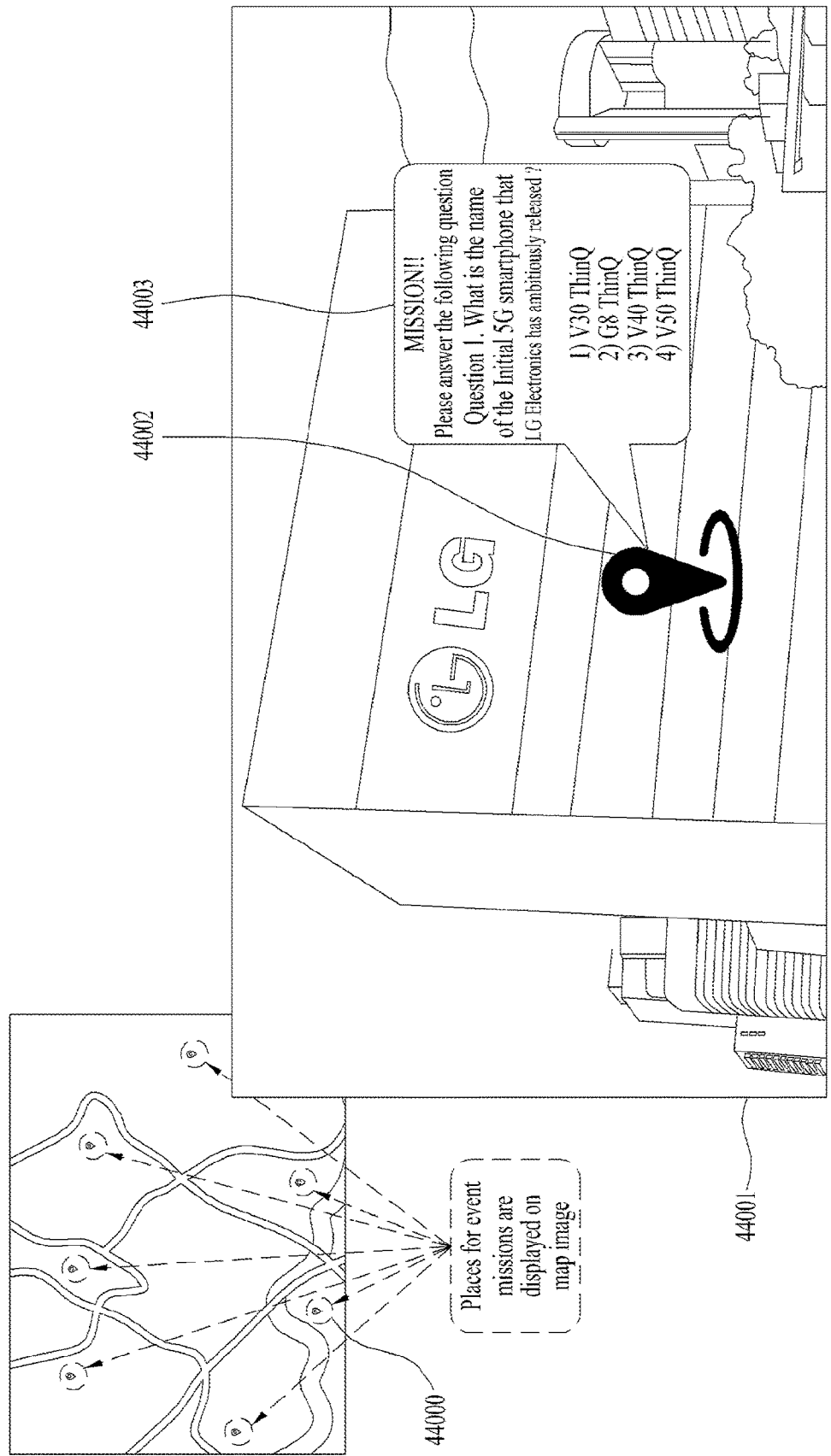
FIG. 44 is a conceptual diagram illustrating a method for implementing AR publicity according to embodiments of the present disclosure.

FIG. 44 is a conceptual diagram illustrating a method for implementing AR publicity according to embodiments of the present disclosure.

Referring to FIG. 44, the map image 44000 may be displayed by the XR device. The map 44000 may include mission places where promotional events (missions) for AR publicity have already been prepared.

The display 44001 may exemplarily illustrate a situation in which such a mission place for AR publicity is visible to the user through the XR device.

The AR object 44002 may be displayed by AR information that has been acquired from the enterprise DB by the XR device.

A mission image 44003 may exemplarily illustrate a mission about the AR object 44002. The enterprise may provide a user with an event message including publicity information using the mission image 44003, and may provide the user who has completed the mission with a predetermined product.

Through AR publicity using the XR device, the event mission may be displayed on the map image, so that it is possible for the user of the XR device to recognize the event mission. Once the user has completed all the missions, a promotional service capable of providing the user with a predetermined product can be provided to the user. For example, if the user has completed all event missions related to 'V50 Mobile Device' manufactured by LG Electronics, the enterprise can provide the user with a dual screen related to V50 Mobile Device free of charge.

Figure 45:
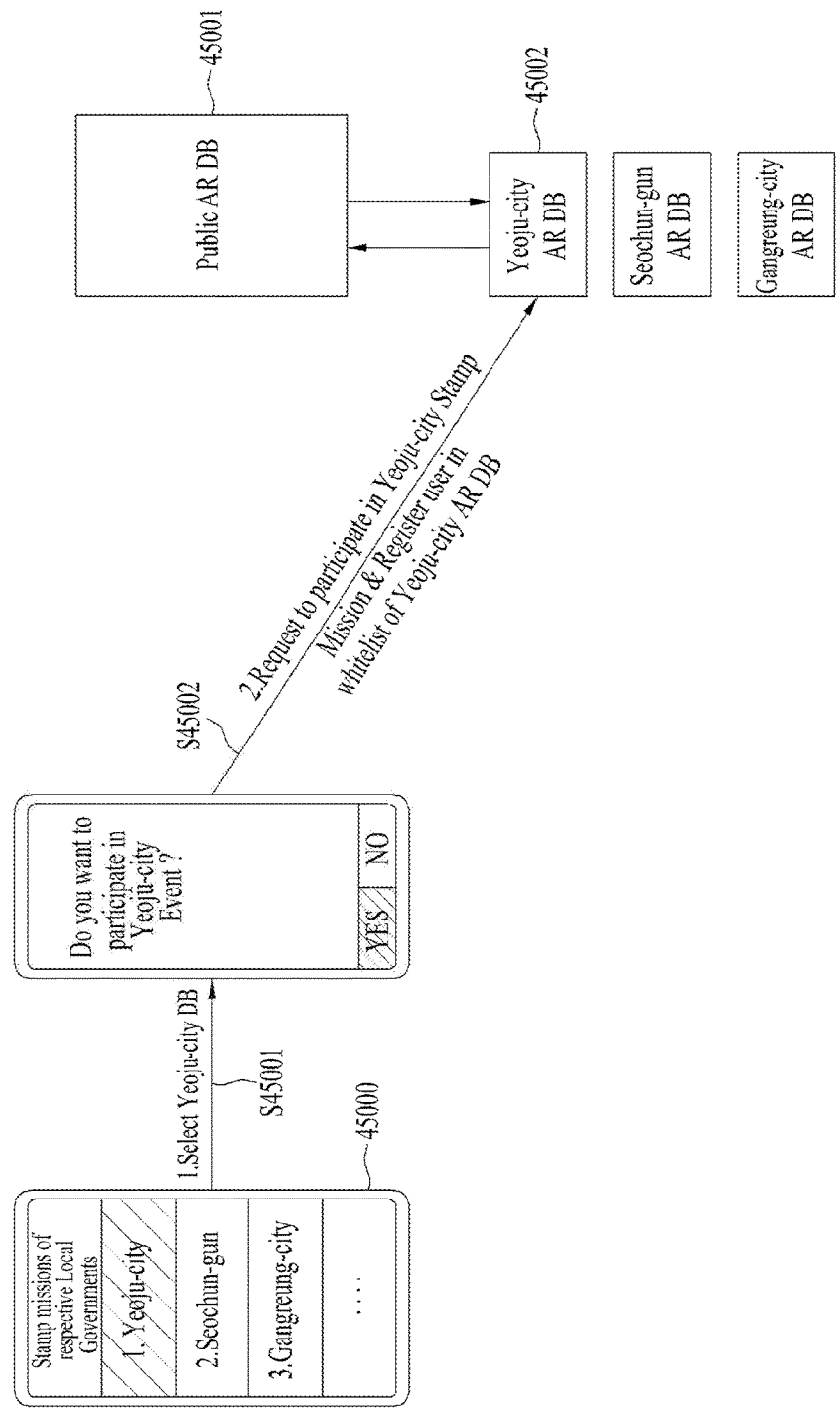
FIG. 45 is a conceptual diagram illustrating a method for publicizing local governments using the XR device according to embodiments of the present disclosure.

FIG. 45 is a conceptual diagram illustrating a method for publicizing local governments using the XR device according to embodiments of the present disclosure.

Referring to FIG. 45, the XR device 45000 may implement local government publicity. For example, the XR device 45000 may display the DB list of the local governments. For example, the XR device 45000 may display the local-governments list, for example, Yeoju-city, Seochun-gun, Gangreung-city, etc.

In association with a process S45001, the XR device 43500 may request access to the Yeoju-city DB in response to a user selection signal.

In association with a process S45002, the XR device 45000 may induce the user to participate in STAMP events of Yeoju-city local government, and may register the user in the whitelist of the Yeoju-city DB after completion of user participation.

The public DB 45001 may include AR information that can be commonly accessed by all users.

The enterprise DB 45002 may include AR information related to a specific local government. Differently from the public DB 45001, only the user who has registered in the whitelist of the local government DB can access the above AR information. The local-government DB, i.e., Yeoju-city DB, may be similar to the private DB, and a database (DB) including AR information can be constructed for each local government.

Through the STAMP event mission of the corresponding local government using the XR device, different STAMP event publicity effects of the respective local governments can be achieved by a single common application, instead of by a specific dedicated application manufactured by each enterprise.

For example, after many local governments provide a user with missions using STAMP events and the user participates in the corresponding mission, the user who has completed the mission can obtain small gifts. The above local-government publicity service can be implemented by a single common application through which the respective local governments can easily construct their unique AR DBs and their unique STAMP missions.

Under the condition that a specific local government constructs a specific AR DB and a user who is located in front of a specific tourist spot or cultural property belonging to a management region of the specific local government views the AR information through the XR device, a detailed description message of the tourist spot or cultural property may be visible to the user through the AR information. If the user has completely viewed all the detailed description messages displayed through AR, a stamp provided by the corresponding local government can be automatically allocated to the user.

Figure 46:
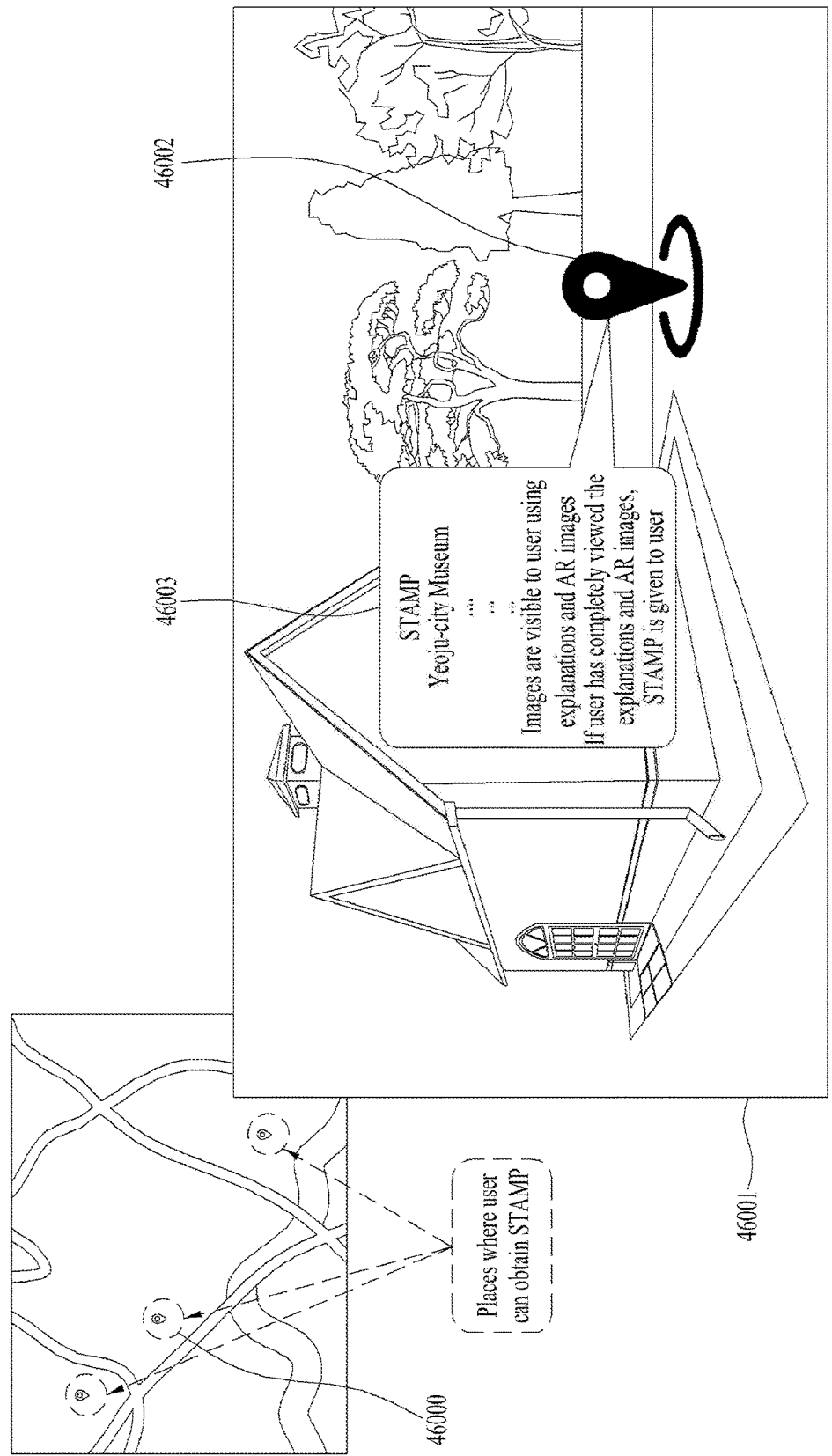
FIG. 46 is a conceptual diagram illustrating a method for implementing stamp publicity of local governments according to embodiments of the present disclosure.

FIG. 46 is a conceptual diagram illustrating a method for implementing stamp publicity of local governments according to embodiments of the present disclosure.

Referring to FIG. 46, the map image 46000 may be displayed by the XR device according to the embodiments. The map 46000 may include mission places where promotional events for STAMP missions of the local governments have already been prepared. For example, the map 46000 may display a plurality of places where the user can obtain stamps of the respective local governments.

The display 46001 may exemplarily illustrate a situation in which the mission place for AR publicity is visible to the user through the XR device.

The AR object 46002 can be displayed by the XR device based on AR information acquired from the local government DB.

The mission 46003 may be a mission message about the AR object 46002. The local governments may provide the user with publicity information using the mission image 46003 such as STAMP missions, such that the local government can automatically allocate their STAMP to the user who has completed the corresponding mission.

Through the STAMP mission using the XR device according to the embodiments, places where such stamp can be allocated to the user can be displayed on the map image, and the local government can induce the user who is in the corresponding place to view the AR information and the AR object, so that the user can view and listen to the detailed description related to the AR object. The user who has completely viewed the corresponding description related to the AR object can obtain the STAMP from the corresponding local government. For example, places where Yeoju-city STAMP actions can be provided to the user may be displayed on the map image. If the user who is in the corresponding place confirms the AR object related to the place, images or explanations stored in the Yeoju-city AR DB may be displayed through XR device.

Figure 47:
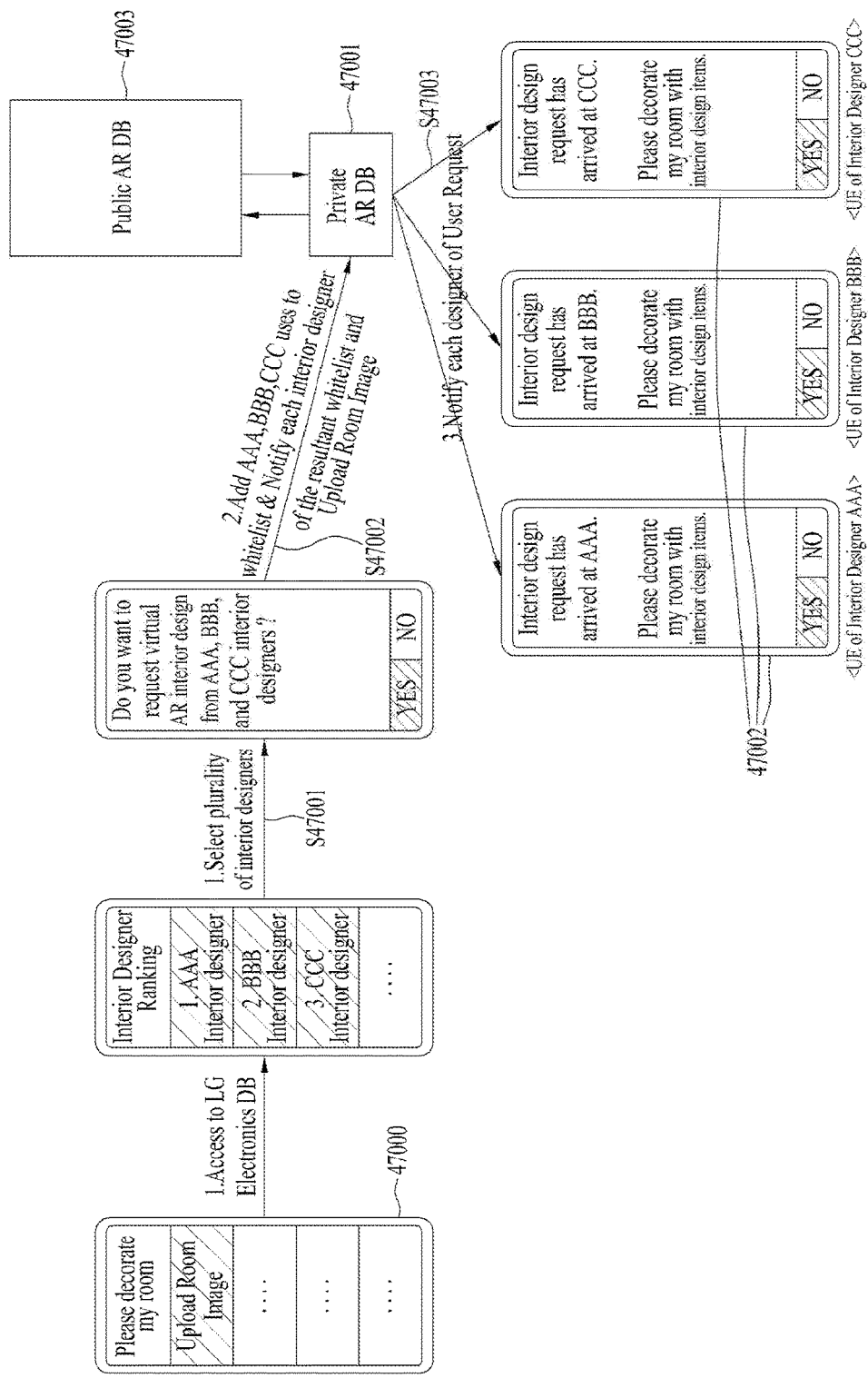
FIG. 47 is a conceptual diagram illustrating a method for implementing room interiors using the XR device according to embodiments of the present disclosure.

FIG. 47 is a conceptual diagram illustrating a method for implementing room interiors using the XR device according to embodiments of the present disclosure.

Referring to FIG. 47, the XR device 47000 may support a virtual room-interior mode using AR information. The XR device 47000 may upload the real room images to the server. The XR device may request access to the enterprise DB.

In association with a process S47001, the XR device 47000 may display the ranking list of interior designers. The interior-designer ranking list may include interior designers registered in the interior-designer whitelist, and may be listed based on a total number of interior designers registered in the whitelist. For example, the interior-designer ranking list may be listed in the form of AAA Interior Design Company, BBB Interior Design Company, CCC Interior Design Company, etc. The XR device 47000 may induce the user to select a plurality of interior designers.

In association with a process S47002, the XR device 47000 may add AAA Interior Design Company, BBB Interior Design Company, and CCC Interior Design Company to the whitelist, and may transmit a notification message to each of the interior designers belonging to the respective interior design companies. The XR device 47000 may upload the real room image to the private DB 470001.

In association with a process S47003, the XR device 47000 may transmit a notification message to each of the interior designers, i.e., AAA, BBB, and CCC interior design companies, so that the device 47002 of each of the interior designers (AAA, BBB, and CCC interior design companies may display the notification message indicating the presence of a user's interior request.

The public DB 47003 may include AR information that can be accessed by all users.

The private DB 47001 may include the room photo images uploaded by the individual user. A user-desired interior designer may be registered in the whitelist of the private DB 47001, such that the respective interior designers can access the private DB 47001 so as to provide the user with interior recommendations.

Through the interior mode using the XR device according to the embodiments, the user's room is captured by the omnidirectional camera (360° camera) and the captured images can be uploaded to the private DB. Thereafter, the interior designer accepted by the user can access the private DB of the user and can arrange AR objects indicating AR furniture in the user's virtual room. In this way, several interior designers can decorate the user's virtual room using various kinds of AR furniture. The private room of the user is a private space, so that the user's private room can be uploaded only to the private DB so that the user's private room image can be provided to necessary interior designers in a restricted manner. In this case, the private-DB whitelist can be constructed in a manner that only the authorized interior designers accepted by the user can access the private DB of the user. If the user actually purchases furniture that has been placed by the interior designer, the server may give the corresponding interior designer a predetermined amount of money as commission fees. If AR furniture uploaded by several furniture enterprises is actually sold to the user, the service provider for providing AR information can receive a predetermined amount of money as commission fees from the corresponding enterprise.

Figure 48:
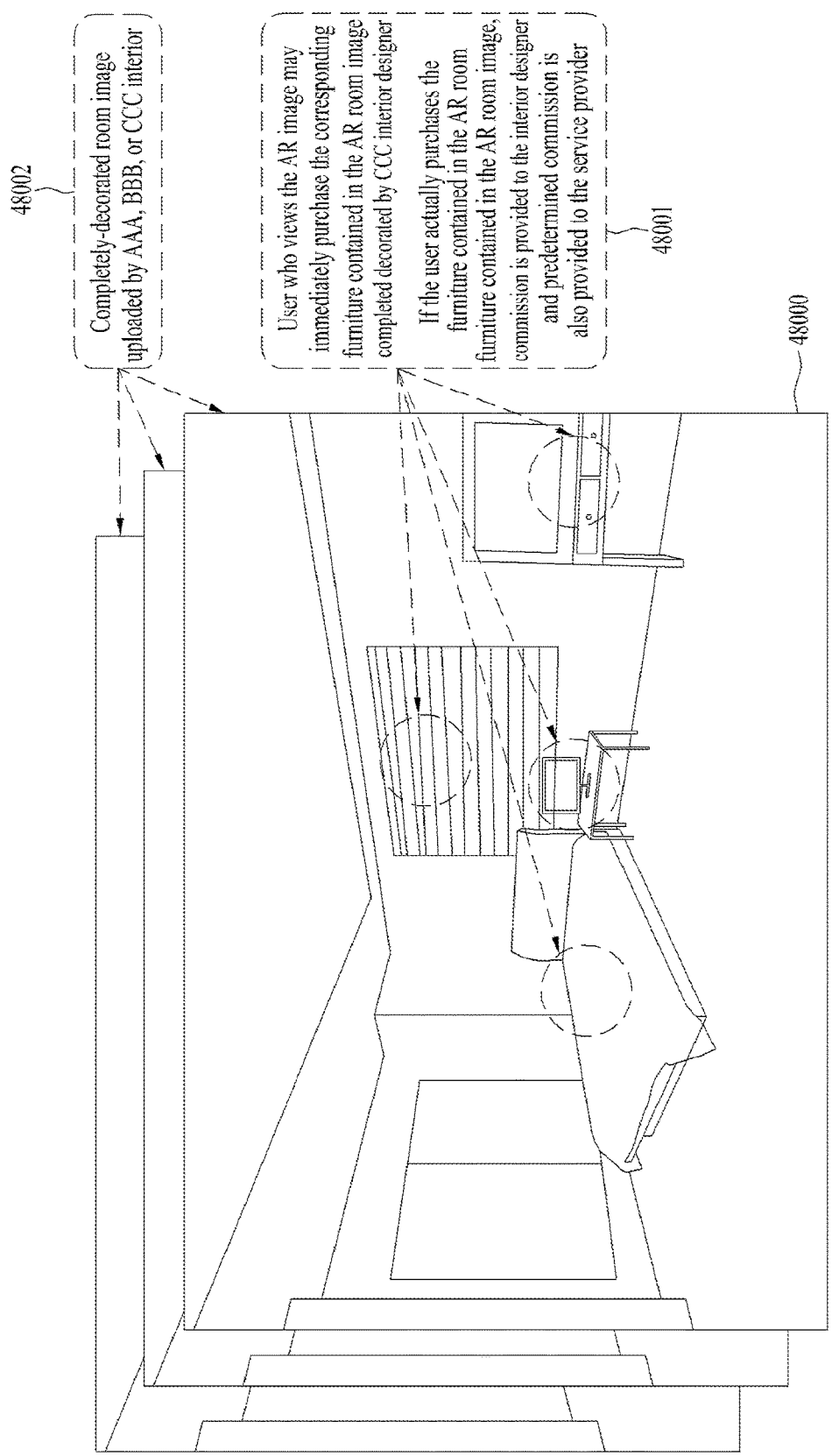
FIG. 48 is a view illustrating exemplary room interiors according to embodiments of the present disclosure.

FIG. 48 is a view illustrating exemplary room interiors according to embodiments of the present disclosure.

Referring to FIG. 48, reference number 48000 may denote images captured by the user's camera, and the images can be uploaded to the private DB of the user through the XR device.

The AR object 48001 may denote furniture or interior decoration arranged by the interior designers. For example, the interior designer "CCC" may virtually arrange AR furniture in the room image 48000.

There may be a plurality of completely-decorated room images 48002. The completely-decorated room image 48002 for each interior designer can be provided to the corresponding user. For example, the user can view the completely-decorated with AR objects by the interior designer "AAA", the completely-decorated with AR objects by the interior designer "BBB", and the room completely decorated with AR objects by the interior designer "CCC" as needed.

The XR device may provide the user who views the AR object with a necessary service through which the user can purchase a suitable furniture corresponding to the AR object through the XR device. If the user actually purchases the furniture corresponding to the AR object, predetermined fees can be given to the corresponding interior designer, and a predetermined commission fee can also be given to the service provider for providing the user with such AR objects.

Through the interior mode through the XR device according to the embodiments, the AR image indicating the room completely decorated by the interior designer may be re-uploaded to the private DB of the user, so that the user can view the re-uploaded resultant image. The user who views the completely-decorated room images uploaded in the private DB may actually purchase necessary furniture as needed. AR-furniture information may be uploaded by sales stores such as furniture sales stores. If the user actually purchases the furniture recommended by the interior designer, the sales stores or (the furniture enterprise) can pay a predetermined amount of money to the corresponding interior designer. For example, 1% of the total furniture price can be allocated to the interior designer. The service provider may receive a predetermined commission from the furniture enterprise. For example, the commission to be received by the service provider may be set to 1% of the total furniture price.

Figure 49:
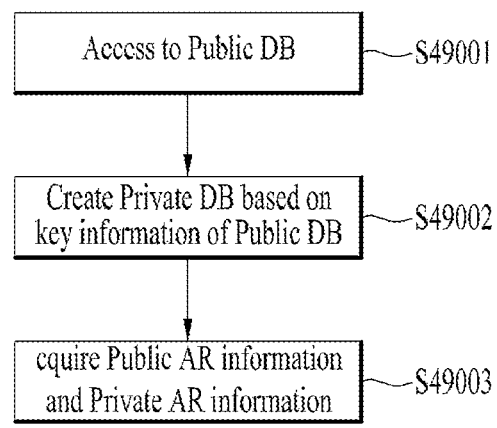
FIG. 49 is a flowchart illustrating a method for controlling the XR device according to embodiments of the present disclosure.

FIG. 49 is a flowchart illustrating a method for controlling the XR device according to embodiments of the present disclosure.

Referring to FIG. 49, a method for controlling the XR device according to the embodiments of the present disclosure may include accessing a public DB (S49001), creating a private DB based on key information of the public DB (S49002), and/or acquiring public AR information or private AR information (S49003). In more detail, the above-mentioned steps may correspond to a method for allowing the XR device shown in FIG. 24 to access the database (DB).

Through the method for controlling the XR device according to the embodiments of the present disclosure, the private DB can be generated. Specifically, private AR information stored in the private DB may be information related to security of the individual user. Therefore, the private DB is independently separated and managed, so that the XR device can provide high-security AR technology.

In addition, the private DB may satisfy security and extensibility of information according to various kinds of XR devices. If the XR device according to the embodiments is a mobile device, the XR device can maintain safety and security of the private DB using the USIM field. In addition, if the XR device is implemented as the AR glasses, the XR device can maintain safety and security of the private DB through ID information of the AR glasses.

In addition, if the user has to change a current XR device to another XR device, the XR device according to the present disclosure can maintain extensibility of the private DB by changing only the USIM field or ID information.

The XR device and a method for controlling the same according to the embodiments can separate the public DB and the private DB from each other, so that the AR image that is visible only to the individual user can be implemented. In this case, the XR device can enable the user to share the corresponding AR image with other people (i.e., friends or acquaintances) using the above-mentioned authentication method (i.e., the authentication method based on information stored in the whitelist).

The XR device and the method for controlling the same according to the embodiments of the present disclosure can provide various UIs and UXs using AR information contained in the public DB and AR information contained in the private DB as described above.

In addition, the method for controlling the XR device according to the embodiments of the present disclosure can be utilized to advertise or publicize the local governments and enterprises.

The enterprises or the local governments need not directly fabricate unique applications, so that the enterprises or the local governments can expose desired AR publicity to users by inducing the users to conduct promotional events using the XR device of the present disclosure. As the number of enterprises and local governments capable of participating in the AR publicity applications through the XR device is gradually increased, the number of users who views the AR publicity applications is also increased, the enterprises and local governments can expect much more profits through the XR device.

What is claimed is:
1. A method for controlling an extended reality (XR) device, the method comprising:
  accessing a public databased (DB);
  generating a private DB based on key information of the public DB,
  the public DB including public augmented reality (AR) information,
  the private DB including private AR information and a whitelist;
  acquiring the public AR information and the private AR information; and
  displaying, by the XR device, an AR object based on the public AR information of the public DB and the private AR information of the private DB,
  wherein the private AR information is accessible by a user of the private DB and one or more users included in the whitelist.
2. The method of claim 1, the method further comprising:
  checking a request of a first user for accessing the private DB; and
  adding a key value for the first user to the whitelist of the private DB.
3. The method of claim 1,
  wherein the public AR information of the public DB is accessible information for users, and
  wherein the method further comprises in response to a signal of the first user for an AR mode, acquiring the public AR information of the public DB.
4. The method of claim 1, the method further comprising:
  in response to a signal of a first user for an AR mode, acquiring a key for the private DB from the public DB; and
  acquiring the private AR information of the private DB based on the key.
5. The method of claim 4,
  wherein the private AR information of the private DB is accessible for only the first user.
6. The method of claim 1, further comprising:
  receiving a key for a private DB of a second user in response to a signal of a first user for an AR mode;
  accessing the private DB of the second user based on the key; and
  checking whether a key of the first user is present in a whitelist of the private DB of the second user.
7. The method of claim 6, further comprising:
  displaying a first AR object based on private AR information of a private DB of the first user;
  displaying a second AR object based on private AR information of the private DB of the second user; and
  displaying a third AR object based on the public AR information of the public DB.
8. The method of claim 1, further comprising:
  receiving an access key for a private DB of each of at least two users from the public DB in response to a signal of a first user for an AR mode;
  accessing the private DB of the each of the at least two users based on the access key; and
  checking whether a key of the first user is present in a whitelist of the private DB of the each of the at least two users.
9. The method of claim 8, further comprising:
  displaying a first AR object based on private AR information of the first user;
  displaying a second AR object based on private AR information of the private DB of the each of the at least two users; and
  displaying a third AR object based on the public AR information of the public DB.
10. A device for extended reality (XR), the device comprising:
  a memory;
  a camera configured to film surroundings of the device;
  a display configured to display data for the camera based on the memory; and
  a controller configured to connect to the memory, the camera and the display,
  wherein the controller is further configured to:
    access to a public database (DB);
    generate a private DB based on key information of the public DB,
    the public DB including public augmented reality (AR) information,
    the private DB including private AR information and a whitelist;
    acquire the public AR information and the private AR information; and display an AR object based on the public AR information of the public DB and the private AR information of the private DB,
wherein the private AR information is accessible by a user of the private DB and one or more users included in the whitelist.

11. The device of claim 10,
wherein the controller is further configured to:
check a request of a first user for accessing to the private DB; and
add a key value for the first user to the whitelist of the private DB.

12. The device of claim 10,
wherein the public AR information of the public DR is accessible information for users, and
wherein the controller is further configured to:
in response to a signal of the first user for an AR mode, acquire the public AR information of the public DB.

13. The device of claim 11,
wherein the controller is further configured to:
in response to a signal of a first user for an AR mode, acquire a key for the private DB from the public DB, and
acquire the private AR information of the private DB based on the key.

14. The device of claim 13,
wherein the private AR information of the private DB is accessible for only the first user.

15. The device of claim 10,
wherein the controller is further configured to:
receive a key for a private DB of a second user in response to a signal of a first user for an AR mode,
access the private DB of the second user based on the key,
check whether a key of the first user is present in a whitelist of the private DB of the second user.

16. The device of claim 15,
wherein the controller is further configured to:
display a first AR object based on private AR information of a private DB of the first user,
display a second AR object based on private AR information of the private DB of the second user, and
display a third AR object based on the public AR information of the public DB.

17. The device of claim 10,
wherein the controller is further configured to:
receive an access key for a private DB of each of at least two users from the public DB in response to a signal of a first user for an AR mode,
access the private DB of the each of the at least two users based on the access key, and
check whether a key of the first user is present in a whitelist of the private DB of the each of the at least two users.

18. The device of claim 17,
wherein the controller is further configured to:
display a first AR object based on private AR information of the first user,
display a second AR object based on private AR information of the private DB of the each of the at least two users, and
display a third AR object based on the public AR information of the public DB.

* * * * *